US010136017B2

(12) United States Patent
Hayashi et al.

(10) Patent No.: US 10,136,017 B2
(45) Date of Patent: Nov. 20, 2018

(54) INFORMATION PROCESSING SYSTEM, INFORMATION PROCESSING APPARATUS, AND METHOD FOR PROCESSING INFORMATION

(71) Applicants: Yuuichiroh Hayashi, Kanagawa (JP); Ryohsuke Yoshihashi, Kanagawa (JP); Yusuke Yoshioka, Kanagawa (JP)

(72) Inventors: Yuuichiroh Hayashi, Kanagawa (JP); Ryohsuke Yoshihashi, Kanagawa (JP); Yusuke Yoshioka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/637,143

(22) Filed: Jun. 29, 2017

(65) Prior Publication Data

US 2018/0013913 A1    Jan. 11, 2018

(30) Foreign Application Priority Data

Jul. 7, 2016    (JP) .................................. 2016-134800
Mar. 27, 2017    (JP) .................................. 2017-061848

(51) Int. Cl.
*G06F 3/12*    (2006.01)
*H04N 1/00*    (2006.01)
(Continued)

(52) U.S. Cl.
CPC ....... *H04N 1/00949* (2013.01); *G06F 9/4405* (2013.01); *G06F 9/4881* (2013.01);
(Continued)

(58) Field of Classification Search
CPC . G06F 9/4405; G06F 9/4881; H04N 1/00949; H04N 1/00344; H04N 2201/0094
See application file for complete search history.

(56) References Cited

U.S. PATENT DOCUMENTS 7,359,074 B2    4/2008    Ito
2004/0057076 A1*    3/2004    Hirose ............... H04N 1/00413
                                                                358/1.16
(Continued)

FOREIGN PATENT DOCUMENTS

JP    2003-208596    7/2003
JP    4039191    1/2008
JP    2017-076368    4/2017

*Primary Examiner* — Moustapha Diaby
(74) *Attorney, Agent, or Firm* — IPUSA, PLLC

(57) ABSTRACT

An information processing system having an information processing apparatus and programs includes an application memory unit storing applications executing a series of processes using electronic data, in which program identification information, parameter setup information, and flow identification information are defined, a use screen memory unit storing use screen information of defining a form; a first receiving unit receiving a first request including the application identification information; a first sending unit sending the use screen information; a second receiving unit, an acquiring unit acquiring the flow information identified by the flow identification information included in the second request, and an executing unit causing the program identified by the flow information to be executed using the parameter included in the second request in conformity with the execution order to execute the series of processes using the electronic data based on the information related to the electronic data.

10 Claims, 70 Drawing Sheets

(51) Int. Cl.
*G06F 9/48* (2006.01)
*G06F 9/4401* (2018.01)

(52) U.S. Cl.
CPC . *H04N 1/00344* (2013.01); *H04N 2201/0094* (2013.01); *H05K 999/99* (2013.01)

(56) References Cited

U.S. PATENT DOCUMENTS

| | | | |
|---|---|---|---|
| 2008/0151301 A1* | 6/2008 | Ito | G06F 3/1253 358/1.15 |
| 2012/0210442 A1* | 8/2012 | Ito | G06F 21/10 726/26 |
| 2017/0109194 A1 | 4/2017 | Namihira et al. | |

* cited by examiner

FIG.6

| DATA TYPE BEFORE CONVERSION | DATA TYPE AFTER CONVERSION | TYPE CONVERSION TO BE GENERATED |
|---|---|---|
| InputStream | LocalFilePath | FIRST TYPE CONVERSION |
| LocalFilePath | File | SECOND TYPE CONVERSION |
| ... | ... | ... |

APPLICATION REGISTRATION — G300

| TYPE SELECTION | BASIC SETUP | DETAILED SETUP | REGISTRATION |

PLEASE INPUT BASIC INFORMATION OF APPLICATION

TYPE: SCAN WORKFLOW

APP NAME: SCAN TRANSLATION APPLICATION — G310

DESIGN TEMPLATE: SINGLE SCREEN STYLE ▶ — G320

AUTHENTICATION: ▶ NON — G330

LANGUAGE FOR DISPLAY: ▶ English, Japanese — G340
◀ English / Japanese / Chinese ▶

[RETURN] [NEXT] — G350 [REGISTRATION] [CANCEL]

FIG.13

APPLICATION REGISTRATION

| TYPE SELECTION | BASIC SETUP | DETAILED SETUP | REGISTRATION |

Screen1 | Screen2 | +
Flow

PLEASE SELECT PARAMETER INFORMATION TO BE INPUT BY USER WHEN COMPONENT IS SELECTED PARAMETER INFORMATION VIEW IS DISPLAYED BELOW.

-OCR--TRANSLATION-MAIL 1310  1320  1330

G510

Parameter list

| select | display name | name | type | default | input type |
|--------|--------------|------|------|---------|------------|
| ✓ | TRANSLATION SOURCE | from | string | English | list-radio-button ▷ |
| ✓ | TRANSLATION DESTINATION | to | string | Japanese | list-radio-button ▷ |
| ... | ... | ... | ... | ... | ... |

G520

NEXT

RETURN

G500

RETURN    NEXT    REGISTRATION    CANCEL

G530

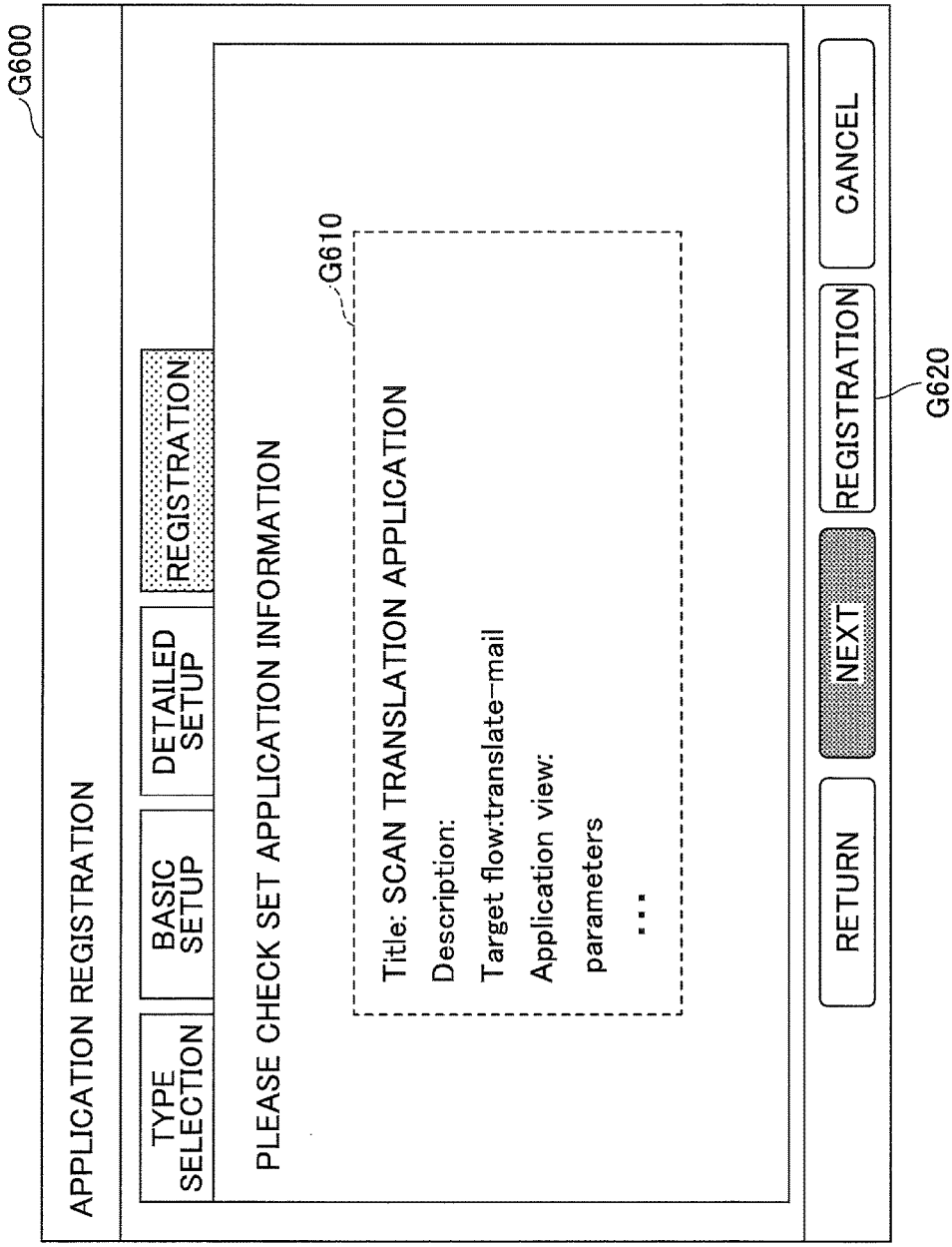

APPLICATION REGISTRATION — G900

| TYPE SELECTION | BASIC SETUP | DETAILED SETUP | SCAN SETUP | REGISTRATION |

PLEASE SET DEFAULT VALUE FOR SCAN

G910

- PAPER DIRECTION: READABLE DIRECTION ▷
- ONE SIDED/DOUBLE SIDED: DOUBLE SIDED ▷
- SCAN COLOR MODE: AUTOMATIC SELECTION ▷
- SCAN RESOLUTION: 300 dpi ▷
- READ SIZE: Auto ▷

G920 — SETUP CHANGE? [✓][ ][ ][✓][✓]

NEXT

FIG.22

APPLICATION REGISTRATION

| TYPE SELECTION | BASIC SETUP | DETAILED SETUP | PRINT SETUP | REGISTRATION |

PLEASE SET DEFAULT VALUE FOR PRINT

G1010

PRINT RUN: 1 ▷
PRINT COLOR MODE: BLACK AND WHITE ▷
PRINT SIDE: SINGLE SIDED ▷

SETUP CHANGE? ✓ ☐ ☐
G1020

NEXT

```
"app_type" : "scan&print",  ⎫1201
"appName" : "QR CODE PRINT APP",
"displayName" : {
    "Japanese" :"QR CODE PRINT",
    "English" :"QRCode print"
},
(OMITTED)
"defaultScannerSettings": {           ~1209
    "originalOrientation": "readable",
    "originalSide": "one_sided",
    "scanColor": "auto_color",
    "scanResolution": "300"
},
"defaultPrinterSettings": {           ~1210
    "copies": 1,
    "printColor": "monochrome",
    "printSide": "one_sided"
}
```

```
"flowName" : "code-print", }1101
"flowDetails" : [
    {
        "detailName" : "detail0",
        "component" : "code",
        "parameters" : {
            ...
        }
    },
    {
        "detailName" : "detail1",
        "component" : "stamp",
        "parameters" : {
            ...
        }
    },
]
```

FIG.29

| MAIL ADDRESS | FLOW NAME |
|---|---|
| xxx@example.com | FLOW 1 |
| yyy@example.com | FLOW 2 |
| ... | ... |

APPLICATION REGISTRATION — G1300

| TYPE SELECTION | BASIC SETUP | DETAILED SETUP | MAIL SETUP | REGISTRATION |

PLEASE SET TARGET MAIL ADDRESS

G1310

MAIL ADDRESS: xxx@example.com ▷

USABILITY OF ATTACHED FILE: USE

SETUP CHANGE? ✓ ☐ — G1320

NEXT

FIG.33

```
"app_type" : "mail",  }1201
"appName" : "MAIL TEST APP",
"displayName" : {
    "Japanese" : "MAIL TEST",
    "English" : "mail-test"
},
        (OMITTED)
"mailSettings": {
    "address" : ["xxx@example.com"],      1211
    "attachment" : true
}
```

PARAMETER REGISTRATION FORM – STAMP COMPONENT

PLEASE NAME PARAMETER GROUP  G1510

UPPER RIGHT STAMP BASIC

PLEASE DESCRIBE EXPLANATION OF
PARAMETER GROUP  G1520

BASIC SETUP OF PROVIDING STAMP ON UPPER RIGHT

PLEASE DO PARAMETER SETUP OF PARAMETER GROUP

| | |
|---|---|
| VERTICAL POSITION: | Top ▽ |
| HORIZONTAL POSITION: | Right ▽ |
| UNIT OF MARGIN: | mm |
| VERTICAL MARGIN: | 100 |
| HORIZONTAL MARGIN: | 100 |
| ROTATIONAL ANGLE: | 0° |

G1530

REGISTRATION  G1540

FIG.39

PARAMETER REGISTRATION FORM – STAMP COMPONENT ⟵ G1600

PLEASE NAME PARAMETER GROUP

| UPPER RIGHT STAMP BASIC |

PLEASE DESCRIBE EXPLANATION OF
PARAMETER GROUP

| BASIC SETUP OF PROVIDING STAMP ON UPPER RIGHT |

PLEASE DO PARAMETER SETUP OF PARAMETER GROUP

CUSTOMIZATION

| | | |
|---|---|---|
| VERTICAL POSITION: | Top ▽ | ☐ |
| HORIZONTAL POSITION: | Right ▽ | ☐ |
| UNIT OF MARGIN: | mm | ☐ |
| VERTICAL MARGIN: | 100 | ✓ |
| HORIZONTAL MARGIN: | 100 | ✓ |
| ROTATIONAL ANGLE: | 0° | ☐ |

⟵ G1610

[ REGISTRATION ]

FIG.40

PARAMETER REGISTRATION FORM - STAMP COMPONENT

PLEASE NAME PARAMETER GROUP

UPPER RIGHT STAMP BASIC

PLEASE DESCRIBE EXPLANATION OF PARAMETER GROUP

BASIC SETUP OF PROVIDING STAMP ON UPPER RIGHT

PLEASE DESIGNATE OPEN RANGE OF PARAMETER GROUP

Public — G1710

PLEASE DO PARAMETER SETUP OF PARAMETER GROUP

VERTICAL POSITION: Top
HORIZONTAL POSITION: Right
UNIT OF MARGIN: mm
VERTICAL MARGIN: 100
HORIZONTAL MARGIN: 100
ROTATIONAL ANGLE: 0°

REGISTRATION

| PARAMETER GROUP ID | COMPONENT NAME | TITLE | EXPLANATION | PARAMETER GROUP |
|---|---|---|---|---|
| 1 | STAMP COMPONENT | UPPER RIGHT STAMP BASIC | BASIC SETUP OF PROVIDING STAMP ON UPPER RIGHT | "parameters":[ "verticalPosition": "Top", "horizontalPosition": "Right", "merginUnit": "mm", "verticalMergine": 100, "horizontalMergine": 100, "rotation": 0 ] |
| 2 | TRANSLATION COMPONENT | ENGLISH TRANSLATION | TRANSLATION OF VARIOUS LANGUAGES TO ENGLISH | "parameters":[ "from": "Any", "to": "English" ] |

FIG.43

| PARAMETER GROUP ID | FLOW ID | TITLE | EXPLANATION | PARAMETER GROUP |
|---|---|---|---|---|
| 1 | FLOW 1 | UPPER LEFT STAMP (ROTATION OF 90 DEGREE) | STAMP ON UPPER LEFT | "parameters": { "verticalPosition": "Top", "horizontalPosition": "Left", "merginUnit": "mm", "verticalMergine": 100, "horizontalMergine": 100, "rotation": 90 } |
| 2 | FLOW 2 | JAPANESE-FRENCH LANGUAGE TRANSLATION | TRANSLATION OF JAPANESE TO FRENCH | "parameters": { "from": "Japanese", "to": "French" } |

190

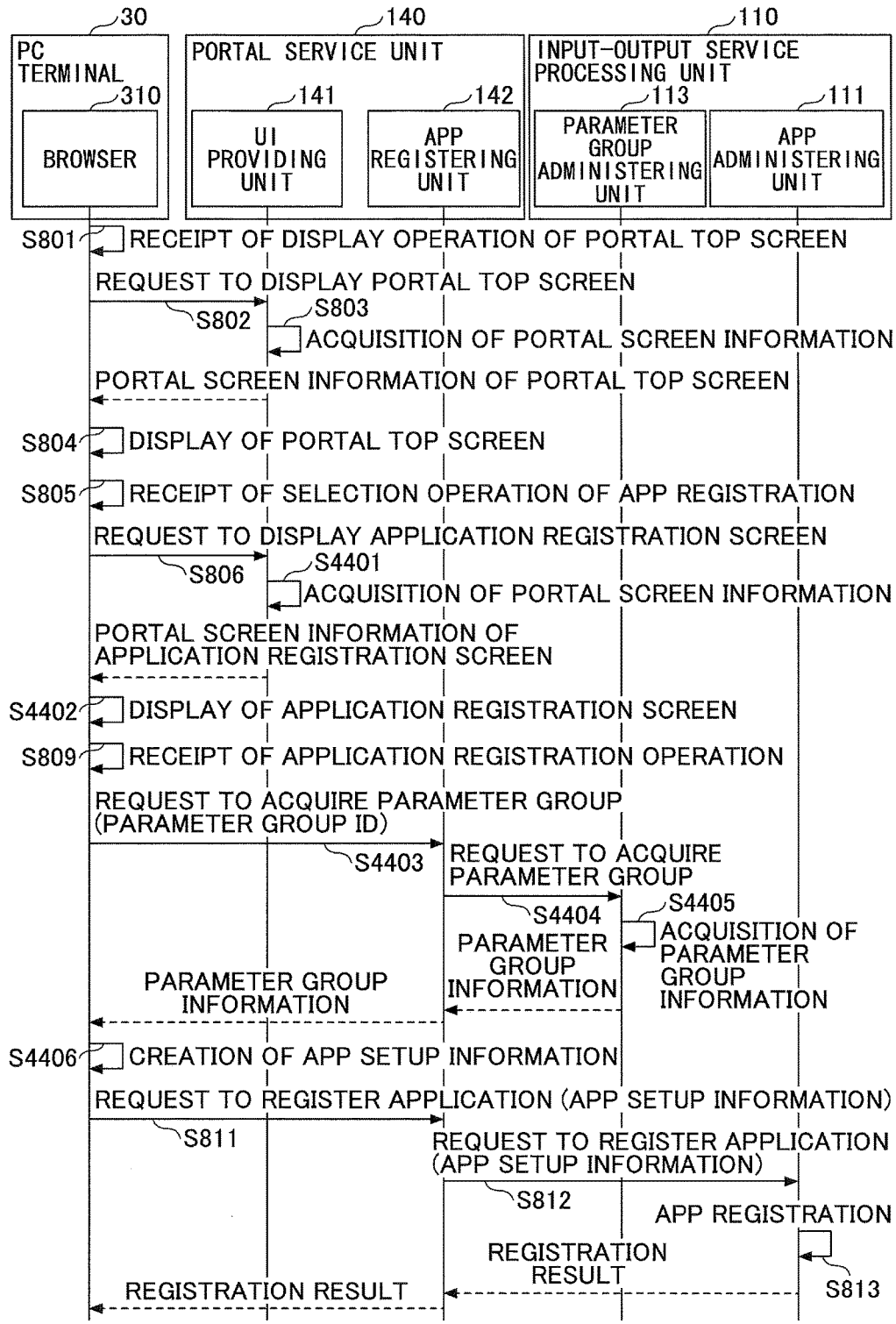

FIG.45

APPLICATION REGISTRATION — G1800

| TYPE SELECTION | BASIC SETUP | DETAILED SETUP | SCAN SETUP | REGISTRATION |

PLEASE SET PARAMETER

STAMP

PARAMETER GROUP SELECTION: UPPER RIGHT STAMP BASIC ▽ — G1810

EXTENDED SETUP: SETUP — G1820

NEXT

FIG.48

APPLICATION REGISTRATION — G2000

| TYPE SELECTION | BASIC SETUP | DETAILED SETUP | MAIL SETUP | REGISTRATION |

PLEASE SET TARGET MAIL ADDRESS

- MAIL ADDRESS: xxx@example.com
- RE: xxx@example.com
- BODY: xxx@example.com
- USABILITY OF ATTACHED FILE: USE ▷

SETUP CHANGE? ✓

VALIDATION SETUP: SETUP  SETUP  SETUP  SETUP — G2010

NEXT

FIG.50

```
"validation": {
  "regexp": "/^[^@;,]{10,20}$/",
  "function": null,
  "errorMessage": {
    "en": "THERE IS AN ERROR."
  }
}
```

FIG.51

```
"validation": {
  "regexp": null,
  "function": {
    "type": "real",
    "option": {
      "min": 10,
      "max": 20
    }
  },
  "errorMessage": {
    "en": "error"
  }
}
```

FIG.53

```
"appData": {
  "title": "FlowSample",
  "loginType": "none",
  "fields": [
    {
      "id": "send.subject",
      "label": "Subject",
      "type": "text",
      "params": {
        "defaultValue": "$[appSetting.app_section_id ? appSetting.app_section_id
 [¥ send.subject¥]": "¥*¥"]",
        "required": false,
        "validation": {                                                    ~1213
          "regexp": null,
          "function": "return function validateNumber(param) {¥n¥t¥var regExp =
new RegExp(/^[-]?[0-9]+$/);¥n¥t¥if(regExp.test(param)) {¥n¥t¥t¥var num = Number
(param);¥n¥if(10 <= num && num <= 20) {¥n¥t¥treturn true,¥n} else {¥n¥treturn false;¥n]
¥n¥t} else {¥n¥t¥treturn false;¥n¥t}¥n}",
          "errorMessage": "error"
        }
      }
    }, (OMITTED)
```

APPLICATION REGISTRATION — G2600

| TYPE SELECTION | BASIC SETUP | DETAILED SETUP | REGISTRATION | SCAN SETUP |

PLEASE SET PARAMETER

STORAGE SERVICE: FILE UPLOAD

G2610

| PARAMETER NAME | USER INPUT | INPUT MEANS | DEFAULT VALUE |
|---|---|---|---|
| FOLDER ID | ✓ | FOLDER BROWSE | — |
| FILE NAME | ✓ | TEXT BOX | Filename.pdf |
| FOLDER PATH | ☐ | — | — |

[NEXT]

FIG.62

```
{
  "name": "FOLDER ID",
  "inputType": "folder_browse"
},
{
  "name": "FILE NAME",
  "inputType": "text"
}
```

FIG.63

| PARAMETER NAME | VALUE | EXPLANATION |
| --- | --- | --- |
| COMPONENT NAME | STORAGE SERVICE COMPONENT | CLOUD STORAGE SERVICE COMPONENT |
| Operations | [<br>　{<br>　　"name": "uploadFile",<br>　　"parameters": [<br>　　　"folderId": "",<br>　　　"fileName": "",<br>　　]<br>　},<br>　{<br>　　"name": "_folderBrowse",<br>　　"parameters": [<br>　　　"folderId": "",<br>　　　"credential": "",<br>　　]<br>　}<br>] | OPERATION HELD BY COMPONENT |

FIG.64

```
{
  "name": "$flowName",
  "outputType": "text",
  "flowDetails": [
    {
      "name": "getToken",
      "componentName": "Auth",
      "operationName": "getToken",
      "parameters": {
        "serviceKey": "$serviceKey"
      }
    },
    {
      "name": "_folderBrowse",
      "componentName": "$componentName",
      "operationName": "_folderBrowse"
    }
  ]
}
```

FIG.65

| PARAMETER NAME | VALUE | EXPLANATION |
|---|---|---|
| COMPONENT NAME | STORAGE SERVICE COMPONENT | CLOUD STORAGE SERVICE COMPONENT |
| AUTHENTICATION TYPE | Proxy | PROXY AUTHENTICATION TYPE |
| Operations | [<br>  {<br>    "name": "uploadFile",<br>    "parameters": {<br>      "folderId": "",<br>      "fileName": ""<br>    }<br>  },<br>  {<br>    "name": "_folderBrowse",<br>    "parameters": {<br>      "folderId": "",<br>      "credential": ""<br>    }<br>  },<br>  {<br>    "name": "_getToken",<br>    "parameters": {<br>      "serviceKey": ""<br>    }<br>  }<br>] | OPERATION HELD BY COMPONENT |

FIG.66

```
{
  "name": "$flowName",
  "flowDetails": [
    {
      "name": "getFederationId",
      "componentName": "Auth",
      "operationName": "getFederationId",
      "parameters": {
        "serviceKey": "$serviceKey",
        "authType": "proxy",
      }
    },
    {
      "name": "_getToken",
      "componentName": "$componentName",
      "operationName": "_getToken",
    },
    {
      "name": "_folderBrowse",
      "componentName": "$componentName",
      "operationName": "_folderBrowse"
    }
  ]
}
```

FIG.68

```
{
"id": "uploadFile.fileId",
 "type": "folder_browse",
 "params": {
      "action": {
      "url":"/flows/_folder_browse_flow",
        "body": {
          "parameters": {
           "getToken": {
           },
           "_folderBrowse:{
             "folderId": ""
           }
         },
         "sync": true
       }
     }
   }
 }
```

INFORMATION PROCESSING SYSTEM, INFORMATION PROCESSING APPARATUS, AND METHOD FOR PROCESSING INFORMATION

CROSS-REFERENCE TO RELATED APPLICATIONS

The present application claims priority under 35 U.S.C. § 119 to Japanese Patent Application No. 2016-134800, filed Jul. 7, 2016 and Japanese Patent Application No. 2017-061848, filed Mar. 27, 2017. The contents of which are incorporated herein by reference in their entirety.

BACKGROUND OF THE INVENTION

Field of the Invention

The present invention relates to an information processing system, an information processing apparatus, and a method for processing information.

Description of the Related Art

Recent years, a service of providing a function obtained by combining multiple functions (e.g., scan, print, and mail delivery) is known. For example, a service for providing a predetermined process to an electronic file (an image file) generated by scanning and performing mail delivery or the like is known. This service is substantialized by a series of processes including at least one process of performing each function.

Further, there is an image forming apparatus which executes a series of processes based on directions which include process information representing at least one process as the series of processes (Japanese Patent No. 4039191).

However, in the above technique, a use of service by a user requires development of an application to cause the series of processes to be executed, for example. Meanwhile, the development of the application may sometimes require specialized knowledge and experience related to a programming language.

An embodiment of the present invention is provided in consideration with the above points. The object of the present invention is to support development of the application.

SUMMARY OF THE INVENTION

An information processing system including at least one information processing apparatus and a plurality of programs respectively performing predetermined processes includes an application memory unit configured to store each of applications executing a series of processes using electronic data, in which program identification information of identifying at least one program from among the plurality of programs, and flow information of defining an execution order of executing the at least one program are associated with application setup information defining parameter setup information of setting an parameter used to execute each of the at least one program, and flow identification information of identifying the flow information; a use screen memory unit configured to store use screen information of defining a form of a use screen for using the applications in association with application identification information of identifying the applications; a first receiving unit configured to receive a first request including the application identification information from a first electronic apparatus from among at least one electronic apparatus coupled to the information processing system; a first sending unit configured to send, to the first electronic apparatus being the request source, the use screen information stored in the use screen unit in association with the application identification information included in the first request received by the first receiving unit and the application setup information stored in the application memory unit in association with the application identified by the application identification information; a second receiving unit configured to receive a second request that includes the parameter set in the use screen displayed in the first electronic apparatus based on the use screen information sent by the first sending unit and the parameter setup information defined by the application setup information, information related to the electronic data designated in the use screen, and the flow identification information defined in the parameter setup information; an acquiring unit configured to acquire the flow information identified by the flow identification information included in the second request received by the second receiving unit; and an executing unit configured to cause each of the at least one program identified by the flow information acquired by the acquiring unit to be executed using the parameter included in the second request in conformity with the execution order defined in the flow information so as to execute the series of processes using the electronic data based on the information related to the electronic data included in the second request received by the first receiving unit.

BRIEF DESCRIPTION OF THE DRAWINGS

FIG. 6 is a diagram illustrating an example of a type-conversion information table;

FIG. 10 illustrates an example of an application registration screen of the first embodiment;

FIG. 11 illustrates another example of the application registration screen of the first embodiment;

FIG. 13 illustrates another example of the application registration screen of the first embodiment;

FIG. 14 illustrates another example of the application registration screen of the first embodiment;

FIG. 20 illustrates an example of an application registration screen of the second embodiment;

FIG. 21 illustrates an example of another application registration screen of the second embodiment;

FIG. 22 illustrates an example of another application registration screen of the second embodiment;

FIG. 23 illustrates an example of app setup information of the second embodiment;

FIG. 27 is a diagram illustrating an example of process flow information of the second embodiment;

FIG. 29 illustrates an example of a mail information table;

FIG. 32 illustrates an example of another application registration screen of the third embodiment;

FIG. 33 illustrates an example of app setup information of the third embodiment;

FIG. 38 illustrates an example of a registration screen for a parameter group;

FIG. 39 illustrates another example of the registration screen for the parameter group;

FIG. 40 illustrates another example of the registration screen for the parameter group;

FIG. 41 illustrates an example of parameter group information registered for each component;

FIG. 43 illustrates an example of parameter group information registered for each process flow;

FIG. 44 is a sequence diagram of an example of a registration process to register an application according to the fourth embodiment;

FIG. 45 illustrates an example of an application registration screen of the second embodiment;

FIG. 48 illustrates an example of an application registration screen of the fifth embodiment;

FIG. 50 illustrates an example of validation information expressed by a regular expression;

FIG. 51 illustrates an example of validation information reading a validation function;

FIG. 53 illustrates an example of app setup information of the fifth embodiment;

FIG. 61 illustrates an example of an application registration screen;

FIG. 62 is a diagram illustrating an example of a data structure of a parameter in a case where folder browse is designated;

FIG. 63 is a diagram explaining an example of component information of a storage service component;

FIG. 64 illustrates an example of a process flow template;

FIG. 65 illustrates another example of the component information of the storage service component;

FIG. 66 illustrates another example of the process flow template;

FIG. 68 illustrates an example of action information;

DESCRIPTION OF THE EMBODIMENTS

Hereinafter, an embodiment of the present invention is described in detail with reference to figures.

First Embodiment

<System Structure>

Figure 1:
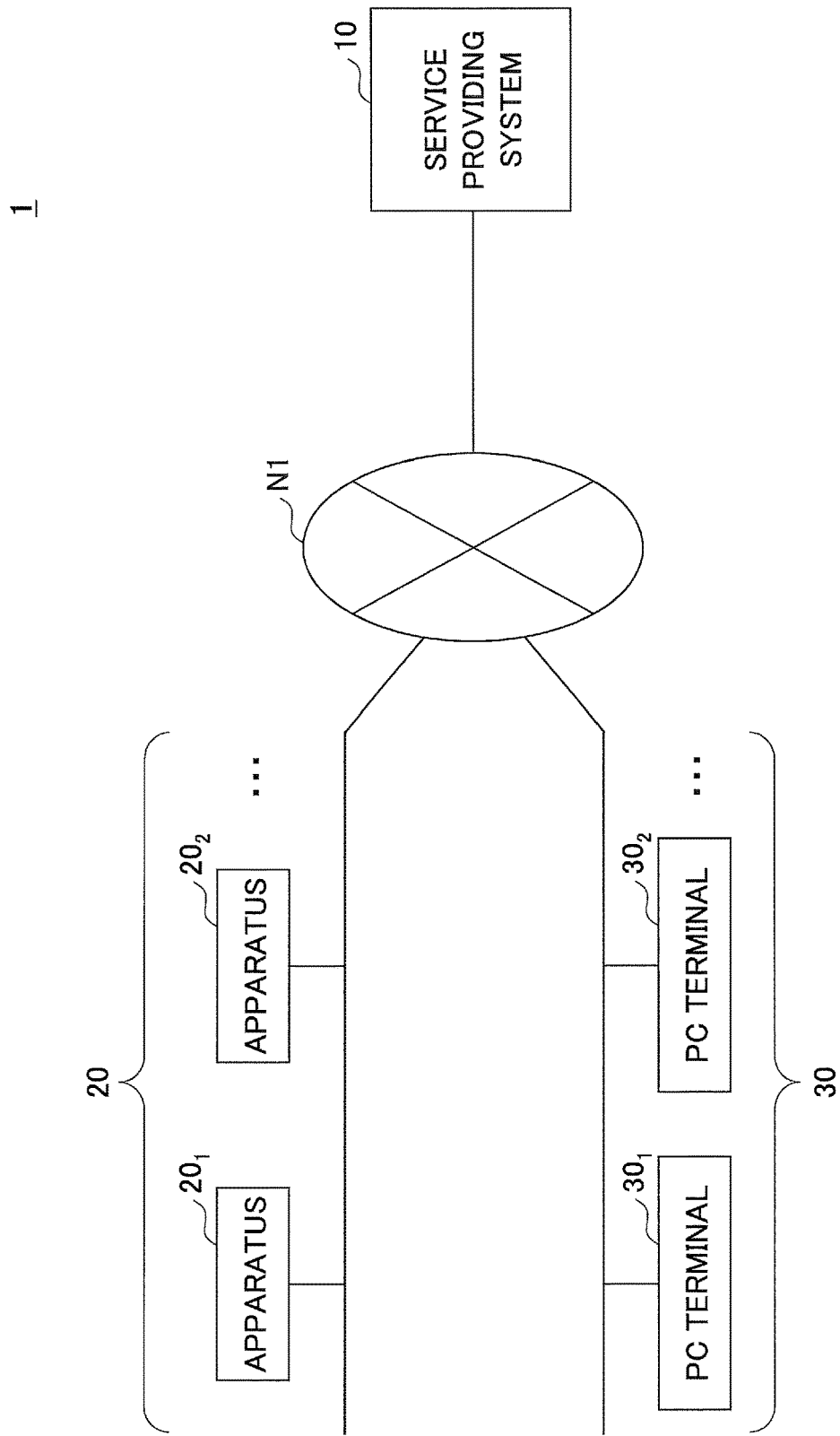
FIG. 1 is a diagram illustrating a system structure of an example of an information processing system of a first embodiment.

Referring to FIG. 1, a system structure of an information processing system 1 of a first embodiment is described. FIG. 1 is a diagram illustrating an example of the information processing system 1 of the first embodiment.

The information processing system 1 illustrated in FIG. 1 includes a service providing system 10, an apparatus 20, and a personal computer (PC) terminal 30, which are communicably coupled through a wide area network N1 such as the Internet.

The service providing system 10 is substantialized by at least one information processing apparatus and provides various services substantialized by a series of process, which is formed by combining at least one process from among multiple processes respectively substantialize various functions via a network N1.

Here, the function relates to an electronic file such as a document file and an image file. The function is, for example, print, scan, facsimile transmission, data type conversion, mail delivery, optical character recognition (OCR), processing, compression, decompression, and storing into a repository.

A service provided by the service providing system 10 of the first embodiment is specifically described later. Hereinafter, the sequence of process is referred to as a "process flow".

The apparatus 20 is various electronic apparatuses used by a user. Said differently, the apparatus 20 is, for example, an image forming apparatus such as a multifunction peripheral (MFP), a personal computer (PC), a projector, an electronic whiteboard, a digital camera, or the like. The user uses the apparatus 20 to use various services provided by the service providing system 10.

Hereinafter, when each of multiple apparatuses 20 are distinguished, a suffix is added such as an "apparatus $20_1$," and an "apparatus $20_2$".

The PC terminal 30 is, for example, a desktop PC, a notebook PC, a smartphone, a tablet terminal, or the like. The user uses the PC terminal 30 to use various services provided by the service providing system 10.

Hereinafter, when each of the PC terminals 30 are distinguished, a suffix is added such as an "apparatus $30_1$," and an "apparatus $30_2$".

The structure of the information processing system 1 illustrated in FIG. 1 is an example and may be another structure. For example, the information processing system 1 of the first embodiment includes various apparatuses, each of which performs at least one of an input and an output of the electronic data. These apparatuses may use various services provided by the service providing system 10.

<Hardware Structure>

Figure 2:
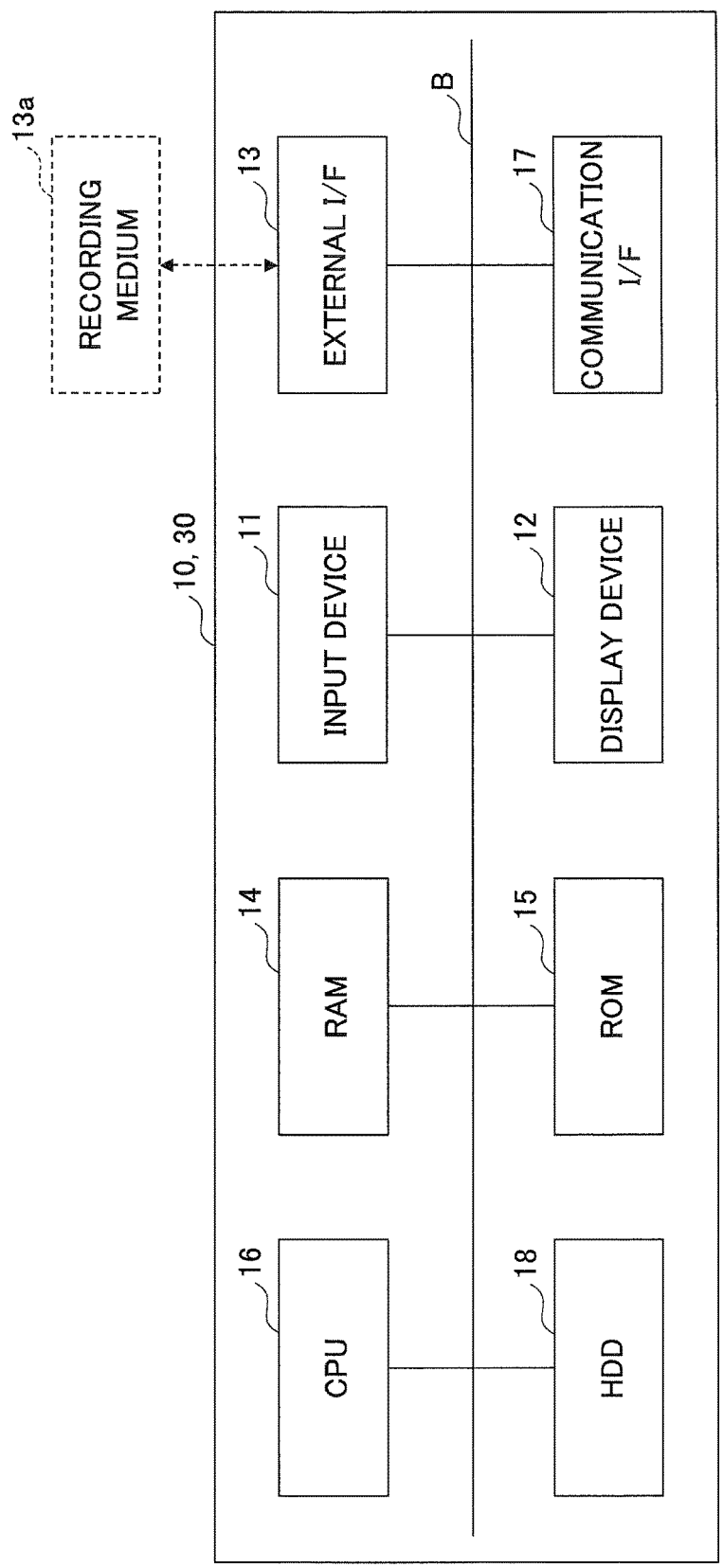
FIG. 2 is a diagram illustrating a hardware structure of an example of a service providing system and a PC terminal of the first embodiment.

Referring to FIG. 2, described next are the hardware structures of the service providing system 10 and the PC terminal 30, which are included in the information processing system 1 of the first embodiment. FIG. 2 is a diagram illustrating hardware structures of an example of a service providing system 10 and an example of the PC terminal 30 of the first embodiment. Because the hardware structure of the service providing system 10 and the hardware structure of the PC terminal 30 are similar, the hardware structure of the service providing system 10 is mainly described hereinbelow.

The service providing system 10 illustrated in FIG. 2 includes an input device 11, a display device 12, an external interface (I/F), and a random access memory (RAM) 14. Further, the service providing system 10 includes a read only memory (ROM) 15, a central processing unit (CPU) 16, a communication interface (I/F) 17, and a hard disk drive (HDD) 18. The ROM 15, the CPU 16, a communication I/F 17, and the HDD 18 are hardware and are coupled by the bus B.

The input device 11 includes a keyboard, a mouse, a touch panel, and the like, by which the user inputs various operation signals. The display device 12 includes a display or the like to display a process result acquired by the service providing system 10. At least one of the input device 11 and the display device 12 may be in a mode of being coupled to the service providing system 10 so as to be used where necessary.

The communication I/F 17 is an interface provided to couple the service providing system 10 with the network N1. Thus, the service providing system 10 can communicate with another apparatus through the communication I/F 17.

The HDD 18 is a non-volatile memory device that stores programs and data. The program and data stored in the HDD 18 are an operating system (OS), which is basic software controlling the entire service providing system 10, application software providing various functions in the OS, and so on.

The service providing system 10 may use a drive device (e.g., a solid state drive (SSD)) using a flash memory as a memory medium in place of the HDD 18. Further, the HDD 18 administers the stored program and the stored data using at least one of a predetermined file system and a predetermined database (DB).

The external I/F 13 is an interface with the external apparatus. The external apparatus includes a recording medium 13a and so on. With this, the service providing system 10 can read information from the recording medium 13a and write information to the recording medium 13a through the external I/F 13. The recording medium 13a is a flexible disk, a compact disk (CD), a digital versatile disk (DVD), a secure digital (SD) memory card, a universal serial bus (USB) memory, or the like.

The ROM 15 is a non-volatile semiconductor memory that can store a program or data even when a power source is powered off. The ROM 15 stores a program and data such as a basic input/output system (BIOS), an operating system (OS) setup, a network setup, or the like, which are executed at a time of starting up the service providing system 10. The random access memory (RAM) 14 is a volatile semiconductor memory configured to temporarily store the program and the data.

The CPU 16 reads the program and/or data from a memory device such as the ROM 15 and the HDD 18. The read program or the read data undergo a process to thereby substantialize a control or a function of the entire service providing system 10.

The service providing system 10 and the PC terminal 30 of the first embodiment can substantialize various processes described below by having the above hardware structure of the service providing system 10 and the PC terminal 30 illustrated in FIG. 2.

Figure 3:
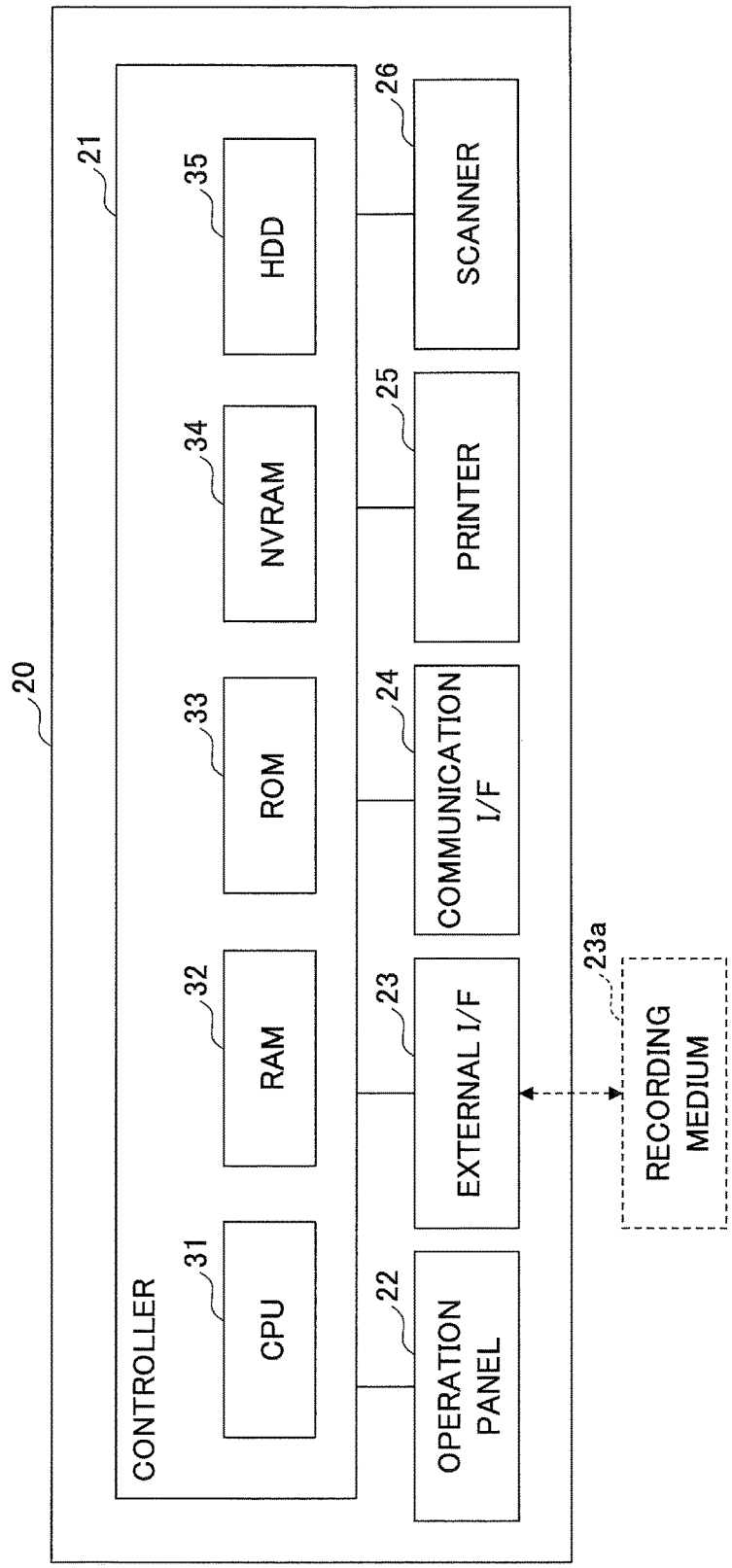
FIG. 3 is a diagram illustrating an example of a hardware structure of an apparatus of the first embodiment.

Referring to FIG. 3, described next is the hardware structure of an image forming apparatus, which is the apparatus 20 included in the information processing system 1 of the first embodiment. FIG. 3 is a diagram illustrating a hardware structure of an example of the apparatus 20 of the first embodiment.

The apparatus 20 illustrated in FIG. 3 includes a controller 21, an operation panel 22, an external interface (I/F) 23, a communication I/F 24, a printer 25, and a scanner 26. The controller 21 includes a central processing unit (CPU) 31, a random access memory (RAM) 32, a read only memory (ROM) 33, a non-volatile random access memory (NVRAM) 34, and a hard disk drive (HDD) 35.

The ROM 33 is a non-volatile semiconductor memory that stores various programs and data. The random access memory (RAM) 32 is a volatile semiconductor memory configured to temporarily store the program and the data. For example, setup information or the like is stored in the NVRAM 34. The HDD 35 is a non-volatile memory device that stores the various programs and data.

The CPU 31 reads the program, the data, setup information, or the like into the RAM 32 from the ROM 33, the NVRAM 34, the HDD 35, or the like, and performs the process. Thus, the CPU 31 is an arithmetic device substantializing an entire control or function of the apparatus 20.

The operation panel 22 includes an input unit for receiving an input from the user and a display unit for display. The external I/F 23 is an interface with the external apparatus. The external apparatus includes a recording medium 23a and so on. With this, the apparatus 20 can perform at least one of reading information from the recording medium 23a through the external I/F 23 and writing the information to the recording medium 23a through the external I/F 23. The recording medium 23a is, for example, an IC card, a flexible disk, a compact disc (CD), a digital versatile disc (DVD), a secure digital (SD) memory card, and a universal serial bus (USB) memory.

The communication I/F 24 is an interface coupling the apparatus 20 with the network. Thus, the apparatus 20 can perform data communications through the communication I/F 24. The printer 25 is provided to print print data. The scanner 26 is a reading device that reads an original and generates an electronic file (an image file).

The apparatus 20 of the first embodiment includes a hardware structure illustrated in FIG. 3 to substantialize various processes described below.

<Service Provided by a Service Providing System>

The service provided by the service providing system 10 of the first embodiment is described. Hereinafter, description is given for a case where the apparatus 20 is an image forming apparatus.

Within the first embodiment, a "scan translation service" is a service of generating an electronic file (an image file) by scanning an original manuscript in the apparatus 20, providing an OCR process to the electronic file, and translating the OCR electronic file into a predetermined language, and delivering the translated by a mail. Within the first embodiment, described is a case where the service providing system 10 serves the scan translation service.

When the service providing system 10 provides the scan translation service, the apparatus 20 needs to register, into the service providing system 10, an application (app information 1000 described below) for the apparatus 20 to use the scan translation service.

Within the first embodiment, explanation is given of a case where the application for using the scan translation service is registered by the PC terminal 30 and a case where the apparatus 20 uses the scan translation service by using the application.

However, the service provided by the service providing system 10 is not limited to this scan translation service. The service providing system 10 may provide a service in which an electronic file generated by scanning an original manuscript is encrypted and the encrypted is subjected to mail delivery.

The service providing system 10 may provide a service in which predetermined information is added to the electronic file generated by scanning the original manuscript and this electronic file is subjected to facsimile (FAX) transmission.

<Function Structure>

Figure 4:
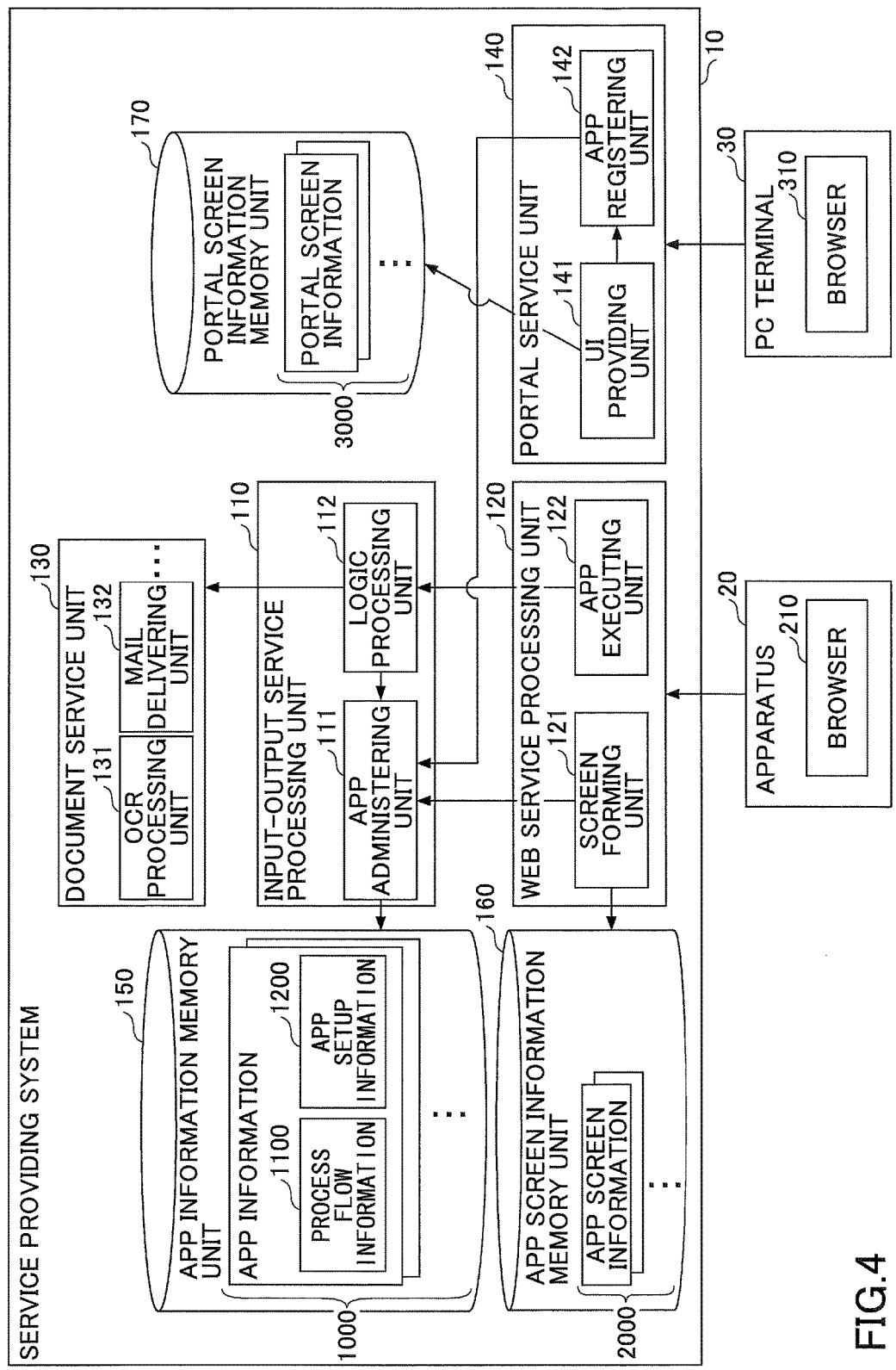
FIG. 4 is a diagram illustrating a functional structure of an example of an information processing system of the first embodiment.

Referring to FIG. 4, the functional structure of the information processing system 1 of the first embodiment is described. FIG. 4 is a diagram illustrating an example of a functional structure of the information processing system of the first embodiment.

Referring to FIG. 4, the PC terminal 30 includes a browser 310 implemented by, for example, the CPU 16. The user of the PC terminal 30 uses the browser 310 to register the application for using various services such as a "scan translation service" in the service providing system 10.

Referring to FIG. 4, the apparatus 20 includes a browser 210 implemented by, for example, the CPU 31. The user of the apparatus 20 can use the various services such as the "scan translation service" using the browser 210. Said differently, it is sufficient that the apparatus 20 has the browser 210. For example, the apparatus 20 may not have a dedicated application program for using the various services provided by the service providing system 10.

Referring to FIG. 4, the service providing system 10 includes an input-output service processing unit 110, a web service processing unit 120, a document service unit 130, and a portal service unit 140. The input-output service processing unit 110, the web service processing unit 120, the document service unit 130, and the portal service unit 140 are implemented when one or more programs installed on the service providing system 10 are executed by the CPU 16.

The service providing system 10 includes an app information memory unit 150, an app screen information memory unit 160, and a portal screen information memory unit 170. The app information memory unit 150, the app screen information memory unit 160, and the portal screen information memory unit 170 may be implemented by using the HDD 18. Further, at least one of the app information memory unit 150, the app screen information memory unit 160, and the portal screen information memory unit 170 may be substantialized by a memory device coupled to the service providing system 10 through the network.

The input-output service processing unit 110 performs a process related to a service provided by the service providing system 10. The input-output service processing unit 110 includes an app administering unit 111 and a logic processing unit 112.

The app administering unit 111 administers application information 1000 stored in the app information memory unit 150. The app information 1000 is an application for using a service substantialized by a series of process. Said differently, the various services provided by the service providing system 10 is provided by the app information 1000.

Further, the app administering unit 111 returns process flow information 1100 included in the app information 1000 in response to a request from the logic processing unit 112. The process flow information 1100 defines the sequence of process (the process flow) substantializing the service supplied by the app information 1000.

In response to a request from the portal service unit 140, the app administering unit 111 causes the app information 1000 to be stored in the app information memory unit 150. With this, the app information 1000 (the application) providing the service is registered in the service providing system 10.

The logic processing unit 112 acquires the process flow information 1100 included in the app information 1000 from the app administering unit 111 in response to a request from the web service processing unit 120. The logic processing unit 112 executes the series of processes (the process flow) substantializing the service provided by the app information 1100) based on the process flow information 1100 acquired from the app administering unit 111. Accordingly, the service providing system of the first embodiment can provide various services such as "scan translation service". The logic processing unit 112 is described in detail later.

The web service processing unit 120 performs a process of using various services using the browser 210 of the apparatus 20. Said differently, the web service processing unit 120 functions as an application server providing the web application (the app information 1000) to the browser 210. The web service processing unit 120 includes a screen forming unit 121 and an app executing unit 122.

In response to a request from the browser 210, the screen forming unit 121 returns app screen information 2000 stored in the app screen information memory unit 160 and the app setup information 1200 included in the app information 1000 stored in the app information memory unit 150.

The app screen information 2000 defines a form of a screen (an app screen) for using a service provided by the app information 1000. The app screen information 2000 is information defining the form of the app screen using, for example, HyperText Markup Language (HTML), Extensible HyperText Markup Language (XHTML), Cascading Style Sheets (CSS), and JavaScript ("JavaScript" is a registered trademark).

The app setup information 1200 defines various setups of the application. For example, defined in the app setup information 1200 is parameter information input by the user, defaulted parameter information and so on from among parameter information used to execute the series of process. Further, defined in the app setup information 1200 is an input item used by the user to input the parameter information in the app screen, display information (e.g., application name) on an app screen, and so on. The app setup information 1200 is information in which various setups of the application are set using JavaScript Object Notation (JSON) or the like.

With this, the app screen for using a service provided by the service providing system 10 is displayed on the browser 210 of the apparatus 20.

The app executing unit 122 sends an execution request to execute the application (the app information 1000) to the input-output service processing unit 110 in response to a request from the browser 210.

The document service unit 130 executes a predetermined process included in the series of processes (the process flow) based on the process flow information 1100. The document service unit 130 includes an OCR processing unit 131 and a mail delivering unit 132.

The OCR processing unit 131 performs an OCR process for an electronic file. The mail delivering unit 132 creates a mail to which the electronic file, and delivers the mail to a designated mail address.

The document service unit 130 may further include various function units such as a compression and decompression processing unit for compressing and decompressing the electronic file and a data format converting unit for converting the data format of the electronic file.

The user uses the browser 310 of the PC terminal 30 to perform a process of registering the application as the portal service unit 140. The portal service unit 140 includes a UI providing unit 141 and an app registering unit 142.

The UI providing unit 141 returns the portal screen information stored in the portal screen information memory unit 170 in response to the request from the browser 310. Here, the portal means a web site through which the application can be registered using the browser 310.

The portal screen information 3000 defines various screens such as a top screen (a portal top screen) of the portal and the application registration screen. The portal screen information 3000 defines various screens using the browser 210 such as HTML, XML, CSS, and JavaScript.

With this, the portal top screen and the application registration screen are displayed on the PC terminal 30 by the browser 310. Therefore, the user of the PC terminal 30 can register the application (the app information 1000) through the application registration screen.

The app registering unit 142 requests the app administering unit 111 to register the application (the app information 1000) in response to a request from the UI providing unit 141. Said differently, the app registering unit 142 requests the app administering unit 111 to register the application when a registration operation to register the application is done on the application registration screen.

The app information memory unit 150 stores app information 1000. The app information 1000 is stored in the app information memory unit 150 in association with the app ID for identifying the app information 1000. The app ID is identification information included in the Uniform Resource Locator (URL) of the app information 1000 or the URL of the app information 1000, for example.

Here, the app information 1000 includes process flow information 1100 and app setup information 1200. The app information 1000 providing the scan translation service includes process flow information 1100 defining the series of processes that implemlents the service and app setup information 1200 defining the various setups of the app information 1000. Hereinafter, the app information 1000 providing the scan translation service is represented as the "scan translation application".

Here, the app information 1000 may include at least two pieces of process flow information 1100 and at least two pieces of app setup information 1200.

The process flow information 1100 defines the series of processes (the process flow) substantializing the service provided by the app information 1000 as described above. The process flow information 1100 is described in detail later.

The app setup information 1200 defines various setups of the application (the app information 1000) as described above. The app setup information 1200 is described in detail later.

The app information memory unit 160 stores app screen information 2000. The app screen information 2000 is stored in the app screen information memory unit 160 in association with the app ID.

The portal screen information memory unit 170 stores portal screen information 3000. The portal screen information 3000 is stored in the portal screen information memory unit 170 in association with URL of the portal top screen, the application registration screen, or the like.

The input-output service processing unit 110, the web service processing unit 120, the document service unit 130, the portal service unit 140, and so on may respectively be implemented by mutually different information processing apparatuses.

Figure 5:
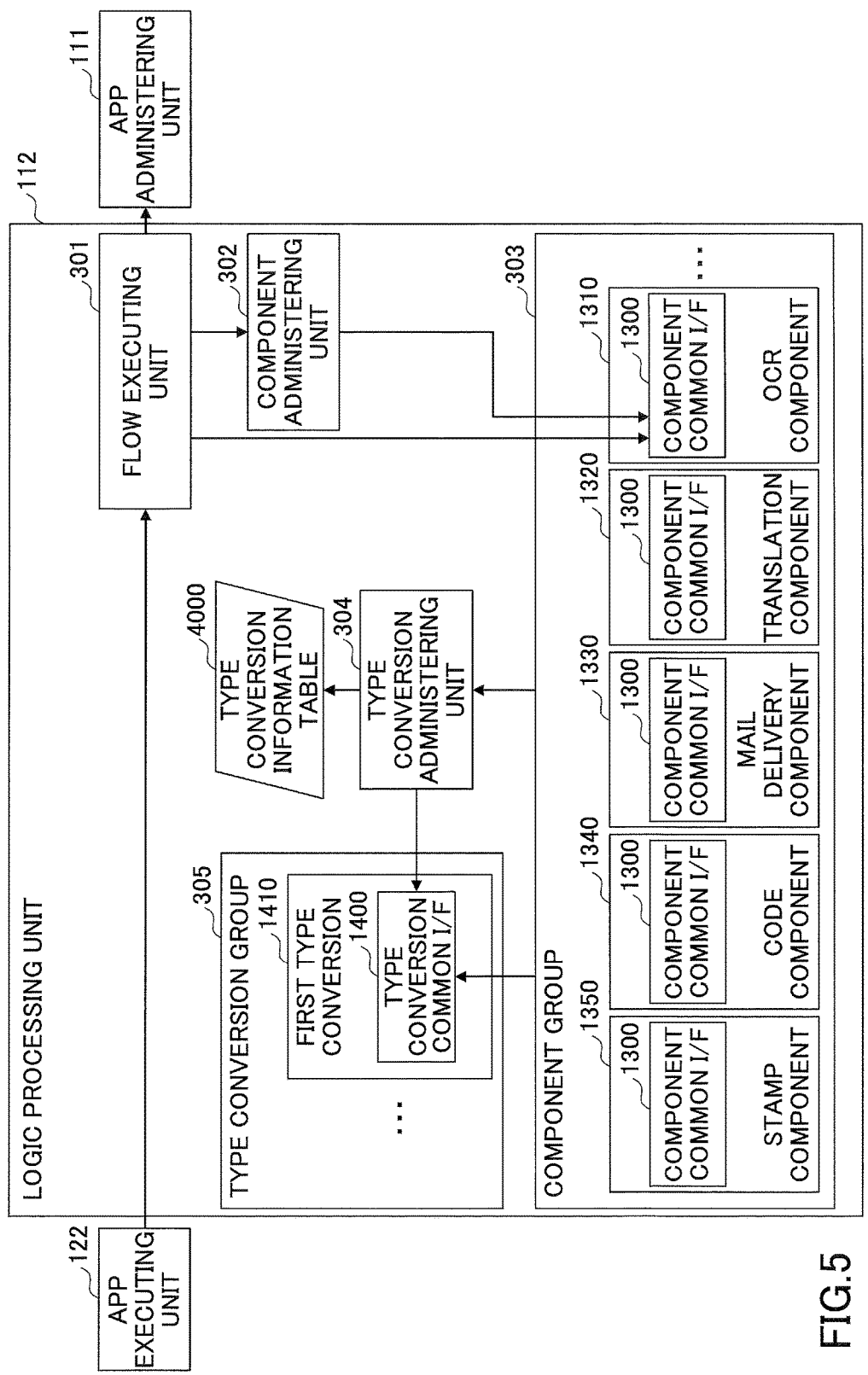
FIG. 5 is a diagram illustrating a functional structure of an example of a logic processing unit of the first embodiment.

Referring to FIG. 5, a detailed functional structure of the logic processing unit 112 is described. FIG. 5 is a diagram illustrating a functional structure of an example of a logic processing unit of the first embodiment.

Referring to FIG. 5, the logic processing unit 112 includes a flow executing unit 301, a component administering unit 302, a component group 303, a type conversion administering unit 304, and a type conversion group 305. Further, the logic processing unit 112 includes the type-conversion information table 4000.

When the flow executing unit 301 receives an execution request to execute the application from the app executing unit 122, the flow executing unit 301 acquires the process flow information 1100 from the app administering unit 111. The flow executing unit 301 executes the series of processes (the process flow) based on the process flow information 1100 accquired from the app administering unit 111.

Here, the series of processes based on the process flow information 1100 is executed by combining components for executing processes included in the series of process. The component is implemented by a program, a module, and so on, which are provided to substantialize a process performing a predetermined function. For example, the component is defined by a class, a mathematical function, and so on.

The component administering unit 302 administers the component. In response to the request from the flow executing unit 301, the component administering unit 302 generates the component and returns the generated component to the flow executing unit 301. Here, the generation of the component means that the component defined by, for example, the class, the mathematical function, or a like is deployed on the memory (for example, the RAM 14).

The component group 303 is a set of the components. The component group 303 includes an OCR component 1310, a translation component 1320, a mail delivery component 1330, a code component 1340, and a stamp component 1350.

The OCR component 1310 is provided to undergo an OCR process for the electronic file (an image file). The OCR component 1310 requests the OCR processing unit 131 of the document service unit 130 to perform an OCR process so as to perform the OCR process for the electronic file.

The translation component 1320 is provided to translate a document of an electronic file (e.g., a text file) described using a predetermined language to another language. The mail delivery component 1330 is provided to undergo a mail delivery to a designated mail address. The mail delivery component 1330 requests a mail delivery process delivers a mail to a designated mail address when the mail delivering unit 132 of the document service unit 130 requests a mail delivery process.

The code component 1340 is provided to create a quick response (QR) code (the "QR code" is a registered trademark), into which information (e.g., a character string) designated as a parameter, is embedded. The code to be created by the code component 1340 is not limited to the QR code and may be various codes such as a bar code.

The stamp component 1350 is provided to superpose a code such as a QR code on an electronic file such as an image file and a Portable Document Format (PDF) file.

As described, each component executes a process of performing the predetermined function. The component group 303 includes various components such as an encoding and decoding component for encoding and decoding the electronic file and a compression component for compressing the electronic file in addition to the above component.

Each component included in the component group 303 includes a component common I/F 1300. The component common I/F 1300 is an application programming interface (API) defined for each of these components in common, and includes an API for generating the component and another API for requesting the component to perform the process.

As described, it is possible to localize an influence caused by the addition of the component when each component includes the component common interface (I/F) 1300. Said differently, the component can be added without influencing the flow executing unit 301, the component administering unit 302, and so on. Therefore, a development man-hour accompanied by an addition (an addition or the like of the component for performing the function) of a predetermined function can be reduced in the service providing system 10 of the first embodiment.

The type conversion administering unit 304 administers the type conversion of the data type. The data type which can be handled by each of the components is previously determined. Therefore, the type conversion administering unit 304 generates the type conversion defined in the type conversion group 305 by referring to the type-conversion information table 4000 in response to a request from the component.

The type conversion administering unit 304 requests to execute a type conversion process for the generated type conversion. The type conversion is implemented by a program, a module, and so on, which are provided to perform the type conversion of the data type. For example, the type conversion is defined by a class, a mathematical function, and so on. Here, the generation of the type conversion means that the type conversion defined by, for example, the class, the mathematical function, and so on are deployed on the memory (for example, the RAM 14).

The data type includes a data type of "InputStream" indicative of stream data, a data type of "LocalFilePath" indicative of a path (an address) of the electronic file stored in the memory device or the like, and a data type of "File" indicative of an entity of the electronic file.

Referring to FIG. 6, the type-conversion information table 4000 is described in detail. FIG. 6 is a diagram illustrating an example of a type-conversion information table 4000.

Type-conversion information 4000 stored in the type-conversion information table 4000 includes data items of a data type before conversion, a data type after conversion, and a type conversion to be generated. Said differently, the type conversion information stored in the type-conversion information table 4000 is information, in which the data type before conversion, the data type after conversion, and the type conversion to be generated are associated for each of the data type before conversion and the data type after conversion.

The type conversion group 305 is a set of the type conversions. The type conversion group 305 includes a first type conversion 1410 for converting the data type of "InputStream" to the data type of "LocalFilePath". For example, the type conversion group 305 includes a second type conversion for converting the data type of "InputStream" to a data type of "File" or the like in addition to the first type conversion.

Further, each of the type conversions included in the type conversion group 305 a type conversion common I/F 1400. The type conversion common I/F 1400 is an API defined for each type conversion in common, and includes an API for generating the type conversion and an API for performing the type conversion process of the type conversion.

As described, it is possible to localize an influence caused by the addition of the type conversion when each type conversion has the type conversion common I/F 1400. Said differently, it is possible to add the type conversion without influencing the type conversion administering unit 304 or the like. Therefore, the service providing system 10 of the first embodiment can reduce the man-hour for a development caused by the addition of the type conversion or the like.

Figure 7:
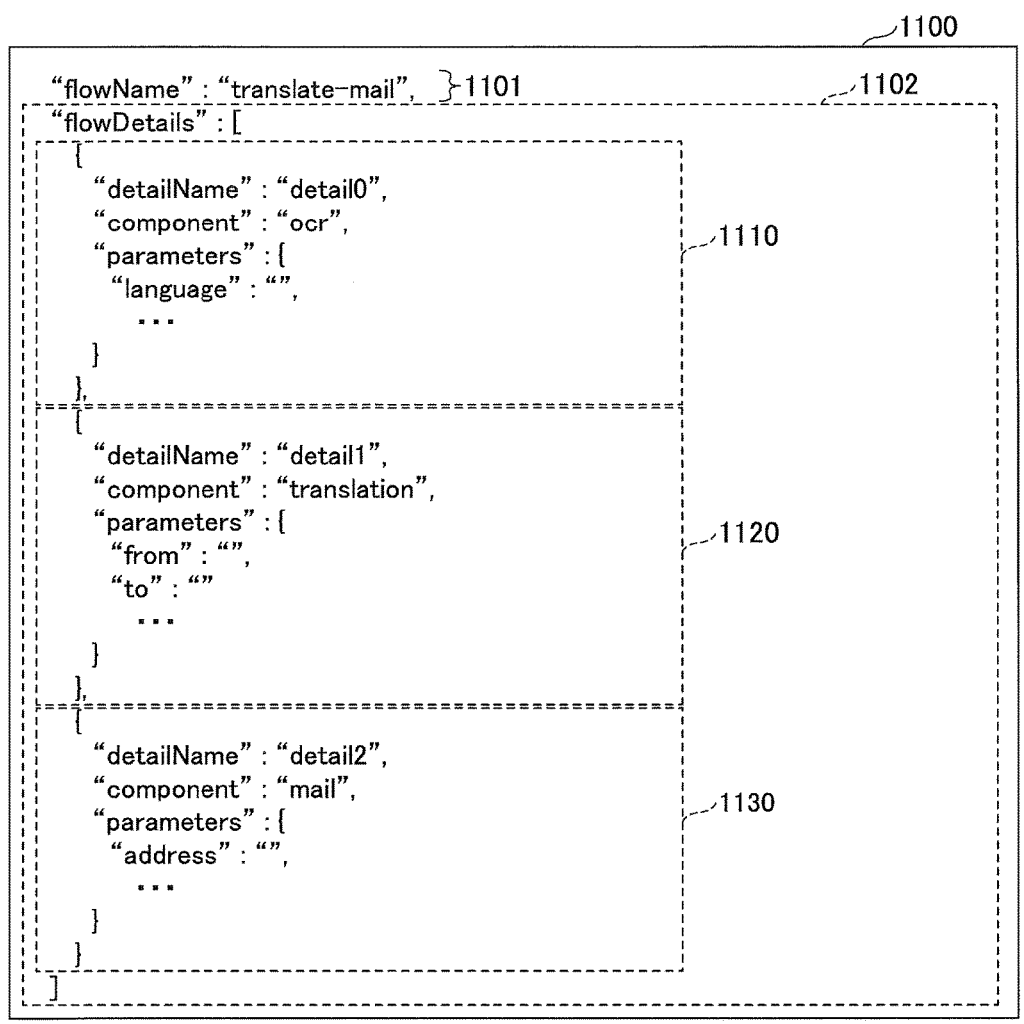
FIG. 7 is a diagram illustrating an example of process flow information of the first embodiment.

Referring to FIG. 7, the process flow information 1100 included in the app information 1000 for providing the scan translation service is described. FIG. 7 is a diagram illustrating an example of process flow information 1100 of the first embodiment.

Referring to FIG. 7, the process flow information 1100 is provided to define the series of processes (the process flow) substantializing the scan translation service.

Referring to FIG. 7, the process flow information 1100 includes a flow name 1101 for identifying the process flow information 1100 and a detailed flow 1102, in which process contents of the processes included in the process flow are defined.

The detailed flow 1102 includes detailed process definitions 1110, 1120, and 1130, respectively defining processes included in the process flow. Each of the detailed process definitions 1110, 1120, and 1130 includes "detailName" indicating a detailed process name for identifying the detailed process definition, "component" indicating a component name of a component for executing the processes, and "parameters" defining parameter information with respect to the component.

Specifically, "detail0" is defined in "detailName" of the detailed process definition 1110. Further, a component name of the OCR component 1310 of "ocr" is defined in "component" of the detailed process definition 1110. Furthermore, parameter information and so on of a parameter name of "language" is defined in "parameters" of the detailed process definition 1110.

The parameter information of a parameter name "language" is provided to set the language (e.g., "Japanese" or "English") for the OCR process as a parameter value.

Specifically, "detail1" is defined in "detailName" of the detailed process definition 1120. Further, a component name "translation" of the translation component 1320 is defined in "component" of the detailed process definition 1120. Furthermore, parameter information of a parameter name of "from", parameter information of a parameter name of "to", and so on are defined in "parameters" of the detailed process definition 1110.

The parameter information of the parameter name "from" is provided to set the language (e.g., "English") for a translation source as a parameter value. The parameter information of the parameter name "to" is provided to set the language (e.g., "Japanese") for a translation destination as the parameter value.

Specifically, "detail2l" is defined in "detailName" of the detailed process definition 1130. Further, a component name "mail" of the mail delivery component 1330 is defined in "component" of the detailed process definition 1130. Furthermore, parameter information and so on of a parameter name of "address" is defined in "parameters" of the detailed process definition 1130.

The parameter information of the parameter name "address" is provided to set the mail address of a mail sending destination as a parameter value.

An execution order of the processes defined in each of the detailed process contents is defined so as to start from the top of the detailed flow 1102 and are sequentially executed. Said differently, the series of processes based on the process flow information 1100 is executed the process defined in the detailed process definition 1110, the process defined in the detailed process definition 1120, and the process defined in the detailed process definition 1130 in this order. However, the series of processes is not limited to this order, and information indicative of the execution order of the processes may be defined in the process flow information 1100.

Further, referring to FIG. 7, the parameter values of each parameter information are not set. However, a default parameter value may be set.

<Detailed Process>

Figure 8:
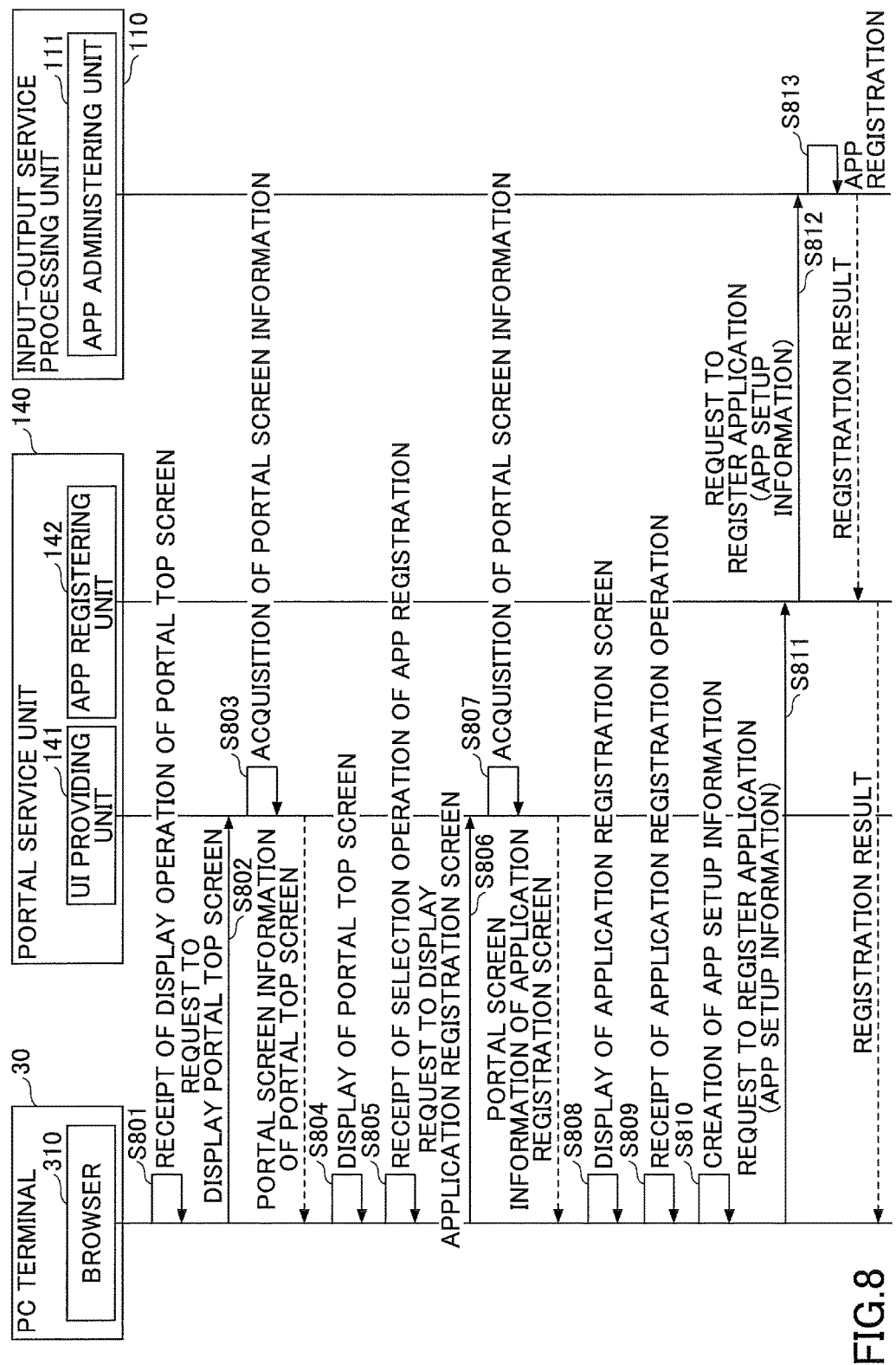
FIG. 8 is a sequence chart of an example of a registration process to register an application of the first embodiment.

Described next is a detailed process of the information processing system 1 of the first embodiment. Referring FIG. 8, described next is a process in which the user of the PC terminal 30 registers the scan translation application in the service providing system 10. FIG. 8 is a sequence diagram illustrating an example of a registration process to register the application.

At first, the browser 310 of the PC terminal 30 receives an operation (a display operation of a portal top screen) to cause the portal top screen to be displayed (step S801). For example, the user of the PC terminal inputs the URL of the portal top screen into an address bar of the browser so as to display the portal top screen.

After the browser 310 of the PC terminal 30 receives the display operation for the portal top screen, the browser 310 sends a display request to display the portal top screen to a UI providing unit 141 of a portal service unit 40 (step S802).

When the UI providing unit 141 of the portal service unit 140 receives an acquisition request to acquire the portal top screen, the UI providing unit 141 acquires portal screen information 3000 of the portal top screen from the portal screen information memory unit 170 (step S803). The UI providing unit 141 returns the portal screen information stored in the portal screen information memory unit 170 in response to the request from the browser 310.

Figure 9:
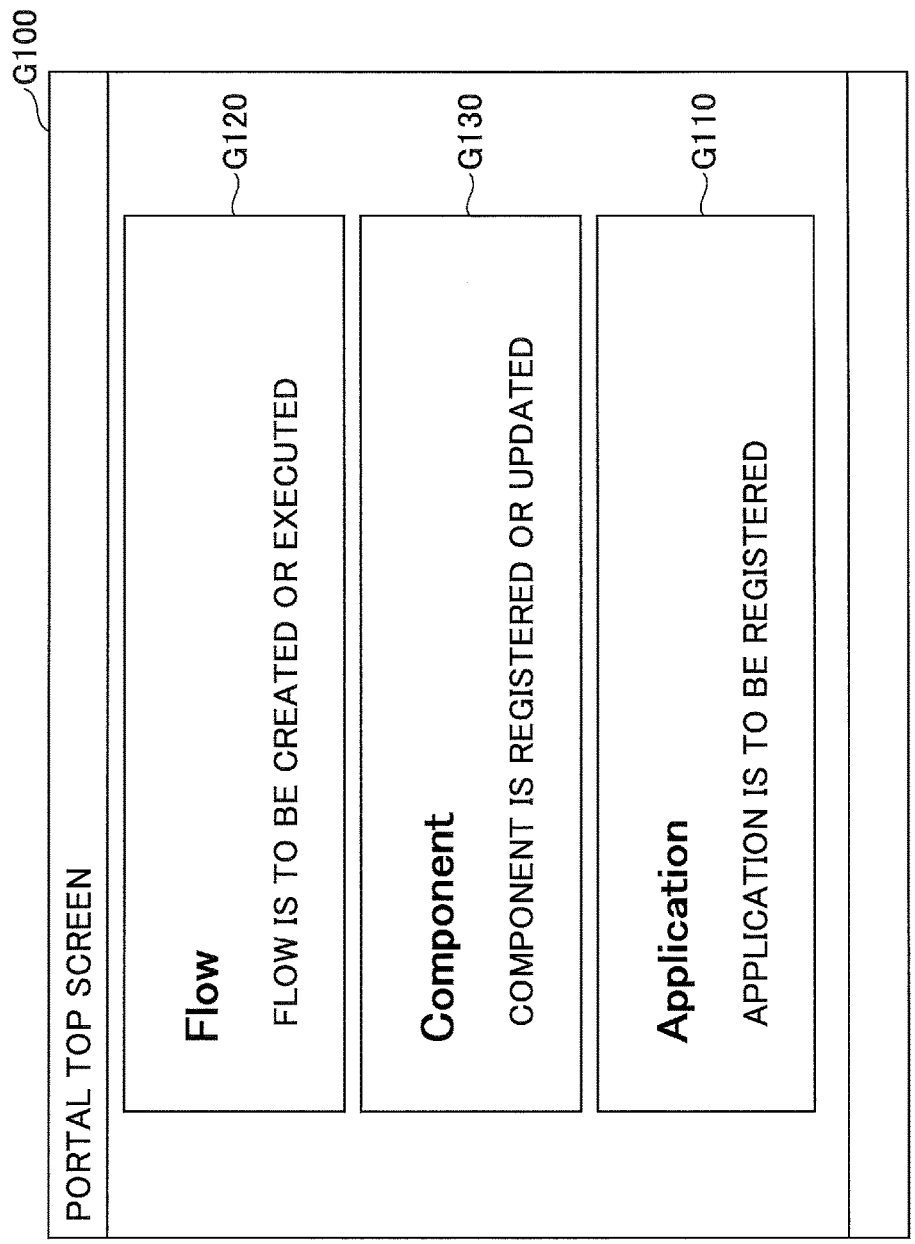
FIG. 9 illustrates an example of a portal top screen.

After the browser 310 of the PC terminal 30 receives the portal screen information 3000, the browser 310 displays a portal screen G100 based on the portal screen information 3000 as illustrated in FIG. 9 (step S804).

Referring to FIG. 9, the portal top screen G100 is a top screen of a portal and includes an "Application" button for registering the application. Hereinafter, the user operates (a selection operation of app registration) to select the "Application" button on the portal top screen G100 illustrated in FIG. 9.

A "Flow" button G120 for creating the process flow information 110 and a "Component" button G130 for registering the component are included on the portal top screen G100 illustrated in FIG. 9. As described, the portal top screen G100 can perform creation and execution of the process flow, and registration and update of the component in addition to the registration of the application.

The browser 310 of the PC terminal 30 receives a selection operation of selecting the registration of the app by the user (step S805).

After the browser 310 of the PC terminal 30 receives the selection operation of the app registration, the browser 310 sends a display request to display the portal top screen to a UI providing unit 141 of a portal service unit 40 (step S806).

When the UI providing unit 141 of the portal service unit 140 receives the display request to display the application registration screen, the UI providing unit 141 acquires portal screen information 3000 of the application registration screen from the portal screen information memory unit 170 (step S807). Then, the UI providing unit 141 returns the portal screen information acquired from the portal screen information memory unit 170 to the browser 310.

Figure 10:
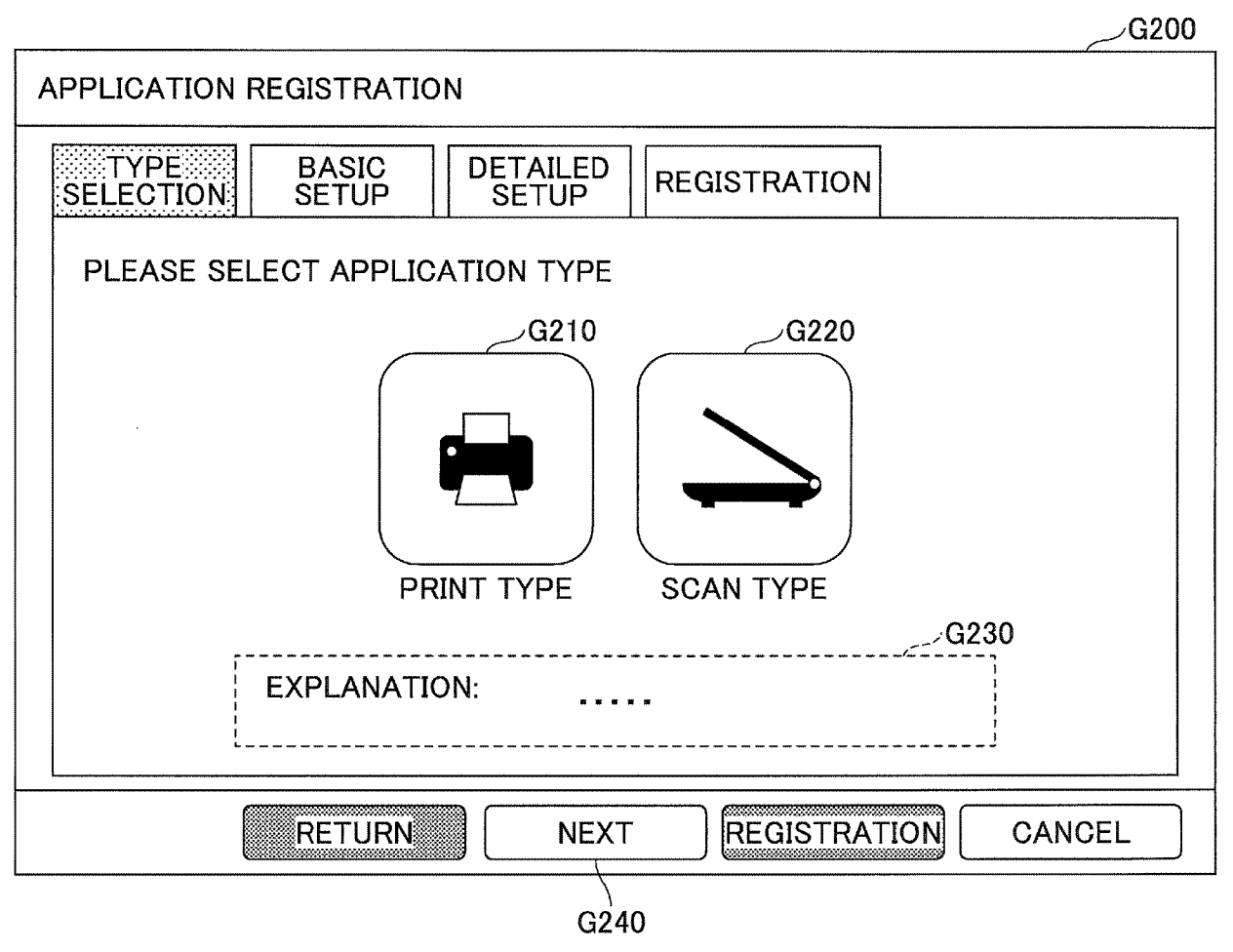

After the browser 310 of the PC terminal 30 receives the portal screen information 3000, the browser 310 displays an application registration screen G200 as illustrated in FIG. 10 based on the portal screen information 3000 (step S808).

Hereinafter, referring to FIGS. 10 to 14, description is given of a case where the user performs the registration operation to register the application.

Referring to FIG. 10, the application registration screen G200 is provided to select the type of the application registered by the user.

A "print" button G210 for registering an application of a print type and a "scan" button G220 for registering an application of scan type are included in the application registration screen G200 illustrated in FIG. 10. A "FAX" button for registering an application of a fax type and a "mail receiving" button for registering an application of mail receiving type are may be included in the application registration screen G200 illustrated in FIG. 10.

A "next" button G240 or the like is included in an application registration screen G200 illustrated in FIG. 10.

In the application registration screen G200 illustrated in FIG. 10, when the user select either the "print" button G210 or the "scan" button G220, a corresponding explanation of either the print type or the scan type is displayed in an explanation column G230.

The print type corresponds to an application of causing the electronic file indicative of the execution result of the series of processes to be printed by the image forming apparatus or the like. Meanwhile, the scan type corresponds to an application of causing the electronic file generated by scanning using the image forming apparatus or the like to be input and the series of process, to which the electronic file to be input, to be executed.

The fax type corresponds to an application of causing the electronic file indicative of the execution result of the series of processes to undergo the fax transmission by the image forming apparatus or the like. Meanwhile, the mail receiving type corresponds to an application of causing the electronic file attached to a mail received by the image forming apparatus or the like to be input and the series of process, to which the electronic file to be input, to be executed.

Hereinafter, the user selects a "scan" button G220 on the application registration screen G200 illustrated in FIG. 10 and performs an operation of pushing a "next" button G240. Then, the browser 310 receives the operation and displays an application registration screen G300 illustrated in FIG. 11, for example.

Referring to FIG. 11, the application registration screen G300 is provided to set the basic information of the application.

An "app name" input setup column G310 for setting the name of the application and a "design template" selection column G320 for selecting a screen form of the app screen are included in the application registration screen G300 illustrated in FIG. 11. An "authentication" selection column G330 for selecting authentication at a time of using the application and a "language for display" selection column G340 for selecting the language for display of the app screen are included in the application registration screen G300 illustrated in FIG. 11. A "next" button G350 for transiting to the next screen is included in the application registration screen G300 illustrated in FIG. 11.

In the "design template" selection column G320, a "single screen style", by which an app screen can be displayed on one screen, a "wizard style", by which the app screen is displayed in an interactive style, or the like can be selected. Further, in the "authentication" selection column G330, "none" indicating that the authentication is not used, "user authentication" indicating that the authentication is used, or the like can be selected.

Hereinafter, the user selects a "next" button G350 on the application registration screen G300 illustrated in FIG. 11, inputs the application name and various selection, and performs an operation of pushing a "next" button G350. Then, the browser 310 receives the operation and displays an application registration screen G400 illustrated in, for example, FIG. 12.

Figure 12:
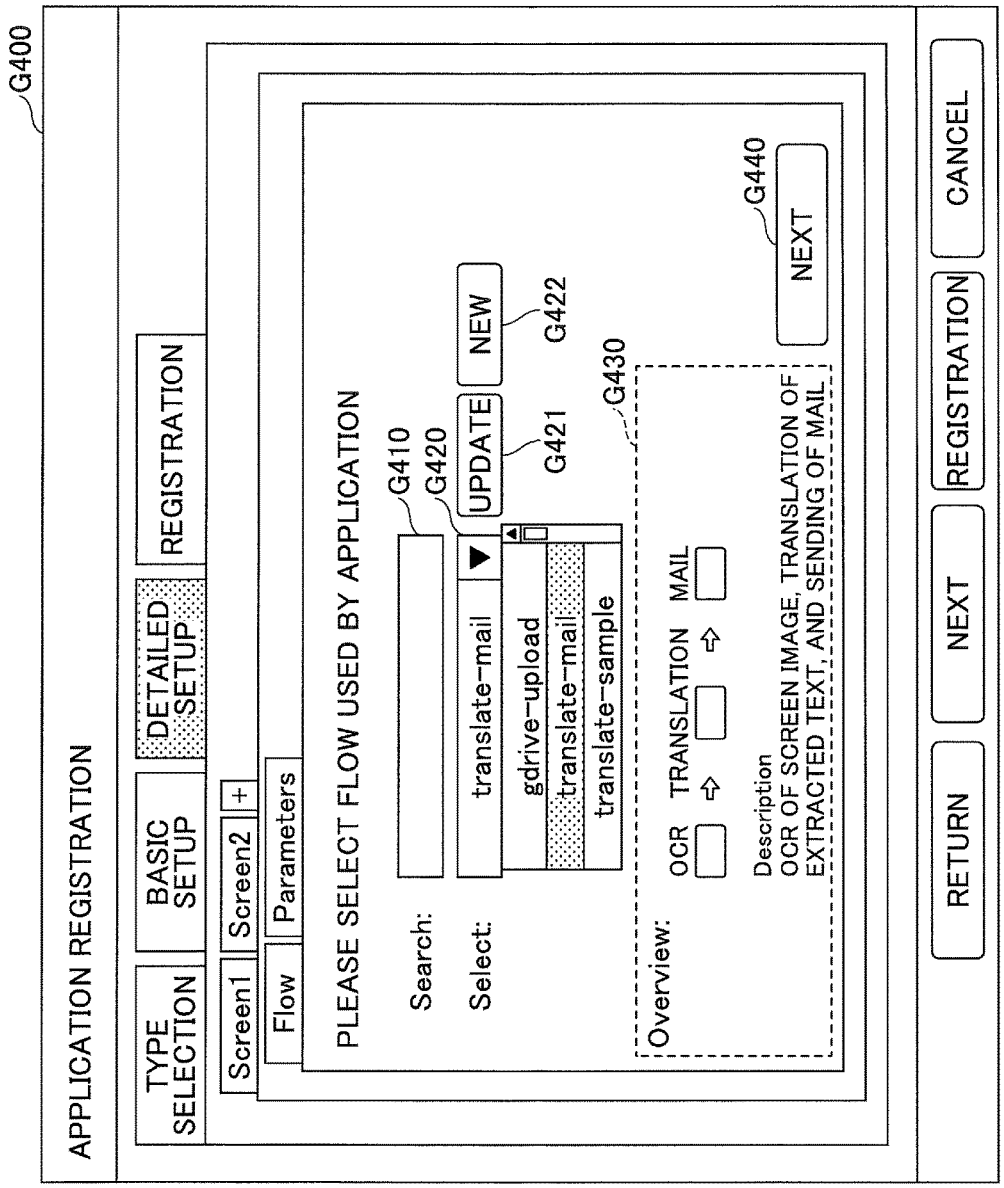
FIG. 12 illustrates another example of the application registration screen of the first embodiment.

The application registration screen G400 illustrated in FIG. 12 is a screen for setting the series of processes (the process flow) to the application to be registered by the user as detailed information of the application.

The application registration screen G400 illustrated in FIG. 12 includes a search column G410 for searching a flow name of process flow information 1100 stored in the app information memory unit 150, and a flow selection column G420 for selecting the flow name. After the user inputs a desirable flow name into the search column G410, the user can select the desirable flow name from the flow selection column G420.

Further, the application registration screen G400 illustrated in FIG. 12 includes a summary display column G430 for displaying a summary of the series of processes based on process flow information 1100 of the flow name selected in the flow selection column G420, and a button G240 of "NEXT" for performing transition to the next screen.

An "update" button G421 for editing and updating the process flow information 1100 of the flow name selected in the flow selection column G420 and a "new" button G422 for newly creating the process flow information 1100 are included in the application registration screen G400 illustrated in FIG. 12. The user can push down the "update" button G421 so as to edit and update the process flow information 1100 of the flow name selected in the flow selection column G420. Further, the user can push down the "new" button G422 so as to create process flow information 1100 and select the flow name of the created process flow information 1100 in the flow selection column G420.

Hereinafter, the user selects a flow name "translate-mail" in the flow selection column G420 and performs an operation of pushing down a "NEXT" button G440. Then, the browser 310 receives the operation and displays an application registration screen G500 illustrated in, for example, FIG. 13.

The application registration screen G500 illustrated in FIG. 13 is provided for the user to set the parameter information of the series of processes (the process flow) set in the application registration screen G400 illustrated in FIG. 12 as detailed information of the application.

A "component" selection column G510 for selecting the component executing various processes from among the series of processes is included in the application registration screenG500 illustrated in FIG. 33. A "parameter information" setup column" G520 for setting the parameter of the component selected in the "component" selection column G510 and a "NEXT" button G530 for performing transition to the next screen are included in the application registration screen G500 as illustrated in FIG. 13.

After the user selects a desirable component in the "component" selection in the "component" selection column G510, the user can set various setups of the parameter information in step G520. For example, in a case where the user selects the translation component 1320 in the "component" selection column G510, various setups of the parameter information used by the translation component 1320 can be performed in the "parameter information" setup column G520.

Specifically, the various setups of the parameter information include setup items such as "select", "displayname", "name", "type", "default", and "input type". The parameter name of the parameter information is set to the setup item "name". The data format which can be set as a parameter value is set to the setup item "type". The parameter value set as default is set to the setup item "default".

Further, it is set whether the parameter value of the parameter information is input by the user (a user of a service) or not. As to the parameter information including the setup item "select" having the check mark, the user (the user of the service) can input the parameter value through the app screen. Meanwhile, as to the parameter information including the setup item "select" without having the check mark, the user (the user of the service) cannot input the parameter value through the app screen, and the parameter value set as the setup item "default" is used.

As to a setup item "input type", an input means on the app screen is set for the parameter information, in which a setup item "select" has a check mark. For example, an input means "list-radio-button" for selecting a desirable parameter value from among a view of parameter values, an input means "text" for directly inputting the parameter value, and so on can be set to the setup item "input type". Further, for example, in addition to these, an input means for inputting an coordinate on the screen, an input means for selecting a desirable folder or a desirable file, or the like may be selected for the setup item "input type".

Further, a display name of an input item (an item causing the parameter value to be input) displayed on the app screen is set to the setup item "displayname. The display name of the language selected in the "language for display" selection column G340 of the application registration screen G300 illustrated in FIG. 11 may be set to the setup item "displayname". Said differently, in a case where "Japanese" and "English" are selected in the "language for display", a Japanese display name "translation source" and an English display name "Source Language" can be set to the setup item "displayname".

With this, the user can set whether the parameter value of parameter information used by each component and an input means to input the parameter value.

Hereinafter, the user sets the parameter information used by each component and pushes a button "NEXT" G530. Then, the browser 310 receives the operation and displays an application registration screen G600 illustrated in, for example, FIG. 14.

An application registration screen G600 illustrated in FIG. 14 is a screen, by which the user checks various information (app setup information) set in FIGS. 10 to 13.

Referring to FIG. 14, the application registration screen G600 includes an "app setup information" display column G610 and a "registration" button G620. The user can check the various information set in FIGS. 10 to 13 using the "app setup information" display column G610.

Here, the user checks the app setup information in the "app setup information" display column G610 and performs an operation (a registration operation) of pushing down a "registration" button G620. Then, the browser receives the registration operation to register the application (step S809).

When the browser 310 receives a registration operation to register the application, the browser 310 creates the app setup information 1200 (step S810).

Figure 15:
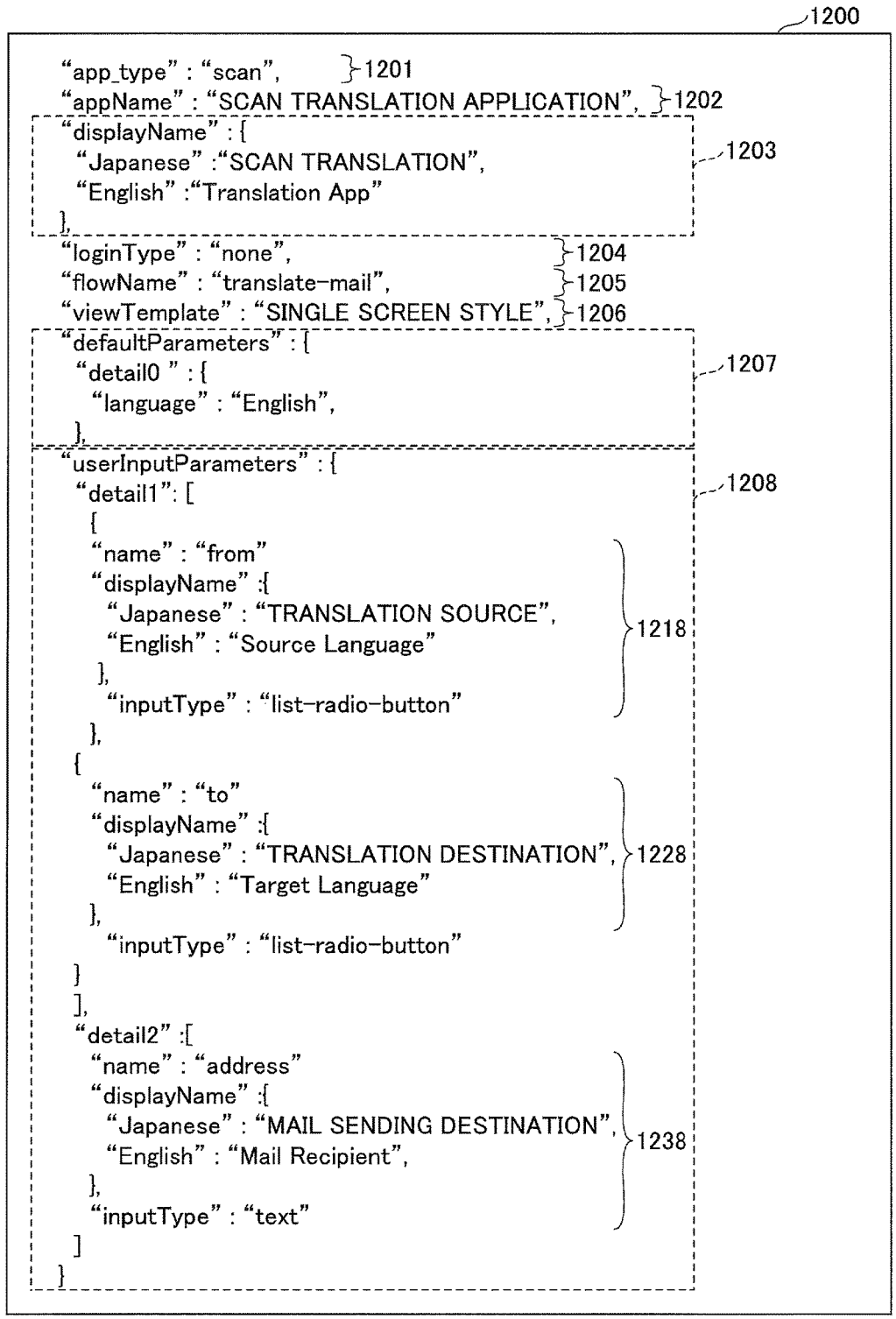
FIG. 15 illustrates an example of app setup information of the first embodiment.

Referring to FIG. 15, described next is the app setup information.

FIG. 15 illustrates an example of the app setup information 1200 of the first embodiment.

Referring to FIG. 15, the app setup information 1200 includes an app type 1201, an app name 1202, an app display name 1203, an authentication type 1204, and a flow name 1250. Referring to FIG. 15, the app setup information 1200 includes a design template type 1206, a default parameter 1207, and a user input parameter 1208.

The app type 1201 is a type of an application selected in the application registration screen G200 illustrated in FIG. 10. Referring to FIG. 15, "app_type":"scan" indicating that the application type is a scan type is defined.

The app name 1202 is the app name input into the "app name" input setup column G310 of the application registration screen G300. Referring to FIG. 15, "appName":"scan translation application" indicating that the app name is "scan translation application" is defined.

The app display name 1203 is the application name (a title) displayed on the app screen. In the example illustrated in FIG. 10, it is defined to display "scan translation" in Japanese and "Translation App" in English.

The authentication type 1204 is authentication selected in the "authentication" selection column G330 of the application registration screen G300 illustrated in FIG. 11. In the example illustrated in FIG. 15, "loginType": "none" indicating that the authentication is not performed is defined.

The flow name 1205 is the flow name selected in the flow selection column G420 of the application registration screen G400 illustrated in FIG. 12. In the example illustrated in FIG. 15, "flowName": "translate-mail" is defined to indicate that the flow name is "translate-mail".

The design template type 1206 is a display style selected in the "design template" selection column G320 of the application registration screen G300 illustrated in FIG. 11. In the example illustrated in FIG. 15, "viewTemplate": "single screen style" is defined to indicate that the app screen is displayed in a single screen style.

The default parameter 1207 defines parameter information, for which the user does not input the parameter value in the app screen. Said differently, the default parameter 1207 defines parameter information, for which a check mark is not given to the setup item "select" in the "parameter information" setup column G520 of the application registration screen G500 illustrated in FIG. 13. In the example illustrated in FIG. 15, the parameter information of the parameter name "language" defined in a detailed process name "detail0" (i.e, the detailed process definition 1110 of FIG. 7) is defined to set the default parameter value to be "English".

As described, the parameter information, in which the parameter value is set by default, is defined in the default parameter 1207. Said differently, the parameter information, for which the user does not set the parameter value, is defined in the default parameter 1207.

The parameter information, in which the parameter value is input through the app screen by the user, is defined in the user input parameter 1208. Said differently, the user input parameter 1208 defines parameter information, for which a check mark is given to the setup item "select" in the "parameter information" setup column G520 of the application registration screen G500 illustrated in FIG. 13.

In the example illustrated in FIG. 15, an input definition 1218 indicating that a parameter value of a parameter name "from" defined in a detailed process name "detail1" (i.e., the detailed process definition 1120 of FIG. 7) is defined. Similarly, an input definition 1228 indicating that a parameter value of a parameter name "to" defined in the detailed process name "detail1" (i.e., the detailed process definition 1120 of FIG. 7) is defined.

Similarly, an input definition 1238 indicating that a parameter value of a parameter name "address" defined in a detailed process name "detail2" (i.e., the detailed process definition 1130 of FIG. 7) is defined.

As described, the parameter information, in which the parameter value is input through the app screen by the user, is defined in the user input parameter 1208.

As described, display information (for example, a title) displayed on the app screen, an input item (an item of inputting or selecting the parameter value) to the app screen, an input means to input into the input item, and so on are defined in the app setup information 1200. The parameter information (i.e., the parameter information, into which the parameter value is not input or selected on the app screen), in which the parameter value is set by default, or the like is defined in the app setup information 1200.

The browser 310 creates app setup information 1200, and thereafter a registration request to register an application to the app registering unit 142 of the portal service unit 140 (step S811). The registration request to register the application includes the app setup information 1200 created by step S810.

The app registering unit 142 of the portal service unit 140 receives the registration request, and thereafter sends the registration request to the app administering unit 111 of the input-output service processing unit 110 (step S812).

The app administering unit 111 of the input-output service processing unit 110 receives the registration request to register the application and thereafter registers the application (step S813). Then, the app administering unit 111 returns the registration result to the browser 310.

Said differently, the app administering unit 111 registers the app setup information 1200 included in the registration request and the app ID in association with the app setup information 1200 into the app information memory unit 150. With this, the app information 1000 including the app setup information 1200 and the process flow information 1100 of the flow name defined by the flow name 1205 of the app setup information 1200 is registered in the service providing system 10.

As described, according to the information processing system 1 of the first embodiment, the user can register the application into the service providing system 10 using the PC terminal 30. Further, the information processing system 1 of the first embodiment, the user can set the flow name, the parameter information, and so on using the PC terminal and set the flow name and the parameter information of each component so as to easily register the application (the app information 1000).

Within the information processing system 1 of the first embodiment, for example, a user without having professional knowledge and experiences about a programming language such as a person in charge of a planning can register an application (the app information 1000) serving various services.

Figure 16:
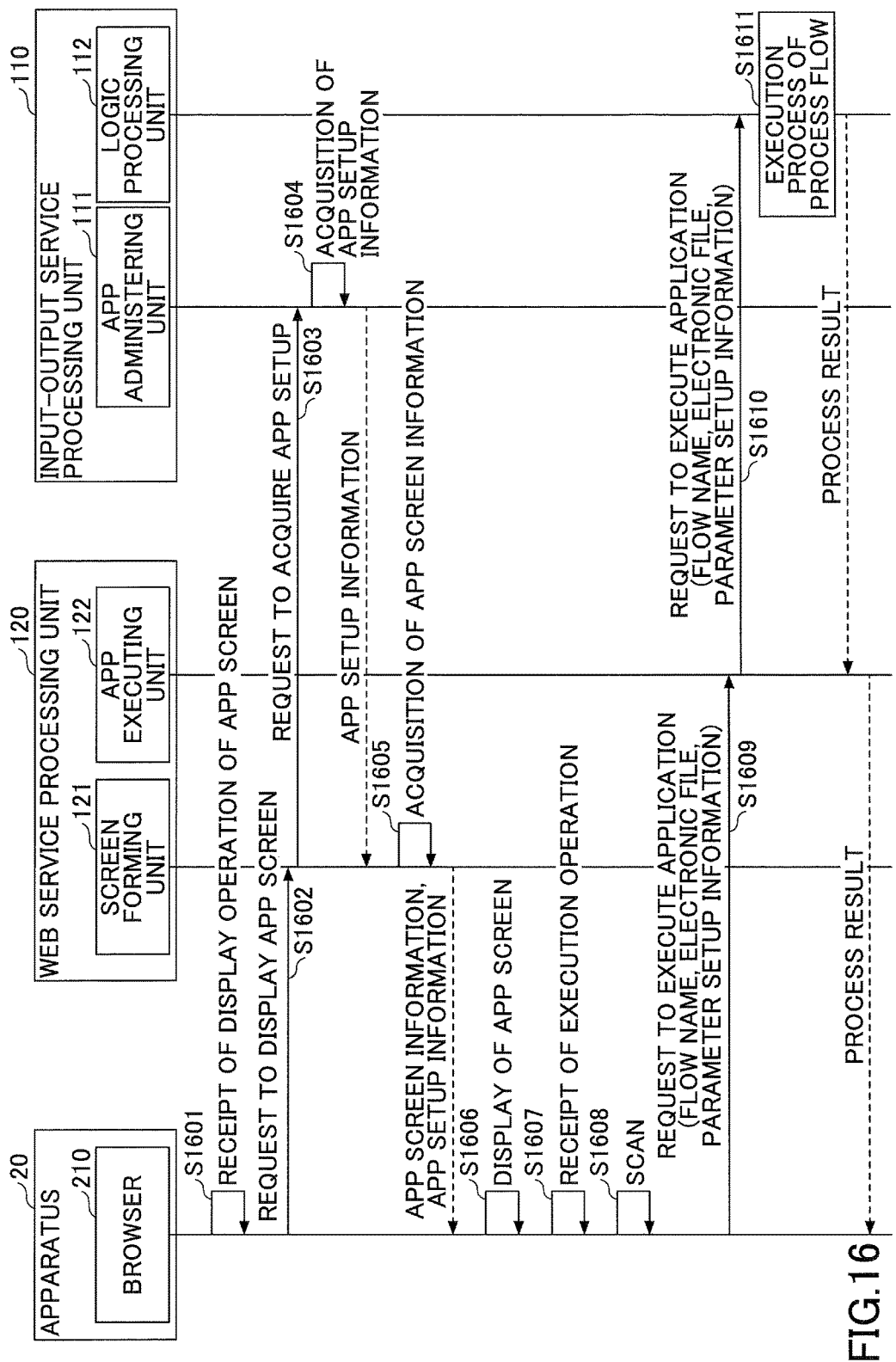
FIG. 16 is a sequence diagram illustrating an example of an overall process in a case where a scan translation service is used.

Referring to FIG. 16, described next is a case where the user of the apparatus 20 uses the scan translation service. FIG. 16 is a sequence diagram illustrating an example of an overall process in a case where the scan translation service is used.

At first, the browser 210 of the apparatus 20 receives an operation (a display operation) for causing the app screen of the scan translation service to be displayed (step S1601). The user of the apparatus 20 inputs the URL of the app screen of the scan translation service to the address bar of the browser 210 to enable a display operation to display the app screen, for example.

The browser 210 of the apparatus 20 receives a display operation to display the app screen of the scan translation service and thereafter sends a display request to display the app screen of the scan translation service to the screen forming unit 121 of the web service processing unit 120 (step S1602). The app ID of the app information 1000 providing the scan translation service is included in the display request to display the app screen of the scan translation service.

The screen forming unit 121 of the web service processing unit 120 receives the display request of the app screen of the scan translation service and thereafter sends an acquisition request to acquire an app setup to the app administering unit 111 of the input-output service processing unit 110 (step S1603). The acquisition request to acquire the app setup includes the app ID of the app information 1000.

The app administering unit 111 of the input-output service processing unit 110 receives the acquisition request to acquire the app setup and thereafter acquires the app setup information 1200 stored in association with the app ID included in the acquisition request from the app information memory unit 150 (step S1604). Further, the app administering unit 111 returns the app setup information 1200 acquired from the app information memory unit 150 to the screen forming unit 121.

Next, the screen forming unit 121 of the web service processing unit 120 acquires the app screen information 2000 stored in association with the app ID of the app information 1000 which provides the scan translation service from the app screen information memory unit 160 (step S1605). The screen forming unit 121 returns the app screen information 2000 acquired from the app screen information memory unit 160 and the app setup information 1200 returned in step S1604 to the browser 210.

Figure 17:
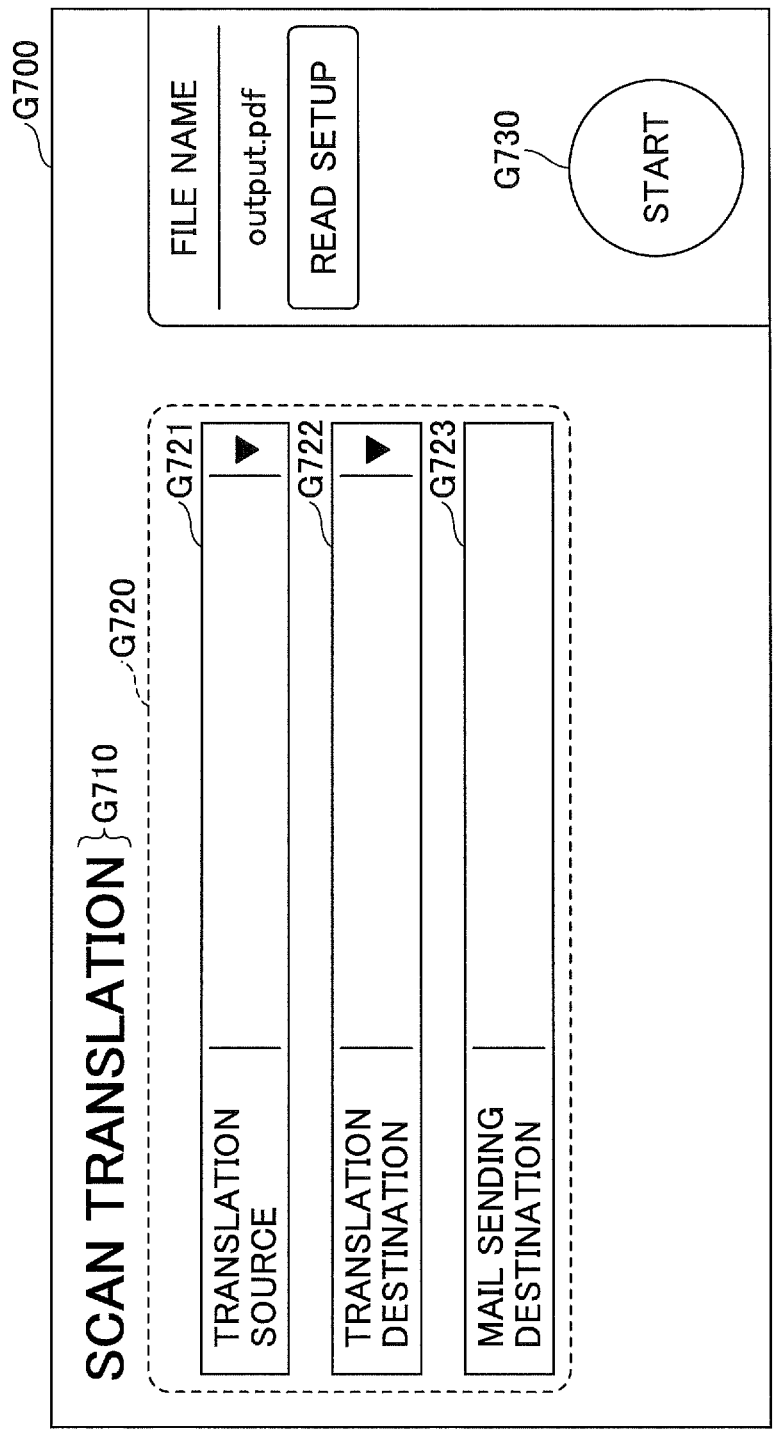
FIG. 17 illustrates an example of an app screen of the scan translation service.

The browser 210 of the apparatus 20 displays an app screen G700 illustrated in, for example, FIG. 17 based on the app screen information 2000 and the app setup information 1200, which are received from the screen forming unit 121 (step S1606).

Here, the app screen G700 illustrated in FIG. 17 is a screen for the user of the apparatus 20 to use the scan translation service.

An app name G710, a parameter input area G720, and a "start" button G740 are included in the app screen G700 illustrated in FIG. 17. A translation source language input column G721, a translation destination language input column G722, and a mail sending destination input column G723 are included in a parameter input area G720.

The app name G710 is displayed based on an app display name 1203 of the app setup information 1200 illustrated in FIG. 15. In a case where an application name (a title) by multiple languages is defined as an app display name 1203, the application name by the language corresponding to the setup of the language in the browser 210 is displayed as the app name G710.

The translation source language input column G721, the translation source destination language input column G722, and the mail sending destination input column G723 are displayed based on the user input parameter 1208 of the app setup information 1200 illustrated in FIG. 15.

Said differently, the translation source language input column G721 is displayed based on the input definition 1218 of the user input parameter 1208. Similarly, the translation destination language input column G722 is displayed based on the input definition 1228 of the user input parameter

1208. Similarly, the mail sending destination input column G723 is displayed based on the input definition 1238 of the user input parameter 1208.

As described, the app name and the parameter input area are displayed on the app screen, on which the user of the apparatus 20 uses the service, based on information defined in the app setup information 1200.

The user may input, on the app screen G700, "English" in the translation source language input column G721, "Japanese" in the translation destination language input column G722, and "abc@abc.co.jp" in the mail sending destination input column G723. The user performs an operation (an execution operation) of pushing down a "start" button G740 on the app screen G700 illustrated in FIG. 17.

Then, the browser 210 of the apparatus 20 receives the execution operation (step S1607). Then, the browser 210 of the apparatus 20 controls the scanner 26 to read the original manuscript so as to generate an electronic file (an image file)(step S1608).

After the electronic file (the image file) is generated, the browser 210 of the apparatus 20 sends an execution request to execute the application to the app executing unit 122 of the web service processing unit 120 (step S1609). The execution request to execute the application includes a flow name "translate-mail" defined in the flow name 1205 of the app setup information 1200, the electronic file generated in the step S1608, and the parameter setup information.

The parameter setup information is parameter information defined in the default parameter 1207 of the app setup information 1200 and parameter information, to which a parameter value is set by the user in the app screen G700.

Specifically, the parameter information defined in the default parameter 1207 is "language": "English". The parameter information, in which the parameter value is set on the app screen G700 by the user, is "from": "English"; "to": "Japanese"; and "address": "abc@abc.co.jp".

The app executing unit 122 of the web service processing unit 120 receives the execution request to execute the application. Thereafter, the app executing unit 122 sends the execution request to the logic processing unit 112 of the input-output service processing unit 110 (step S1610).

Next, the logic processing unit 112 of the input-output service processing unit 110 receives the execution request to execute the application and thereafter performs the execution process of the process flow (step S1611). Said differently, the logic processing unit 112 executes the series of processes based on the process flow information 1100 of the flow name included in the request. The execution process of the process flow is described in detail later.

The logic processing unit 112 returns the process result of the execution process of the process flow through the web service processing unit 120 to the browser 210. Accordingly, the service providing system 10 of the first embodiment can provide the scan translation service.

Figure 18:
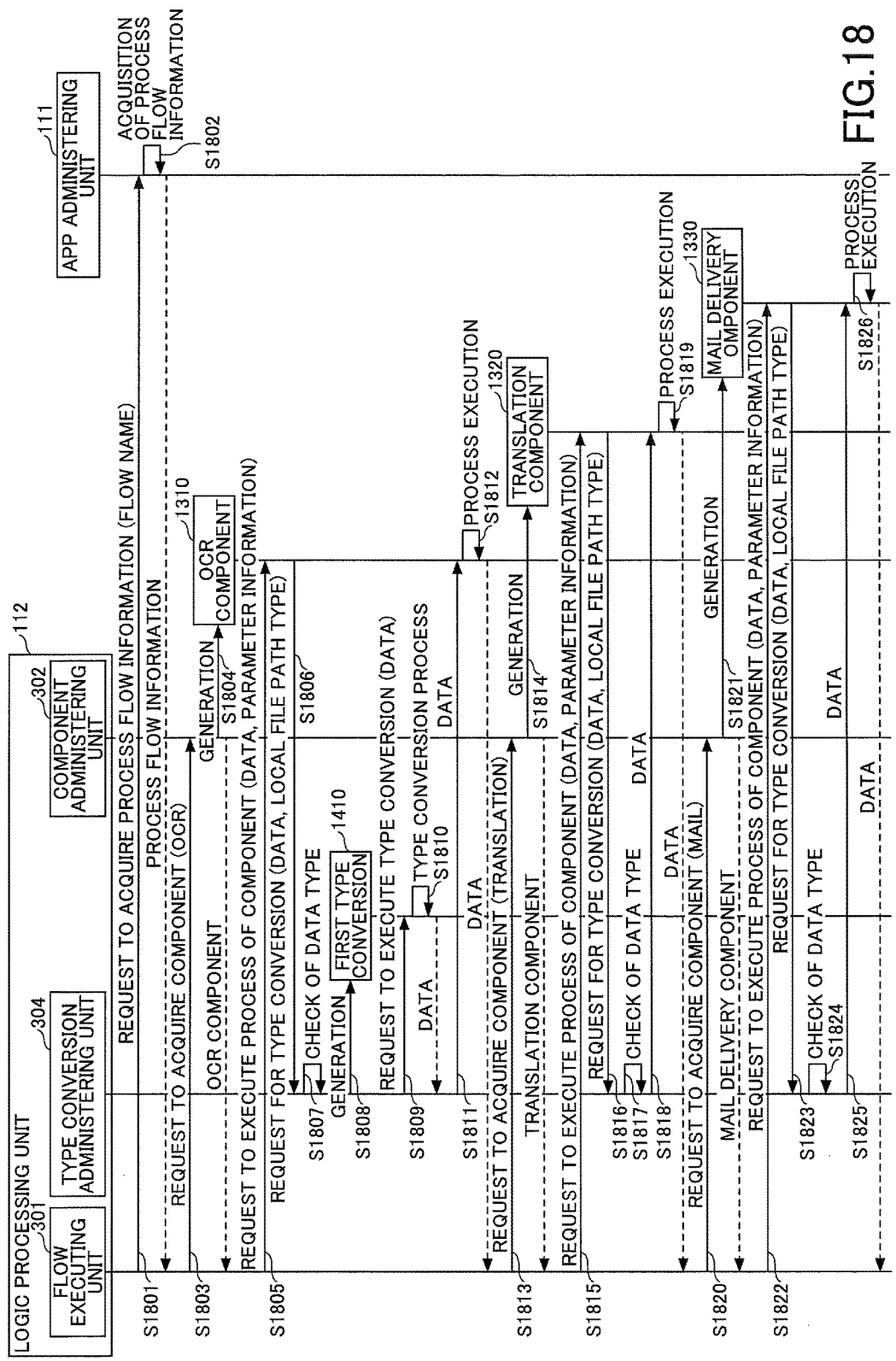
FIG. 18 is a sequence diagram illustrating an example of an execution process of a process flow substantializing a scan translation service.

Referring to FIG. 18, detailed explanation of the execution process to execute the process flow (the process of step S1611 in FIG. 16) is given below. FIG. 18 is a sequence diagram illustrating an example of the execution process of the process flow substantializing the scan translation service.

The flow executing unit 301 receives an execution request to execute the application from the app executing unit 122 and thereafter sends the acquisition request to the app administering unit (step S1801). The acquisition request includes a flow name "translate-mail".

The app administering unit 111 receives the acquisition request of the process flow and thereafter acquires the process flow information 1100 of "translate-mail" from the app information memory unit 150 (step S1802). Further, the app administering unit 111 returns the process flow information 1100 acquired from the app information memory unit 150 to the flow executing unit 301.

Described next is a case where the app administering unit 111 returns the process flow information 1100 illustrated in FIG. 7 to the flow executing unit 301.

Next, the flow executing unit 301 sends an acquisition request to acquire the component based on the process flow information 1100 to the component administering unit 302 (step S1803).

Said differently, the flow executing unit 301 sends the component acquisition request to acquire the component including the component having a component name "ocr", which is defined in "component" included in a detailed process definition 1110 of the process flow information 1100 illustrated in FIG. 7, to the component administering unit 302.

The component administering unit 302 receives the component acquisition request to acquire the component and thereafter generates the component (i.e., the OCR component 1310) having the component name "ocr" (step S1804). The OCR component 1310 can be generated by using an API for generating the component defined in the component common I/F 1330.

Then, the component administering unit 302 returns the generated OCR component 1310 to the flow executing unit 301. Said differently, the component administering unit 302 returns the address in the memory (e.g., the RAM 14), on which the OCR component 1310 is deployed, to the flow executing unit 301.

Next, the flow executing unit 301 sends a component execution request to the OCR component 1310 (step S1805). This execution request includes data and parameter information.

Here, the data is the electronic file received from the browser 210 as a data type "InputStream". Said differently, the flow executing unit 301 requests to execute the process by transferring the electronic file, which is received from the browser 210, simply as "data" (without convincing the data type) to the OCR component 1310. Within the first embodiment, various information such as this electronic file without convincing the data type is simply indicated as the "data".

Further, the parameter information is formed by setting various parameter value of the parameter setup information to the parameter value of various parameter information defined in "parameters" included in the detailed process definition of the process flow information 1100 illustrated in FIG. 7. Said differently, the parameter information is "language":"English".

When the OCR component 1310 receives a component execution request, the OCR component 1310 sends a type conversion request to the type conversion administering unit 304 (step S1806). Here, the type conversion request includes the data and a designation of "LocalFilePath" indicative of the data type, which can be treated by the OCR component 1310.

After the type conversion administering unit 304 receives the type conversion request, the type conversion administering unit 134 checks whether the data type of the data included in the received type conversion request matches the designated data type (step S1807).

Here, the data type of the data included in the received type conversion request is "InputStream" and the designated data type is "LocalFilePath". Accordingly, the type conversion administering unit 304 determines that the data type of the data included in the received type conversion request does not match the designated data type.

Then, the type conversion administering unit 304 refers to the type-conversion information table 4000, and specifies the type conversion for converting "InputStream" to "LocalFilePath" (here, the first type conversion 1410 is specified). Then, the type conversion administering unit 304 generates the specified first type conversion 1410 (step S1808). The type conversion common I/F 1400 is used to generate the first type conversion 1410.

Next, the type conversion administering unit 304 sends a type conversion execution request to execute a type conversion process to the first type conversion 1410 (step S1809). This type conversion execution request includes data.

When the first type conversion 1410 receives the type conversion execution request, the first type conversion 1410 performs a type conversion process of converting the data type of the data included in the type conversion execution request from "InputStream" to "LocalFilePath" (step S1810). The first type conversion 1410 returns the data, of which data type has been converted, to the type conversion administering unit 304.

After the type conversion administering unit 304 receives the data from the first type conversion 1410, the type conversion administering unit 304 sends the data to the OCR component 1310 (step S1811).

After the OCR component 1310 receives the data from the type conversion administering unit 304, the OCR component uses the parameter information to execute the process for the data (step S1812).

Said differently, the OCR component 1310 uses the OCR processing unit 131 to perform an OCR process for the electronic file indicated by data using parameter information "language":"English".

The OCR component 1332A returns data indicative of the electronic file provided with the OCR process to the flow executing unit 301.

Next, the flow executing unit 301 sends an acquisition request to acquire the component based on the process flow information 1100 to the component administering unit 302 (step S1813).

Said differently, the flow executing unit 301 sends the component acquisition request to acquire the component including the component having a component name "translation", which is defined in "component" included in a detailed process definition 1120 of the process flow information 1110 illustrated in FIG. 7, to the component administering unit 302.

The component administering unit 302 receives the component acquisition request to acquire the component and thereafter generates the component (i.e., the translation component 1320) having the component name "translation" (step S1814). The translation component 1320 can be generated by using an API for generating the component defined in the component common I/F 1300.

Then, the component administering unit 302 returns the generated translation component 1320 to the flow executing unit 301. Said differently, the component administering unit 302 returns the address in the memory (e.g., the RAM 14), on which the translation component 1320 is deployed, to the flow executing unit 301.

Next, the flow executing unit 301 sends a component execution request to the translation component 1320 (step S1815). This execution request includes data and parameter information.

Here, the data is returned from the OCR component 1310. Said differently, the data is a path indicative of an electronic file after the OCR process.

Further, the parameter information is formed by setting various parameter values of the parameter setup information to the parameter value of various parameter information defined in "parameters" included in the detailed process definition 1120 of the process flow information 1100 illustrated in FIG. 7. Said differently, the parameter information is "from":"English", "to":"Japan", or the like.

When the translation component 1320 receives a component execution request, the translation component 1320 sends a type conversion request to the type conversion administering unit 304 (step S1816). Here, this type conversion request includes the data and a designation of "LocalFilePath" indicative of a data type, which can be treated by the translation component 1320.

After the type conversion administering unit 304 receives the type conversion request, the type conversion administering unit 304 checks whether the data type of the data included in the received type conversion request matches the designated data type (step S1817).

Here, the data type of the data included in the received type conversion request is "LocalFilePath" and the designated data type is "LocalFilePath". Accordingly, the type conversion administering unit 304 determines that the data type of the data included in the received type conversion request matches the designated data type.

Then, the type conversion administering unit 304 sends the data included in the type conversion request to the translation component 1320 (step S1818). As described, when the data type of the data and the designated data type are determined to match in checking the data type (the process of step S1817), the type conversion administering unit 304 does not generate a type conversion.

After the translation component 1320 receives the data from the type conversion administering unit 304, the translation component uses the parameter information to execute the process for the data using the parameter information (step S1819). Said differently, the translation component 1320 uses the parameter information "from":"English" and "to":"Japan" to perform a process of translating the electronic file indicated by the data.

The translation component 1320 returns the data indicative of the electronic file provided with the translation process to the flow executing unit 301.

The translation component 320 may request to perform a translation process to a translation server coupled to the service providing system 10 via the network so as to translate the electronic file, for example.

Next, the flow executing unit 301 sends an acquisition request to acquire the component based on the process flow information 1100 to the component administering unit 302 (step S1813).

Said differently, the flow executing unit 301 sends the component acquisition request to acquire the component including the component having a component name "mail", which is defined in "component" included in the detailed process definition 1130 of the process flow information 1110 illustrated in FIG. 7, to the component administering unit 302.

The component administering unit 302 receives the component acquisition request to acquire the component and thereafter generates the component (i.e., the mail delivery component 1330) having the component name "mail" (step S1821). The mail delivery component 1330 can be generated by using an API for generating the component defined in the component common I/F 1330.

Then, the component administering unit 302 returns the generated mail delivery component 1330 to the flow executing unit 301.

Said differently, the component administering unit 302 returns the address in the memory (e.g., the RAM 14), on which the mail delivery component 1330 is deployed, to the flow executing unit 301.

Next, the flow executing unit 301 sends a component execution request to the mail delivery component 1330 (step S1822). This execution request includes data and parameter information.

Here, the data is returned from the translation component 1320. Said differently, the data is a path indicative of the electronic file after the translation.

Further, the parameter information is formed by setting various parameter values of the parameter setup information to the parameter values of various parameter information defined in "parameters" included in the detailed process definition 1130 of the process flow information 1100 illustrated in FIG. 7. Said differently, the parameter information is "address":"abc@abc.co.jp".

When the mail delivery component 1330 receives a component execution request, the mail delivery component 1330 sends a type conversion request to the type conversion administering unit 304 (step S1823). Here, the type conversion request includes the data and a designation of "LocalFilePath" indicative of the data type, which can be treated by the mail delivery component 1330.

After the type conversion administering unit 304 receives the type conversion request, the type conversion administering unit 304 checks whether the data type of the data included in the received type conversion request matches the designated data type (step S1824).

Here, the data type of the data included in the received type conversion request is "LocalFilePath" and the designated data type is also "LocalFilePath". Accordingly, the type conversion administering unit 304 determines that the data type of the data included in the received type conversion request matches the designated data type.

Then, the type conversion administering unit 304 sends the data included in the type conversion request to the mail delivery component 1330 (step S1825). As described, when the data type of the data and the designated data type are determined to match in checking the data type (the process of step S1824), the type conversion administering unit 304 does not generate a type conversion.

After the mail delivery component 1330 receives the data from the type conversion administering unit 304, the mail delivery component uses the parameter information to execute the process for the data (step S1826).

Said differently, the mail delivery component 1330 create a mail creates a mail, to which an electronic file indicated by the data is attached, by the mail delivering unit 132. Next, the mail delivery component 1330 uses the parameter information "address":"abc@abc.co.jp" to send the mail to "abc@abc.co.jp".

The mail delivery component 1330 returns the data indicative of the result of sending the mail to the flow executing unit 301.

As described above, the execution of the series of processes (the process flow) based on the process flow information 1100 illustrated in FIG. 7 is completed. Accordingly, the service providing system 10 of the first embodiment can serve the scan translation service to the apparatus 20.

As described, according to the information processing system 1 of the first embodiment, the user can register the app information 1000 providing the various services into the service providing system 10 using the PC terminal 30. Further, in the information processing system 1 of the first embodiment, the user can select a flow name and set necessary parameter information, and so on using the PC terminal 30 so as to easily register the app information 1000.

Therefore, in the information processing system 1 of the first embodiment, a user without having specialized knowledge and experience related to the programming language or the like can easily create and registers the application (the application information 1000).

As described, according to the information processing system 1 of the first embodiment, the user can use the various services provided by the application registered in the service providing system 10 using the apparatus 20.

Second Embodiment

A second embodiment is described next. Within the second embodiment, described is a case where an application of a scan and print type is registered. Meanwhile, the scan and print type corresponds to an application of causing the electronic file generated by scanning using the image forming apparatus or the like to be input and causing the series of process, to which the electronic file to be input, to be executed so that the executed result is printed. The application of the scan and print type is such that a QR code is attached to an electronic file generated by scanning and thereafter the electronic file having the QR code is printed (a QR code print application), for example. Within the second embodiment, the service provided using the QR code print application is referred to as a QR code print service.

Within the second embodiment, a difference from the first embodiment is mainly explained. Description of a portion having a function structure substantially similar to the function structure of the first embodiment and a portion performing a process substantially similar to the process of the first embodiment is appropriately omitted.

<Detailed Process>

Figure 19:
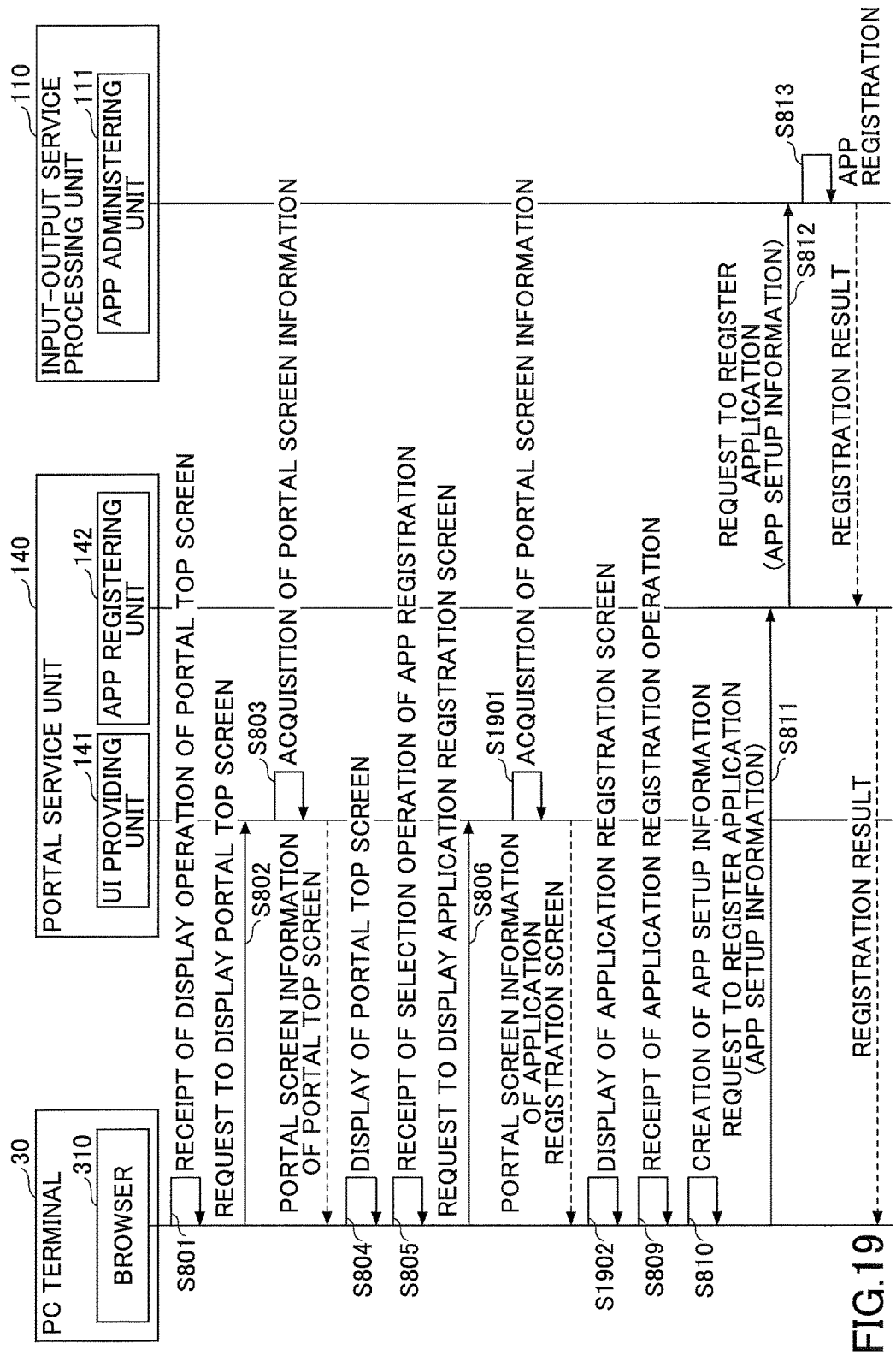
FIG. 19 is a sequence chart of an example of a registration process to register an application according to a second embodiment.

Described next is a detailed process of the information processing system 1 of the second embodiment. Referring FIG. 19, described next is a process in which the user of the PC terminal 30 registers the QR code print application in the service providing system 10. FIG. 19 is a sequence chart of an example of a registration process of the application of the second embodiment. Steps S801 to S806 and S809 to S813 illustrated in FIG. 19 are similar to steps S801 to S806 and S809 to S813 illustrated in FIG. 8. Therefore, the description of the steps S801 to S806 and S809 to S813 is omitted.

When the UI providing unit 141 of the portal service unit 140 receives the display request to display the application registration screen subsequent to step S806, the UI providing unit 141 acquires portal screen information 3000 of the application registration screen from the portal screen information memory unit 170 (step S1901). Said differently, the UI providing unit 141 acquires the portal screen information 3000 for displaying application registration screens G800 to G1000 (described below) from the portal screen information memory unit 170.

Then, the UI providing unit 141 returns the portal screen information 3000 acquired from the portal screen information memory unit 170 to the browser 310.

Figure 20:
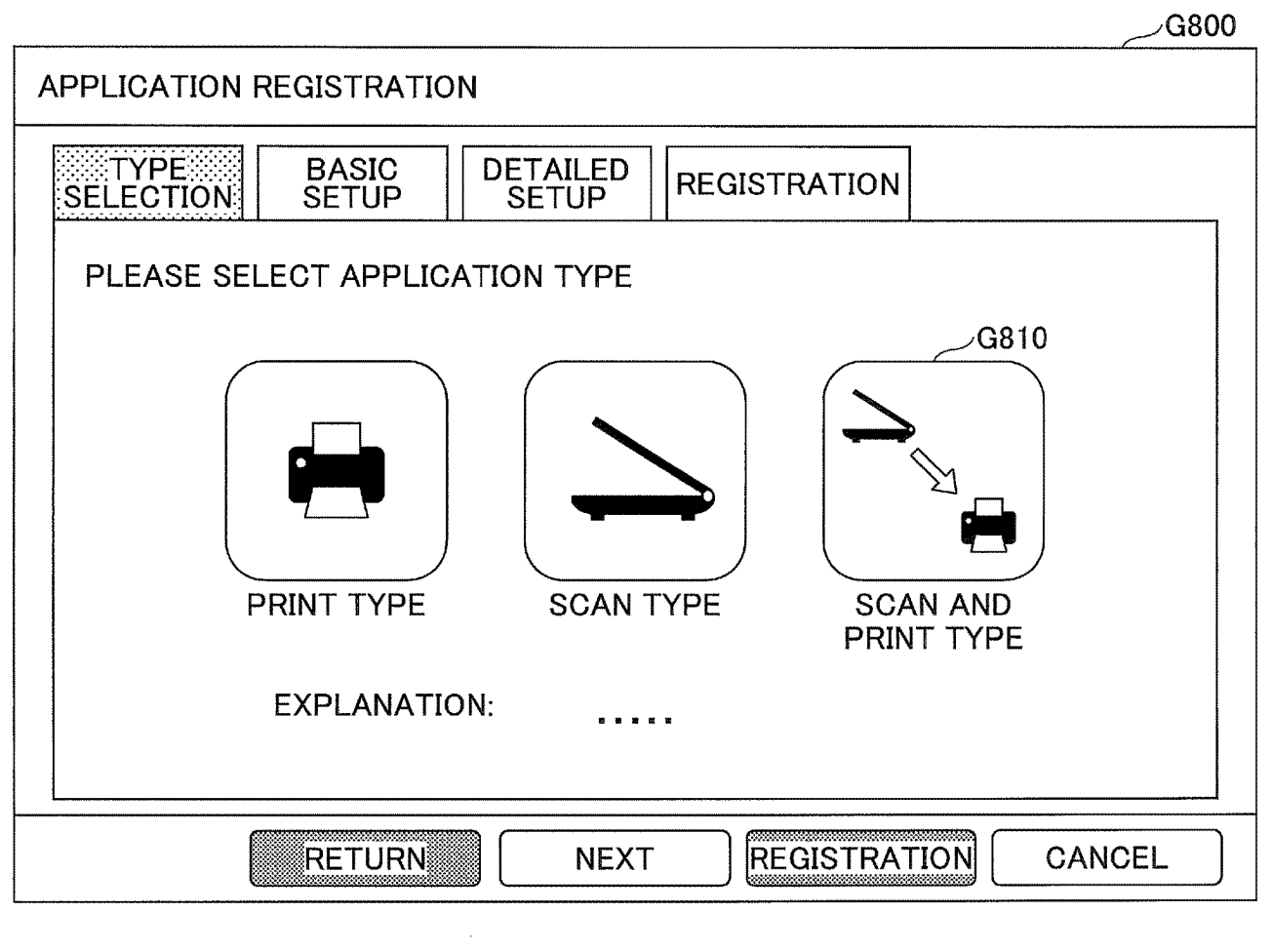

After the browser 310 of the PC terminal 30 receives the portal screen information 3000 of the application registration screen, the browser 310 displays the application registration screen G800 as illustrated in FIG. 20 based on the portal screen information 3000 (step S1902).

Hereinafter, referring to FIGS. 20 to 22, description is given of a case where the user performs the registration operation to register the application.

In the application registration screen G800 illustrated in FIG. 20, a button 810 of "scan and print type" for registering the application of the scan and print type is included.

After the user selects the button 810 of "scan and print type" in the application registration screen G800 illustrated in FIG. 20 and subsequently performs an operation of pushing a button of "next", the screen transits to various screens for registering the application of the scan and print type. An application registration screen G900 illustrated in FIG. 21 and an application registration screen G1000 illustrated in FIG. 22 are included in these various screen.

Default values for scan setting such as "paper direction" and "one sided/double sided" can be set in the application registration screen G900 illustrated in FIG. 21. The user can set the default value of various scan setting in a default value setup column G910.

Further, the user can set the setup changing column G920 to determine whether a change in scan setting is permitted at a time of using the application. The setup value of the scan setting corresponding to the check mark in the setup changing column G920 can be changed at a time of using the application. On the other hand, the setup value of the scan setting not corresponding to the check mark in the setup changing column G920 cannot be changed at a time of using the application. Therefore, when the user does not check the setup changing column G920, the scan setting corresponding to the item without the check mark can have a setup value peculiar to the application as a default value.

Default values for print setting such as "print run" and "print color mode" can be set in an application registration screen G1000 illustrated in FIG. 22. The user can set the default value of various print setting in a default value setup column G1010.

Further, the user can set a setup changing column G1020 to designate whether a change in the print setting is permitted at a time of using the application. The setup value of the print setting corresponding to the check mark in the setup changing column G1020 can be changed at a time of using the application. On the other hand, the setup value of the print setting not corresponding to the check mark in the setup changing column G1020 cannot be changed at a time of using the application. Therefore, when the user does not check the setup changing column G1020, the print setting corresponding to the item without the check mark can have a setup value peculiar to the application as a default value.

Here, when the application is subjected to a registration operation, app setup information 1200 of the scan and print type as illustrated in, for example, FIG. 23 is created. FIG. 23 illustrates an example of the app setup information 1200 of the second embodiment.

The app setup information 1200 illustrated in FIG. 23 includes a scan setup default parameter 1209 and a print setup default parameter 1210.

The scan setup default parameter 1209 is a parameter indicative of a default value of scan setting set in the application registration screen G900 illustrated in FIG. 21. The print setup default parameter 1210 is a parameter indicative of a default value of print setting set in the application registration screen G1000 illustrated in FIG. 22. Accordingly, the application registered by the user can use the scan setup default parameter 1209 and the print setup default parameter 1210 respectively as a default value of the scan setting and a default value of the print setting.

As described, according to the information processing system 1 of the second embodiment, the application of the scan and print type can be registered into the service providing system 10.

Figure 24:
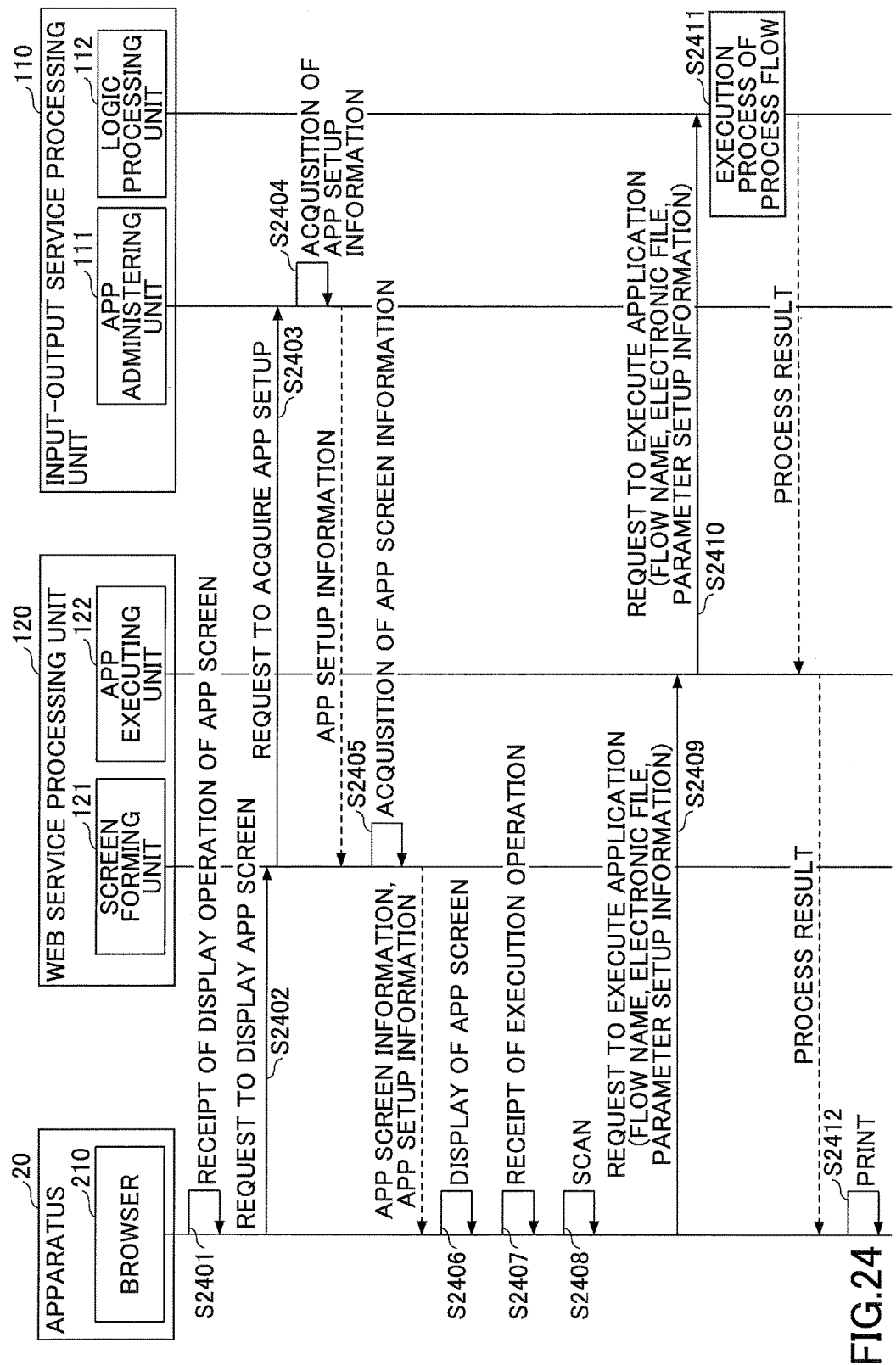
FIG. 24 is a sequence diagram illustrating an example of an overall process in a case where a quick response (QR) code print service is used.

Referring to FIG. 24, described next is a case where the user of the apparatus 20 uses a QR code print service served by the application of the scan and print type. FIG. 24 is a sequence diagram illustrating an example of an overall process in a case where a QR code print service is used.

At first, the browser 210 of the apparatus 20 receives an operation (a display operation) for causing the app screen of the scan translation service to be displayed (step S2401). The user of the apparatus 20 inputs the URL of the app screen of the QR code print service to the address bar of the browser 310 to enable the display operation to display the app screen, for example.

The browser 210 of the apparatus 20 receives a display operation to display the app screen of the QR code print service and thereafter sends a display request to display the app screen of the QR code print service to the screen forming unit 121 of the web service processing unit 120 (step S2402). The app ID of the app information 1000 providing the QR code print service is included in the display request to display the app screen of the QR code print service.

The screen forming unit 121 of the web service processing unit 120 receives the display request of the app screen of the QR code print service and thereafter sends an acquisition request to acquire app setup to the app administering unit 111 of the input-output service processing unit 110 (step S2403). The acquisition request to acquire the app setup includes the app ID of the app information 1000 providing the QR code print service.

The app administering unit 111 of the input-output service processing unit 110 receives the acquisition request to acquire the app setup and thereafter acquires the app setup information 1200 stored in association with the app ID included in the acquisition request from the app information memory unit 150 (step S2404). Further, the app administering unit 111 returns the app setup information 1200 acquired from the app information memory unit 150 to the screen forming unit 121.

Next, the screen forming unit 121 of the web service processing unit 120 acquires the app screen information 2000 stored in association with the app ID of the app information 1000 which provides the QR code print service from the app screen information memory unit 160 (step S2405). The screen forming unit 121 returns the app screen information 2000 acquired from the app screen information memory unit 160 and the app setup information 1200 returned in step S2404 to the browser 210.

Figure 25:
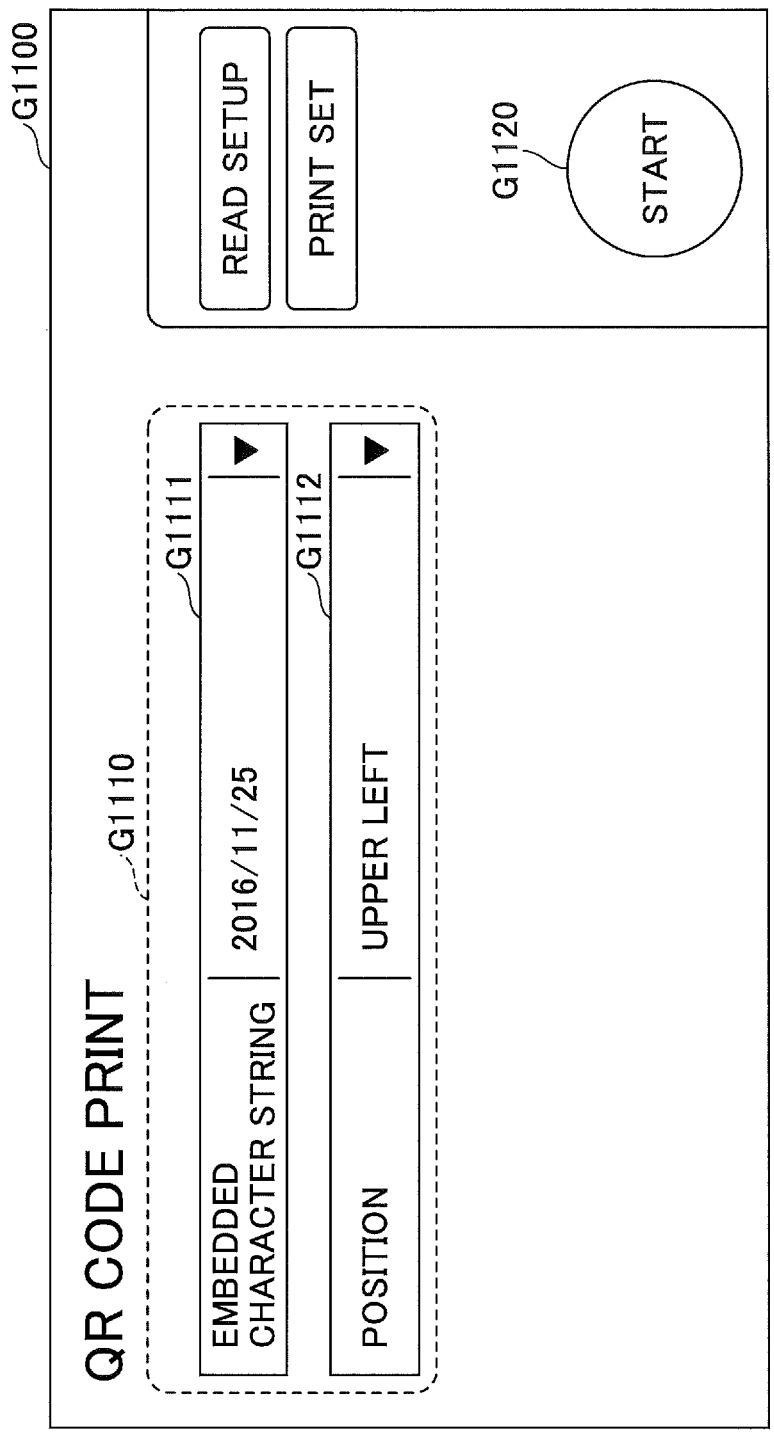
FIG. 25 illustrates an example of an app screen of a QR code print application.

The browser 210 of the apparatus 20 displays an app screen G1100 illustrated in, for example, FIG. 25 based on the app screen information 2000 and the app setup information 1200, which are received from the screen forming unit 121 (step S2406).

Here, the app screen G1100 illustrated in FIG. 25 is a screen for the user of the apparatus 20 to use the QR code print service.

A parameter input area G1110 and a "start" button G1120 are included in an app screen G1100 illustrated in FIG. 25. An embedded character string input column G1111 and a position input column G1112 are included in the parameter input area G1110.

The user performs operations (the execution operation) of inputting a character string embedded in the QR code into an embedded character string input column G1111, inputting the position of the electronic file on which the QR code is superposed, and thereafter pushing the "start" button.

Then, the browser 210 of the apparatus 20 receives the execution operation (step S2407). Then, the browser 210 of the apparatus 20 controls the scanner 26 to read the original manuscript so as to generate an electronic file (an image file) (step S2408).

After the electronic file (the image file) is generated, the browser 210 of the apparatus 20 sends an execution request to execute the application to the app executing unit 122 of the web service processing unit 120 (step S2409). The execution request to execute the application includes a flow name defined in the app setup information 1200, the electronic file generated in the step S2408, and the parameter setup information. The flow name is "code-print" indicative of the process flow information 1100 of the series of processes substantializing the QR code service.

The parameter setup information includes parameter information defined by the scan setup default parameter 1209 and the print setup default parameter 1210 of the app setup information 1200 and the parameter value set by the user on the app screen G1100.

The app executing unit 122 of the web service processing unit 120 receives the execution request to execute the application. Thereafter, the app executing unit 122 sends the execution request to the logic processing unit 112 of the input-output service processing unit 110 (step S2410).

Next, the logic processing unit 112 of the input-output service processing unit 110 receives the execution request to execute the application and thereafter performs the execution process of the process flow (step S2411). Said differently, the logic processing unit 112 executes the series of processes based on the process flow information 1100 of the flow name included in the execution request. The execution process of the process flow is described in detail later.

The logic processing unit 112 returns the process result of the execution process of the process flow through the web service processing unit 120 to the browser 210. Here, the process result returned to the browser 210 is the electronic file, on which the QR code is superposed.

When the process result is returned, the browser 210 of the apparatus 20 controls the printer to print the electronic file, on which the QR code is superposed (step S2412). Accordingly, the service providing system 10 of the second embodiment can provide the QR code print service.

Figure 26:
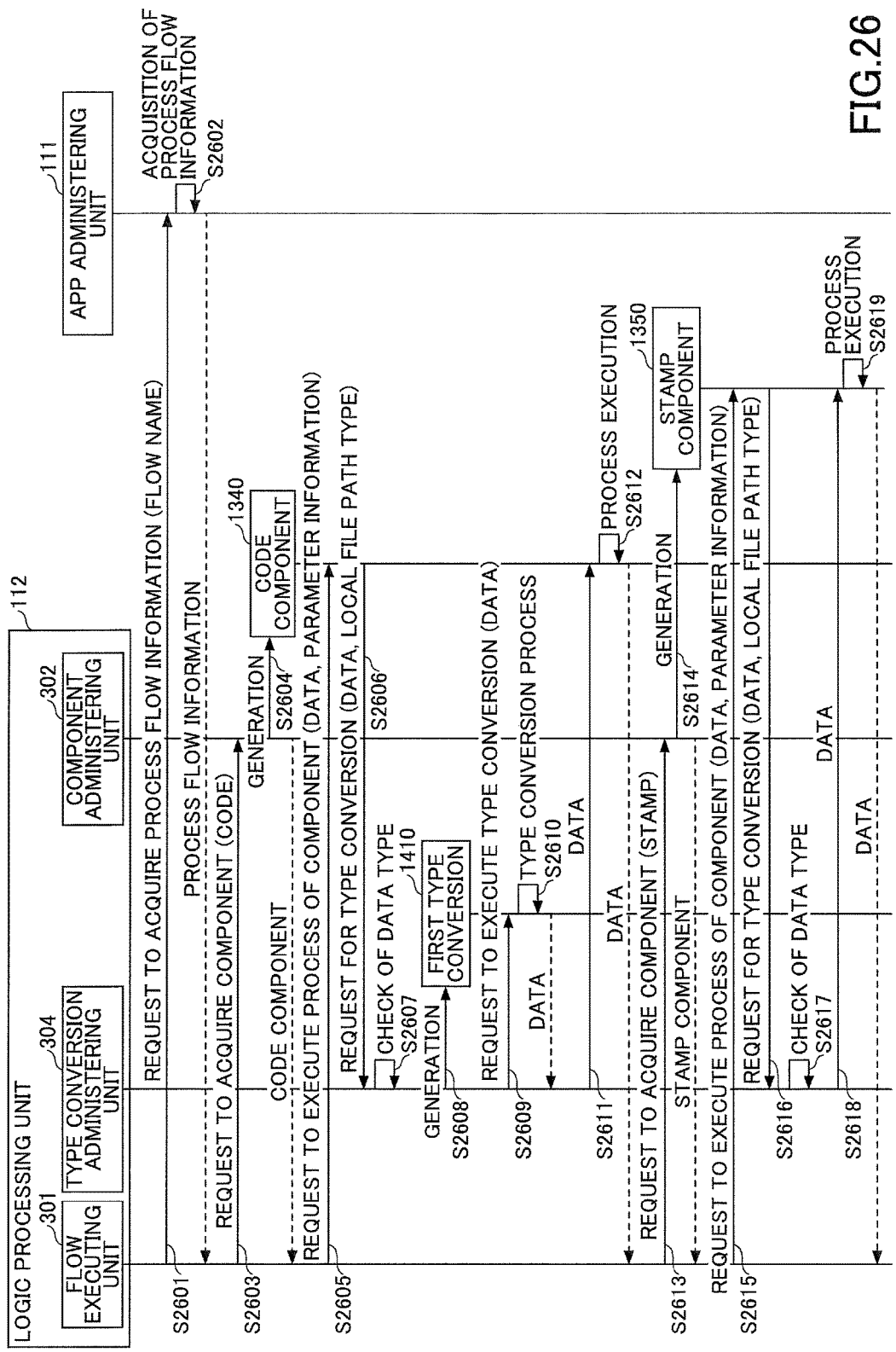
FIG. 26 is a sequence diagram illustrating an example of an execution process of a process flow substantializing the QR code print service.

Referring to FIG. 26, detailed explanation of the execution process to execute the process flow (the process of step S2411 in FIG. 24) is given below. FIG. 26 is a sequence diagram illustrating an example of the execution process of the process flow substantializing the QR code print service.

The flow executing unit 301 receives an execution request to execute the application from the app executing unit 122 and thereafter sends the acquisition request to acquire the process flow to the app administering unit 111 (step S2601). The acquisition request includes a flow name "code-print".

The app administering unit 111 receives the acquisition request to acquire the process flow and thereafter acquires the process flow information 1100 of the flow name "code-print" from the app information memory unit 150 (step S2602). Further, the app administering unit 111 returns the process flow information 1100 acquired from the app information memory unit 150 to the flow executing unit 301.

Described next is a case where the app administering unit 111 returns the process flow information 1100 illustrated in FIG. 27 to the flow executing unit 301. Referring to FIG. 27, the process flow information 1100 is provided to define the series of processes (the process flow) substantializing the QR code print service.

The "code-print" is defined in the flow name 1101 of the process flow information 1100 illustrated in FIG. 27. Detailed process definition 1110 and detailed process definition 1120 are included in the detailed flow 1102 of the process flow information 1100 illustrated in FIG. 27.

A detailed process name "detail0", a component name "code" of a code component 1340, and parameter information of the component are defined in the detailed process definition 1110. A detailed process name "detail1", a component name "stamp" of a stamp component 1350, and parameter information of the component are defined in the detailed process definition 1120.

Next, the flow executing unit 301 sends an acquisition request to acquire the component based on the process flow information 1100 to the component administering unit 302 (step S2603).

Said differently, the flow executing unit 301 sends the component acquisition request to acquire the component including the component having the component name "code", which is defined in "component" included in the detailed process definition 1110 of the process flow information 1110 illustrated in FIG. 27, to the component administering unit 302.

The component administering unit 302 receives the component acquisition request to acquire the component and thereafter generates the component (i.e., the translation component 1340) having the component name "code" (step S2604). Then, the component administering unit 302 returns the generated code component 1340 to the flow executing unit 301.

Next, the flow executing unit 301 sends a component execution request to the code component 1340 (step S2605). This execution request includes data of the data type "InputStream" and parameter information.

When the code component 1340 receives a component execution request, the code component 1340 sends a type conversion request to the type conversion administering unit 304 (step S2606). Here, the type conversion request includes the data and a designation of "LocalFilePath" indicative of the data type, which can be treated by the code component 1340.

After the type conversion administering unit 304 receives the type conversion request, the type conversion administering unit 304 checks whether the data type of the data included in the received type conversion request matches the designated data type (step S2607).

Here, the data type of the data included in the received type conversion request is "InputStream" and the designated data type is "LocalFilePath". Accordingly, the type conversion administering unit 304 determines that the data type of the data included in the received type conversion request does not match the designated data type.

Then, the type conversion administering unit 304 refers to the type-conversion information table 4000, and specifies the type conversion for converting "InputStream" to "LocalFilePath" (here, the first type conversion 1410 is specified). Then, the type conversion administering unit 304 generates the specified first type conversion 1410 (step S2608).

Next, the type conversion administering unit 304 sends a type conversion execution request to execute a type conversion process to the first type conversion 1410 (step S2609). When the first type conversion 1410 receives the type conversion execution request, the first type conversion 1410 performs a type conversion process of converting the data type of the data included in the type conversion execution request from "InputStream" to "LocalFilePath" (step S2610). The first type conversion 1410 returns data, of which data type has been converted, to the type conversion administering unit 304.

After the type conversion administering unit 304 receives the data from the first type conversion 1410, the type conversion administering unit 304 sends the data to the code component 1340 (step S2611).

After the code component 1340 receives the data from the type conversion administering unit 304, the code component uses the parameter information to execute the process for the data using the parameter information (step S2612). Said differently, the code component 1340 generates a QR code, into which the character code input in the embedded character string input column G1111 of the app screen G1100 illustrated in FIG. 25.

The code component 1340 returns data indicative of the process result (i.e., the QR code) and the electronic file (i.e., the electronic file received from the browser 210) to the flow executing unit 301.

Next, the flow executing unit 301 sends an acquisition request to acquire the component based on the process flow information 1100 to the component administering unit 302 (step S2613).

Said differently, the flow executing unit 301 sends the component acquisition request to acquire the component including the component having the component name "stamp", which is defined in "component" included in the detailed process definition 1120 of the process flow information 1100 illustrated in FIG. 27, to the component administering unit 302.

The component administering unit 302 receives the component acquisition request to acquire the component and thereafter generates the component (i.e., the stamp component 1350) having the component name "stamp" (step S2614). Then, the component administering unit 302 returns the generated stamp component 1350 to the flow executing unit 301.

Next, the flow executing unit 301 sends a component execution request to the stamp component 1350 (step S2615). This execution request includes data of the data type "LocalFilePath" and parameter information.

When the stamp component 1350 receives a component execution request, the stamp component 1350 sends a type conversion request to the type conversion administering unit 304 (step S2616). Here, the type conversion request includes the data and a designation of "LocalFilePath" indicative of the data type, which can be treated by the stamp component 1350.

After the type conversion administering unit 304 receives the type conversion request, the type conversion administering unit 304 checks whether the data type of the data included in the received type conversion request matches the designated data type (step S2617).

Here, the data type of the data included in the received type conversion request is "LocalFilePath" and the designated data type is also "LocalFilePath". Accordingly, the type conversion administering unit 304 determines that the data type of the data included in the received type conversion request matches the designated data type.

Then, the type conversion administering unit 304 sends the data included in the type conversion request to the stamp component 1350 (step S2618).

After the stamp component 1350 receives the data from the type conversion administering unit 304, the stamp component 1350 uses the parameter information to execute the process for the data using the parameter information (step S2619). Said differently, the stamp component 1350 causes the QR code to be superposed on the electronic file at a position input in a position input column G1112 of the app screen G1100 illustrated in FIG. 25. With this, created is the electronic file having the QR code superposed at a designated position.

The stamp component 1350 returns the data having the QR code superposed at a designated position to the flow executing unit 301.

As described above, the execution of the series of processes (the process flow) based on the process flow information 1100 illustrated in FIG. 27 is completed. Thus, the service providing system 10 can send the electronic file, on which the QR code is superposed to the apparatus 20. The QR code print service can be provided to the user by printing the electronic file by the apparatus 20.

Third Embodiment

A third embodiment is described next. Within the third embodiment, described is a case where an application of a mail receiving type is registered. The mail receiving type is featured to cause a series of processes to be executed in a case where a mail directed to a predetermined mail address is received. Said differently, the application of the mail receiving type causes the series of processes to be executed using a mail receipt as a trigger.

Within the third embodiment, a difference from the first embodiment is mainly explained. Description of a portion having a function structure substantially similar to the function structure of the first embodiment and a portion performing a process substantially similar to the process of the first embodiment is appropriately omitted.

<Function Structure>

Figure 28:
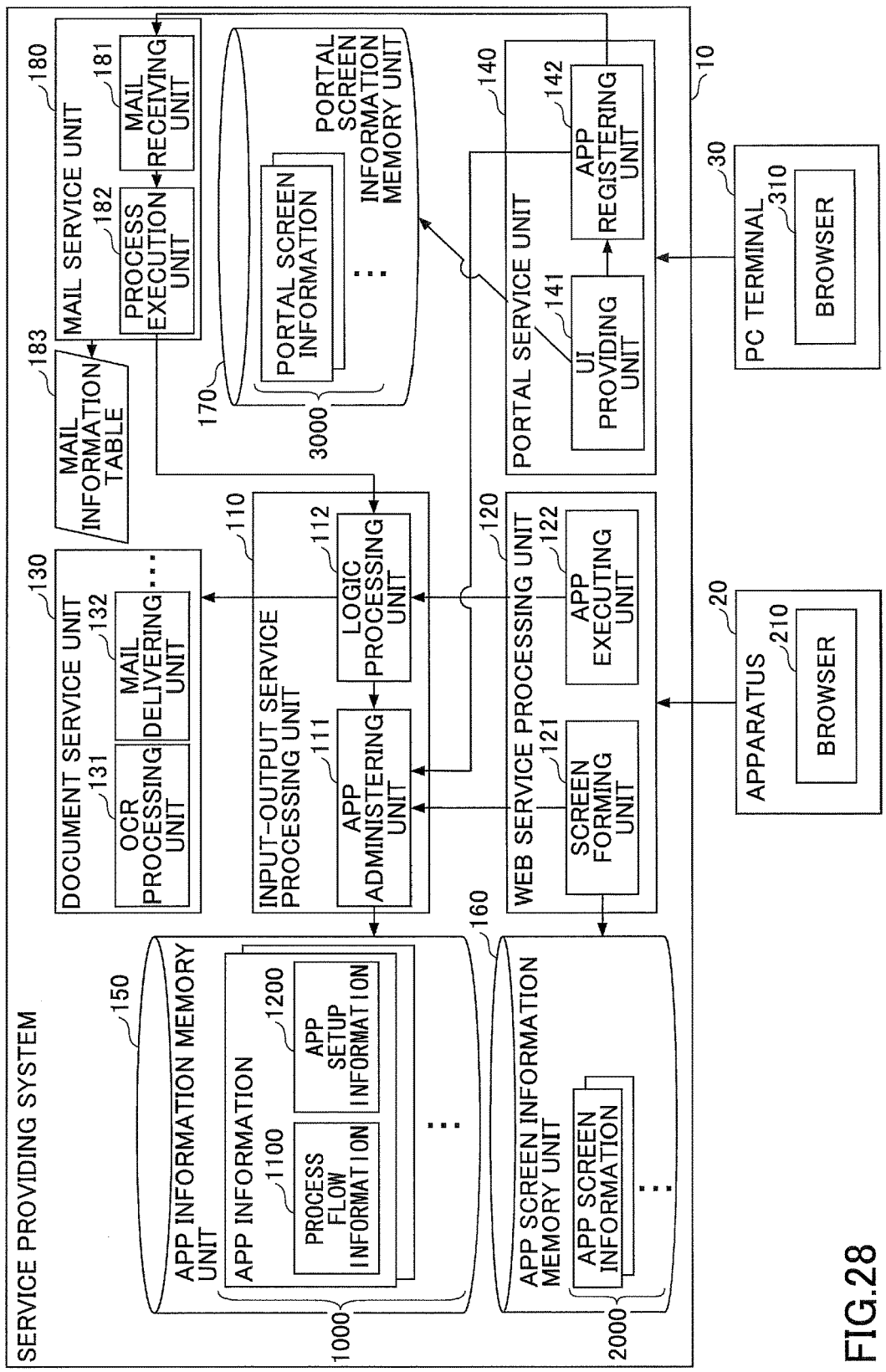
FIG. 28 is a diagram illustrating a functional structure of an example of an information processing system of a third embodiment.

Referring to FIG. 28, the functional structure of the information processing system 1 of the third embodiment is described. FIG. 28 is a diagram illustrating an exemplary functional structure of the information processing system 1 of the third embodiment.

Referring to FIG. 28, the service providing system 10 further has a mail service unit 180. The mail service unit 180 is implemented when one or more program installed on the service providing system 10 are executed by the CPU 16.

The mail service unit 180 performs a process related to mail receiving and an execution of the process flow. The mail service unit 180 includes a mail receiving unit 181 and a process execution unit 182. The mail receiving unit 181 receives a mail. The mail receiving unit 181 refers to a mail information table 183 and requests an execution of a process flow of a flow name corresponding to a sending destination mail address of the received mail by referring to a mail information table stored in a predetermined memory area.

The process execution unit 182 requests the logic processing unit 112 to execute the application in response to the request from the mail receiving unit 181.

Referring to FIG. 29, the mail information table 183 is described in detail. FIG. 29 illustrates an example of the mail information table 183.

Referring to FIG. 29, mail addresses and flow names are associated by the mail information table 183. With this, the mail receiving unit 181 can acquire the flow name corresponding to the sending destination mail address of the received mail.

<Detailed Process>

Figure 30:
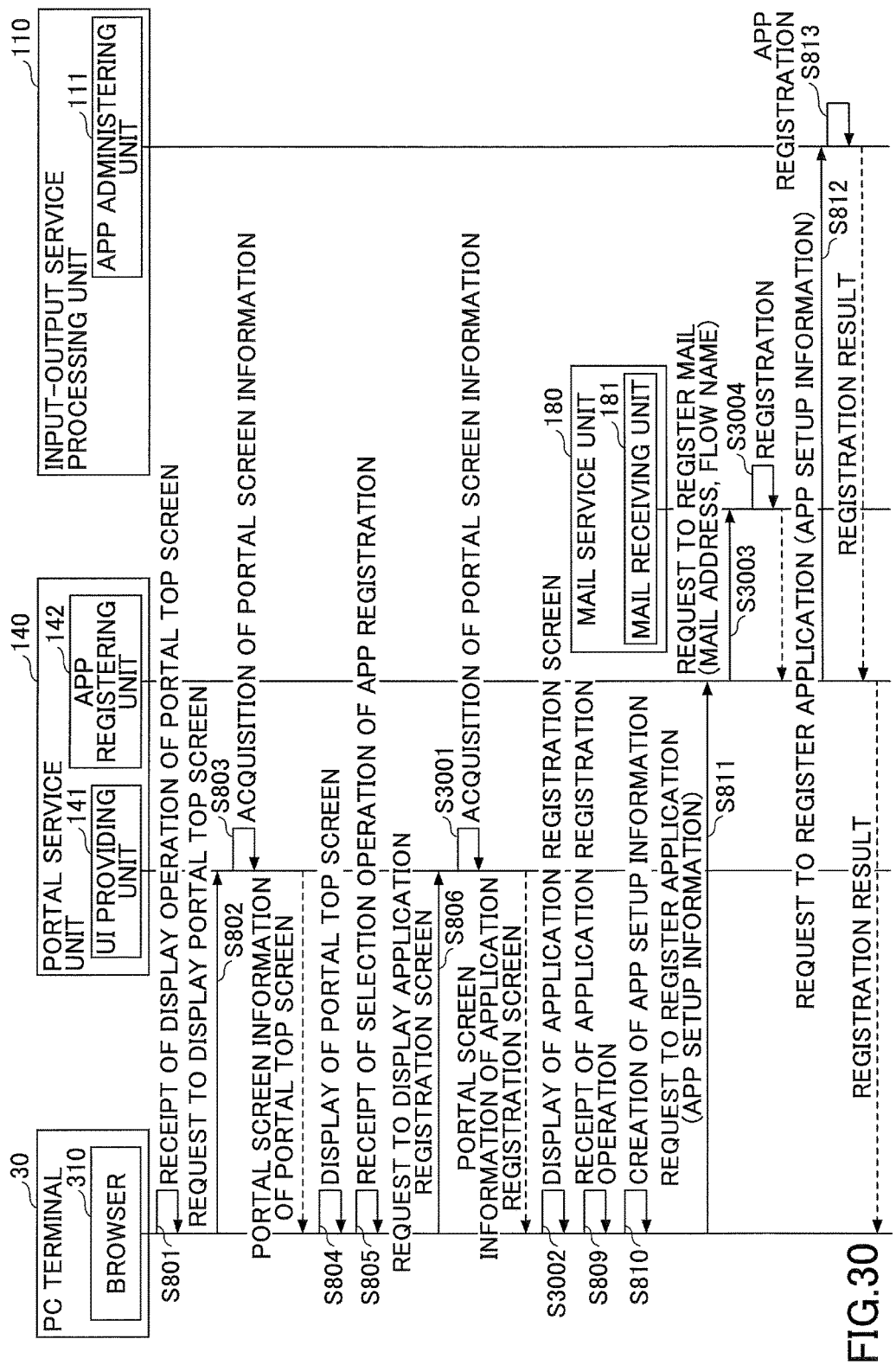
FIG. 30 is a sequence diagram of an example of a registration process to register an application according to a third embodiment.

Described next is a detailed process of the information processing system 1 of the third embodiment. Referring FIG. 30, described next is a process in which the user of the PC terminal 30 registers the application of the mail receiving type in the service providing system 10. FIG. 30 is a sequence chart of an example of a registration process of the application of the third embodiment. Steps S801 to S806 and S809 to S813 illustrated in FIG. 30 are similar to steps S801 to S806 and S809 to S813 illustrated in FIG. 8. Therefore, the description of the steps S801 to S806 and S809 to S813 is omitted.

When the UI providing unit 141 of the portal service unit 140 receives the display request to display the application registration screen subsequent to step S806, the UI providing unit 141 acquires portal screen information 3000 of the application registration screen from the portal screen information memory unit 170 (step S3001). Said differently, the UI providing unit 141 acquires the portal screen information 3000 for displaying application registration screens G1200 to G1300 from the portal screen information memory unit 170.

Then, the UI providing unit 141 returns the portal screen information 3000 acquired from the portal screen information memory unit 170 to the browser 310.

Figure 31:
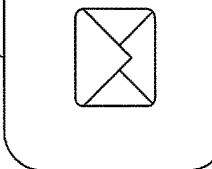
FIG. 31 illustrates an example of an application registration screen of the third embodiment.

After the browser 310 of the PC terminal 30 receives the portal screen information 3000 of the application registration screen, the browser 310 displays the application registration screen G1200 as illustrated in FIG. 31 based on the portal screen information 3000 (step S3002).

Hereinafter, referring to FIGS. 31 to 32, description is given of a case where the user performs the registration operation to register the application.

In the application registration screen G1200 illustrated in FIG. 31, a button G1210 of "mail receiving type" for registering the application of the mail receiving type is included.

After the user selects the button G1210 of "mail receiving type" in the application registration screen G1200 illustrated in FIG. 31 and subsequently performs an operation of pushing a button of "next", the screen transits to various screens for registering the application of the scan and print type. The application registration screen G1300 illustrated in FIG. 32 is one of these various screens.

The application registration screen G1300 illustrated in FIG. 32 is provided for mail setting (e.g., a mail address, usability of an attachment file) related to the application of the mail receiving type. The user can set the mail address, attachment file usability, and so on in the mail setting column G1310.

Further, the user can set whether a change of setup related to the application of mail receiving type is permitted at a time of using the application in the setup changing column G1320. The setup value of setting corresponding to a check mark in the setup changing column G1320 can be changed at a time of using the application. On the other hand, the setup value of setting not corresponding to the check mark in the setup changing column G1320 cannot be changed at the time of using the application. Therefore, when the user does not check the setup changing column G1320, the setting corresponding to the item without the check mark can have a setup value peculiar to the application as a default value.

Here, when the application is subjected to a registration operation, app setup information 1200 of the mail receiving type as illustrated in, for example, FIG. 33 is created. FIG. 33 illustrates an example of the app setup information 1200 of the third embodiment.

A mail setup parameter 1211 is included in the app setup information 1200 illustrated in FIG. 33. The mail setup parameter 1211 is provided to indicate a setup value of the mail setup set in the application registration screen G1300 illustrated in FIG. 32. With this, the mail setup parameter 1211 can be used as a default value in the application registered by the user.

Referring back to FIG. 30, the description is further given. Subsequent to step S811, the app registering unit 142 sends a mail registration request to register the mail to the mail receiving unit 181 of the mail service unit 180 (step S3003). The mail registration request includes the mail address (said differently, the mail address set in the mail setting column G1310) included in the app setup information 1200 created in step S810 and the name included in the app setup information 1200.

After the mail receiving unit 181 of the mail service unit 180 receives the mail registration request, the mail receiving unit 181 of the mail service unit 180 causes the mail address and the flow name to be associated each other and stores the associated mail address and flow name in the mail information table 183 (step S3004). With this, the process flow information 1200A is registered into the service providing system 10.

As described, according to the information processing system 1 of the third embodiment, the application of the mail receiving type can be registered into the service providing system 10.

Figure 34:
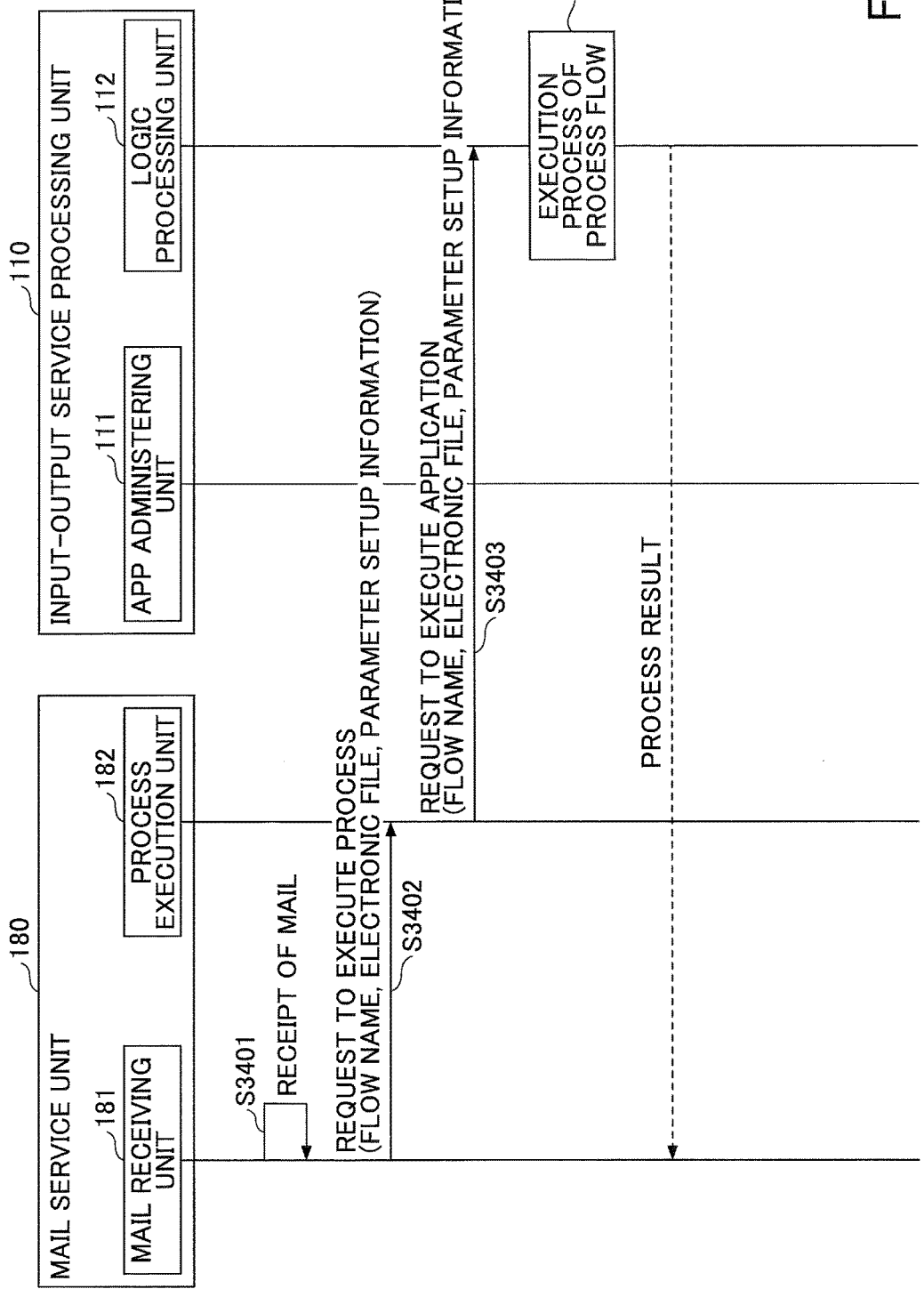
FIG. 34 is a sequence diagram illustrating an example of a process executing a process flow by receiving a mail.

Next, referring to FIG. 34, a process of executing the process flow upon a mail receipt is described. FIG. 34 is a sequence diagram illustrating an example of a process executing a process flow upon the mail receipt.

The mail receiving unit 181 of the mail service unit 180 receives a mail (step S3401).

Next, the mail receiving unit 181 of the mail service unit 180 refers to the mail information table 183 to acquire the flow name associated with the sending destination mail address of the received mail. Next, the mail receiving unit 181 sends a process execution request, in which the flow name and the parameter setup information are included, to the process execution unit 182 (step S3402). Here, the parameter setup information is, for example, a sending destination mail address.

In a case where an attachment file usability is permitted, the mail receiving unit 181 sends the process execution request including the electronic file attached to the received mail to the process execution unit 182.

Next, after the process execution unit 182 receives the process execution request, the process execution unit 182 sends the execution request to execute the application to the logic processing unit 112 of the input-output service processing unit 110 (step S3403).

Next, after the logic processing unit 112 of the input-output service processing unit 110 receives the execution request to execute the application, the logic processing unit 112 performs the execution process of the process flow (step S3404). Said differently, the logic processing unit 112 executes the series of processes based on the process flow information 1100 of the flow name included in the execution request.

As described, the service providing system 10 of the third embodiment can provide a service implemented by the process flow having the flow name corresponding to the mail address in a case where a mail to the previously registered mail address is received.

Fourth Embodiment

A fourth embodiment is described next. Within the fourth embodiment, described is a case where a parameter group, in which at least one parameter is included in the component or the process flow. The parameter group is set to the component or the process flow to enable the user set an appropriate parameter upon a selection of the parameter group by the user at a time of registering the application.

With this, the development of the application is possible even if the usage of the parameter is not accurately understood. Said differently, even if the user does not accurately understand that a predetermined result is obtainable by setting the parameter to which value, the application can be developed.

Said differently, within the fourth embodiment, the user who does not accurately understand the specifications of individual parameters may select the parameter group to enable the user to easily develop the application.

Within the fourth embodiment, a difference from the first embodiment is mainly explained. Description of a portion having a function structure substantially similar to the function structure of the first embodiment and a portion performing a process substantially similar to the process of the first embodiment is appropriately omitted.

<Function Structure>

Figure 35:
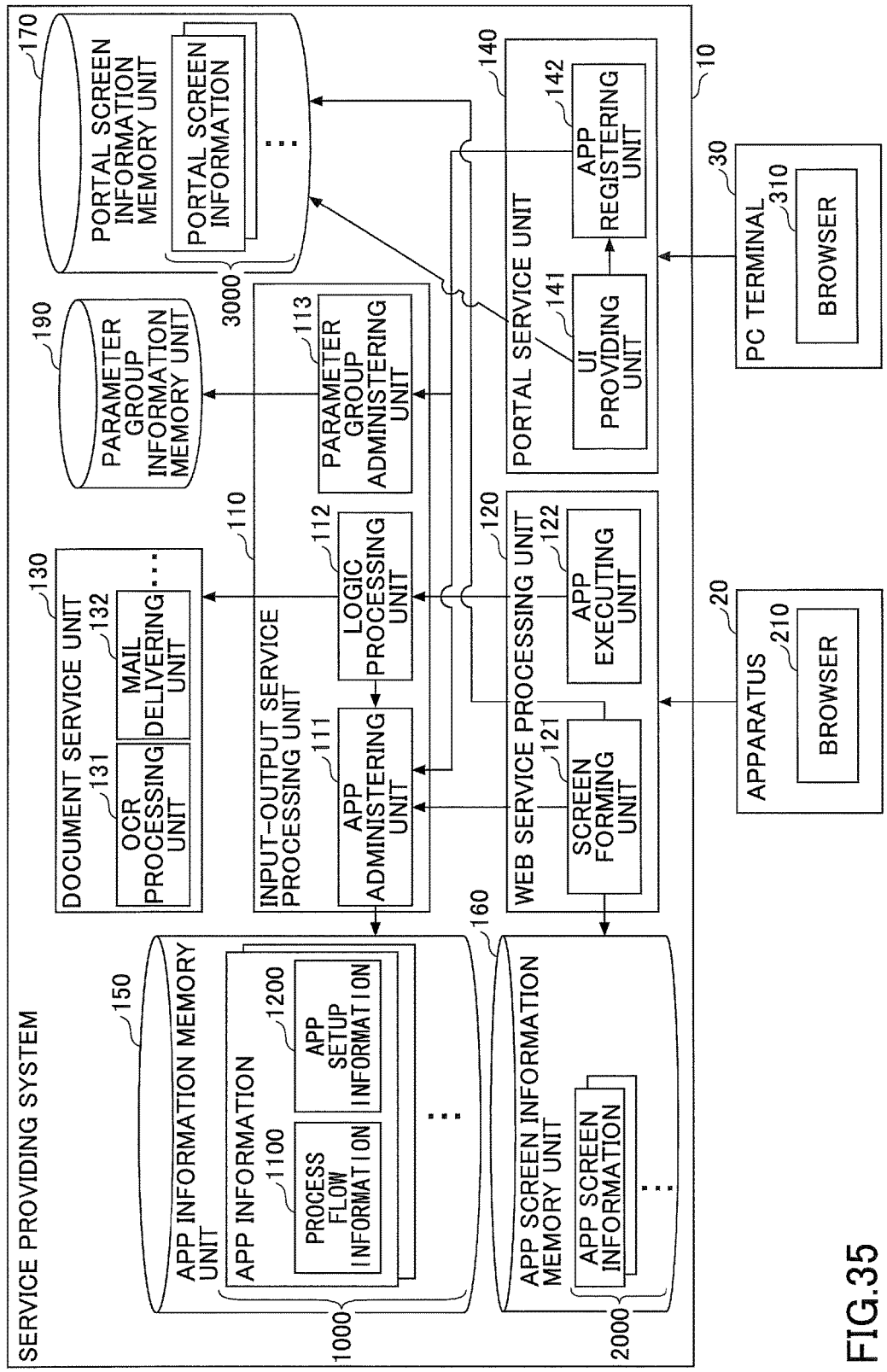
FIG. 35 is a diagram illustrating a functional structure of an example of an information processing system of a fourth embodiment.

Referring to FIG. 35, the functional structure of the information processing system 1 of the fourth embodiment is described. FIG. 35 is a diagram illustrating a functional structure of an example of the information processing system of the fourth embodiment.

The input-output service processing unit 110 of the service providing system 10 illustrated in FIG. 35 further includes a parameter group administering unit 113. Further, the service providing system 10 includes an application information memory unit 190. The parameter group information memory unit 190 can be substantialized by the HDD 18. Further, the parameter group information memory unit 190 may be substantialized by a memory device coupled to the service providing system 10 through the network.

The parameter group administering unit 113 causes the parameter group information to be stored in the parameter group information memory unit 190 in response to a request from the app registering unit 142. The parameter group administering unit 113 acquires the parameter group information from the parameter group information memory unit 190 in response to the request from the app registering unit 142.

The parameter group information memory unit 190 stores the parameter group information. The parameter group information is provided to associate the component or the process flow with the parameter group.

The parameter group information is described in detail later.

<Detailed Process>

Figure 36:
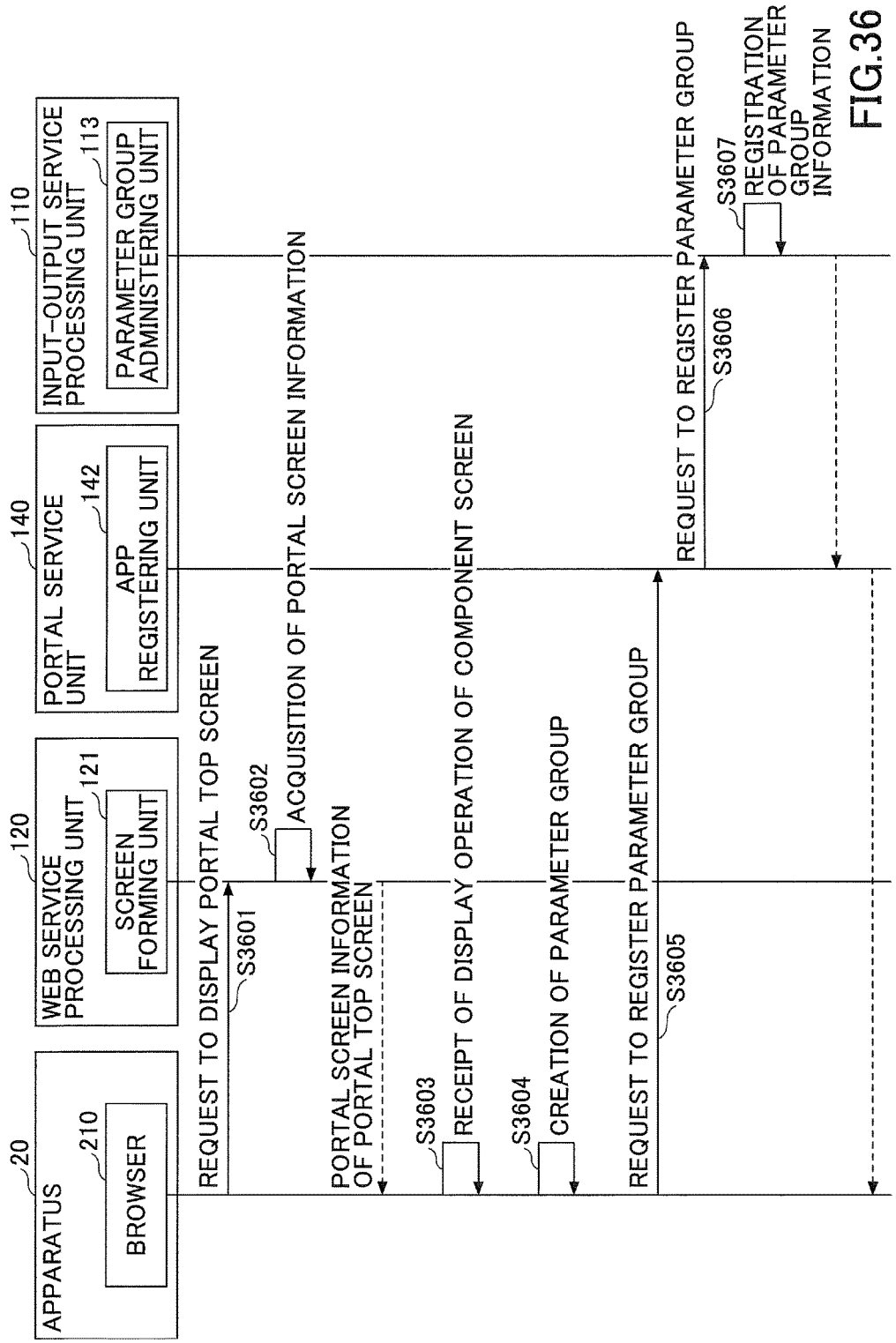
FIG. 36 is a sequence diagram illustrating an example of a process of registering the parameter group for each component.

Described next is a detailed process of the information processing system 1 of the fourth embodiment. Referring to FIG. 36, a process of registering the parameter group for the component is described. FIG. 36 is a sequence diagram illustrating an example of a process of registering a paramenter group for each component.

The browser 210 of the apparatus 20 sends a display request to display a portal top screen to the screen forming unit 121 of the web service processing unit 120 (step S3601). The browser 210 sends the display request to display a portal top screen to the screen forming unit 121 in a case where a display operation of displaying the portal top screen is done by the user or the like.

When the screen forming unit 121 of the web service processing unit 121 receives the display request to display the portal top screen, the screen forming unit 121 acquires portal screen information 3000 of the portal top screen from the portal screen information memory unit 170 (step S3602). Then, the screen forming unit 121 returns the portal screen information 3000 acquired from the portal screen information memory unit 170 to the browser 210. With this, the apparatus 20 displays the portal top screen G100, illustrated in, for example, FIG. 9, by the browser 210.

Then, the browser 210 of the apparatus 20 receives the display operation of displaying the component screen (step S3603). When the user pushes a "Component" button G130 on the portal top screen G100 illustrated in, for example, FIG. 9, the user can perform a display operation of displaying the component screen. After the display operation of the component screen is done, a component registration and update screen G1400 illustrated in, for example, FIG. 37 is displayed in the apparatus 20 by the browser 210.

Figure 37:
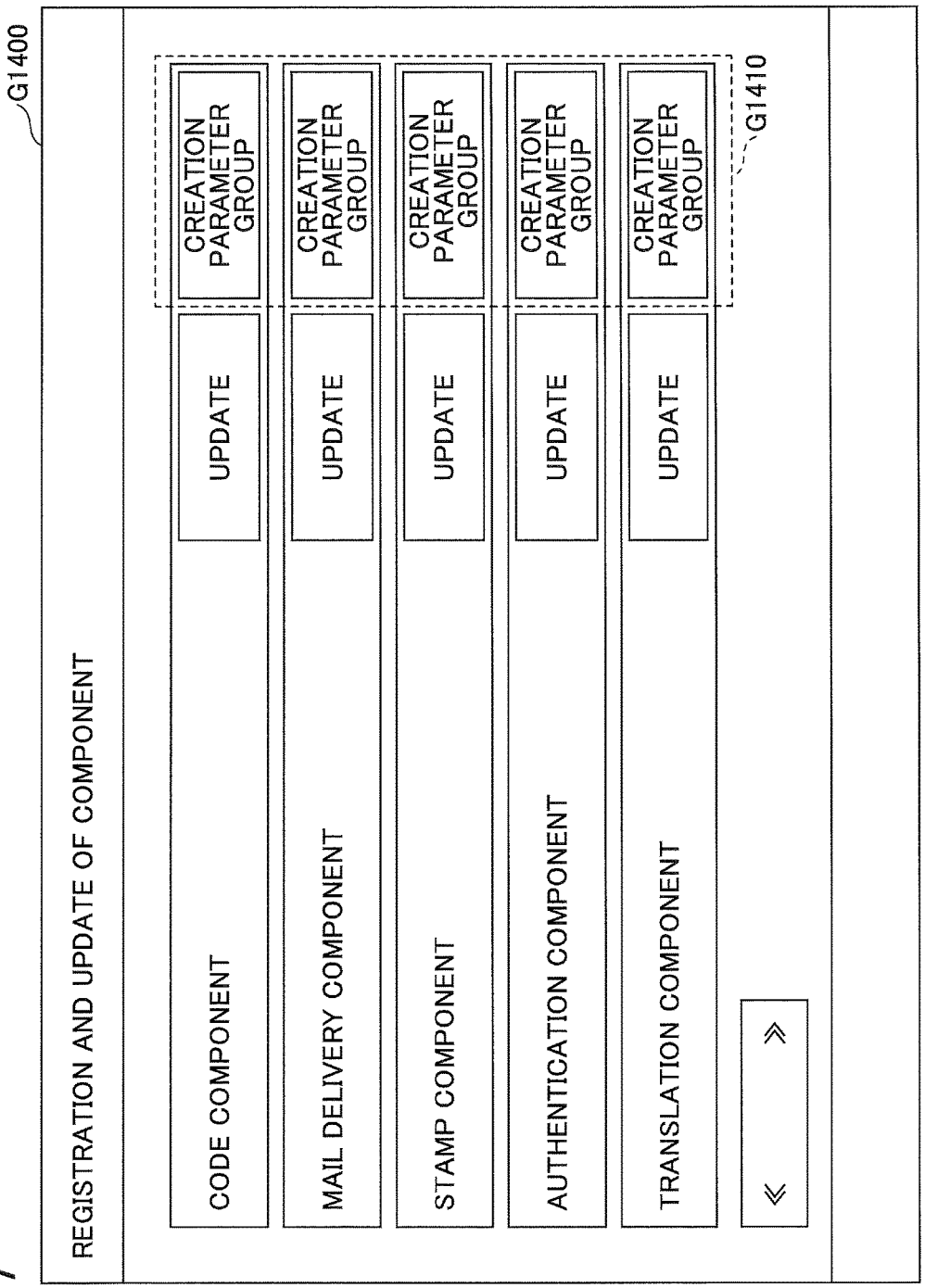
FIG. 37 illustrates an example of a component registration and update screen.

A parameter group creation buttons G1410 for creating and registering the parameter group for the component is included in the component registration and update screen G1400 illustrated in FIG. 37. Each of the parameter group creation buttons G1410 corresponds to each of the components.

After any one of the parameter group creation buttons G1410 is pushed by the user, the apparatus 20 displays a parameter group registration screen G1500 illustrated in, for example, FIG. 38 by the browser 210.

The parameter group registration screen G1500 is provided to create and register the parameter group. A parameter group name input column G1510, an explanation input column G1520, a parameter setup column G1530, and a registration button G1540 are included in the parameter group registration screen G1500 illustrated in FIG. 38.

The parameter group name input column G1510 is provided to input the name of the parameter group. The explanation input column G1520 is provided to input explanation for the parameter group. The parameter setup column G1530 is provided to set setup values of the parameters included in the parameter group.

The user inputs the parameter group name and the explanation of the parameter group respectively to the parameter group name input column G1510 and the explanation input column G1520, and simultaneously sets setup values of the parameters to the parameter setup columns G1530. Then, the user pushes a registration button G1540 and performs a creation operation of the parameter group. With this, the parameter group corresponding to the component that is associated in the component registration and update screen G1400 illustrated in FIG. 37 is created.

Referring to FIGS. 39 and 40, described is another example of a screen for creating and registering the parameter group. FIGS. 39 and 40 illustrate other examples of the registration screen for the parameter group.

A customizing setup column G1610 is included in the parameter group registration screen G1600 illustrated in FIG. 39. The user can set in the customizing setup column G1610 whether a change of the setup value is permitted at the time of registering the application or not. The user can change the setup value of the parameter corresponding to the customizing setup column G1610 having the check mark.

On the other hand, the user cannot change the setup value of the parameter corresponding to the customizing setup column G1610 without having the check mark. As described above, the setup value of a part of the parameters from among the parameters included in the parameter group is made changeable to prevent a situation in which resembling parameter groups are mass-produced.

An open range setup column G1710 is included in a parameter group registration screen G1700 illustrated in FIG. 40. The user can set an open range of the parameter group in the open range setup column G1710. The open range of the parameter group includes "Public", "Share", and "Private". "Public" is set in a case where the parameter group is opened to all users. "Share" is set in a case where the parameter group is opened to a specific user. "Private" is set in a case where the parameter group is not opened to another user.

Referring back to FIG. 36, the description is further given. Then, the browser 210 of the apparatus 20 receives a creation operation of creating the parameter group (step S3604). Next, the browser 210 of the apparatus 20 receives the creation operation of creating the parameter group, the browser 210 of the apparatus 20 sends a registration request to register the parameter group to the app registering unit 142 of the portal service unit 140 (step S3605). The registration request to register the parameter group includes, for example, various information (parameter group name, explanation of the parameter group, and setup values of the parameters) input by, for example, the user through the parameter group registration screen G1500 and the component name of the component corresponding to the parameter group creation buttons G1410 selected by the user.

The app registering unit 142 of the portal service unit 140 receives the registration request to register the parameter group from the screen forming unit 121, and thereafter sends the registration request to the parameter group administering unit 113 of the input-output service processing unit 110 (step S3606).

Next, after the parameter group administering unit 113 of the input-output service processing unit 110 receives the registration request to register the parameter group, the parameter group administering unit 113 registers the parameter group (step S3607). Said differently, the parameter group administering unit 113 creates the parameter group information using the various information included in the registration request to register the parameter group and causes the parameter group information to be stored in the parameter group information memory unit 190.

Hereinafter, referring to FIG. 41, description is given to the parameter group information (said differently, the parameter group information registered for each component) stored in the parameter group information memory unit 190. FIG. 41 illustrates an example of the parameter group information registered for each component.

As illustrated in FIG. 41, the parameter group information registered for each component includes, as a data item, the parameter group ID, the component name, the title, the explanation, and the parameter group.

The parameter group ID is provided to identify the parameter group information. The title is the parameter group name input in the parameter group name input column G1510. The explanation is about the parameter group input into the explanation input column G1520. The parameter group is setup values of the parameters set in the parameter setup column G1530.

The parameter group information, in which the parameter group ID, the component name, the title, the explanation, and the parameter group are associated, is stored in the parameter group information memory unit 190 to register the parameter group.

Figure 42:
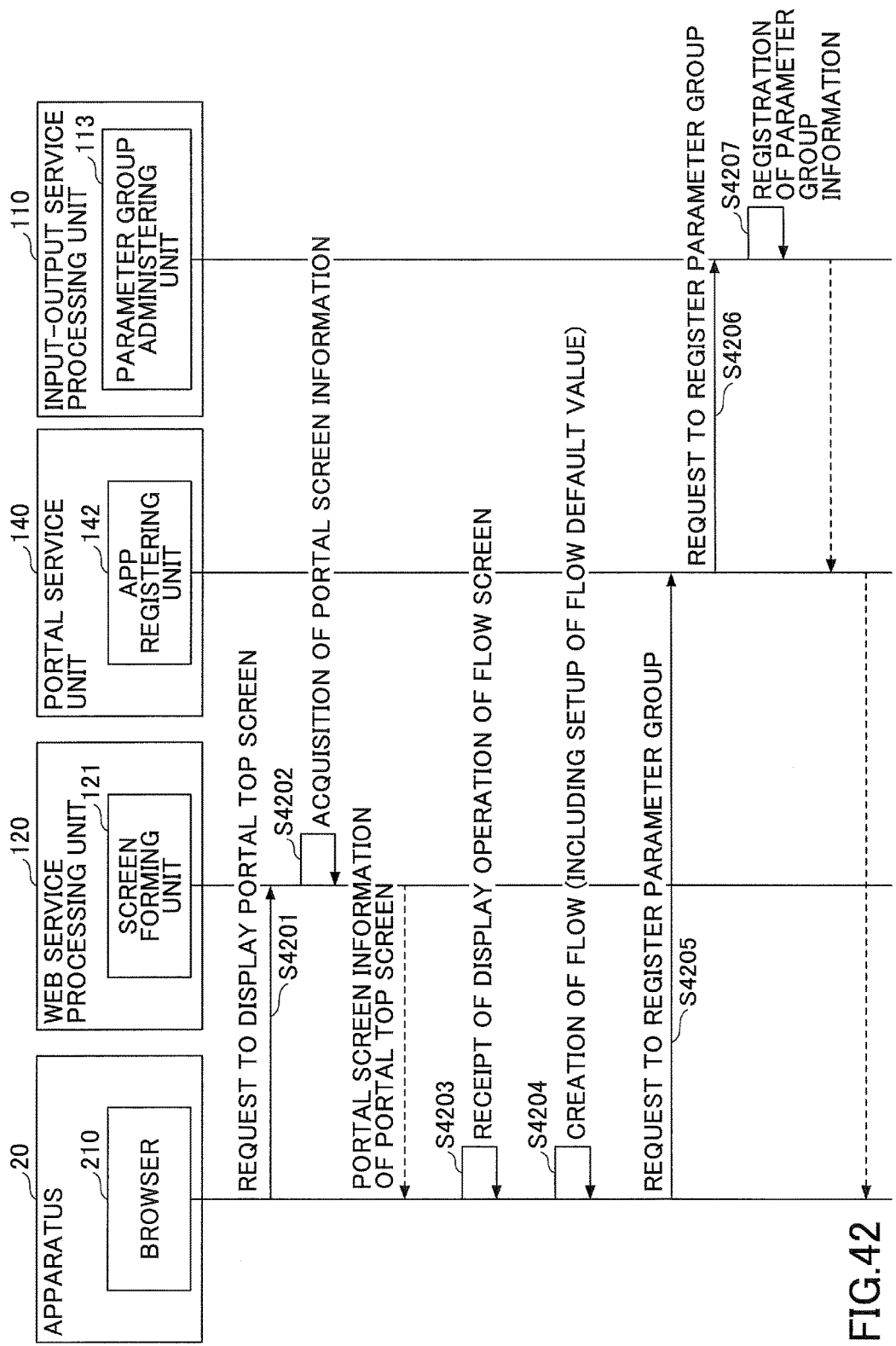
FIG. 42 is a sequence diagram illustrating an example of a process of registering a paramenter group for each flow.

Referring to FIG. 42, a process of registering the parameter group for the process flow is described. FIG. 42 is a sequence diagram illustrating an example of a process of registering the parameter group for each process flow.

The browser 210 of the apparatus 20 sends a display request to display the portal top screen to the screen forming unit 121 of the web service processing unit 120 (step S4201). The browser 210 sends the display request to display a portal top screen to the screen forming unit 121 in a case where a display operation of displaying the portal top screen is done by the user or the like.

When the screen forming unit 121 of the web service processing unit 121 receives the display request to display the portal top screen, the screen forming unit 121 acquires portal screen information 3000 of the portal top screen from the portal screen information memory unit 170 (step S4202). Then, the screen forming unit 121 returns the portal screen information 3000 acquired from the portal screen information memory unit 170 to the browser 210. With this, the apparatus 20 displays the portal top screen G100, illustrated in, for example, FIG. 9, by the browser 210.

Then, the browser 210 of the apparatus 20 receives the display operation of displaying the flow screen (step S4203). When the user pushes a "Flow" button G120 on the portal top screen G100 illustrated in, for example, FIG. 9, the user can perform a display operation of displaying the flow screen. After the display operation of the flow screen is done, a predetermined screen for creating the process flow information 1100 is displayed on the apparatus 20 by the browser 210. The user can create and register the process flow information 1100 and the parameter group for the process flow based on the process flow information 1100. The method for creating and registering the parameter group is as described above by referring to FIGS. 38-43.

The user can create not only the parameter group for the created process flow information 1100 but also the already existing process flow information 1100.

Then, the browser 210 of the apparatus 20 receives a creation operation of creating the parameter group (step S4204). Next, the browser 210 of the apparatus 20 receives the creation operation of creating the parameter group, the browser 210 of the apparatus 20 sends a registration request to register the parameter group to the app registering unit 142 of the portal service unit 140 (step S4205). The registration request of the parameter group includes various information (the parameter group name, the explanation of the parameter group, the setup value, and so on) input by the user and the flow name of the process flow information 1100 created by the user.

The app registering unit 142 of the portal service unit 140 receives the registration request to register the parameter group from the screen forming unit 121, and thereafter sends the registration request to the parameter group administering unit 113 of the input-output service processing unit 110 (step S4206).

Next, after the parameter group administering unit 113 of the input-output service processing unit 110 receives the registration request to register the parameter group, the parameter group administering unit 113 registers the parameter group (step S4607). Said differently, the parameter group administering unit 113 creates the parameter group information using the various information included in the registration request to register the parameter group and causes the parameter group information to be stored in the parameter group information memory unit 190.

Hereinafter, referring to FIG. 43, description is given to the parameter group information (said differently, the parameter group information registered for each process flow) stored in the parameter group information memory unit 190. FIG. 43 illustrates an example of the parameter group information registered for each process flow.

As illustrated in FIG. 43, the parameter group information registered for each process flow includes, as a data item, the parameter group ID, the flow name, the title, the explanation, and the parameter group.

The parameter group information, in which the parameter group ID, the flow name, the title, the explanation, and the parameter group are associated, is stored in the parameter group information memory unit 190 to register the parameter group.

Referring to FIG. 44, a process of registering the application using the registered parameter group is described next. FIG. 44 is a sequence chart of an example of the registration process of the application of the fourth embodiment. Steps S801 to S806 and S809 to S813 illustrated in FIG. 44 are similar to steps S801 to S806 and S809 to S813 illustrated in FIG. 8. Therefore, the description of the steps S801 to S806 and S809 to S813 is omitted.

When the UI providing unit 141 of the portal service unit 140 receives the display request to display the application registration screen subsequent to step S806, the UI providing unit 141 acquires the portal screen information 3000 of the application registration screen from the portal screen information memory unit 170 (step S4401). Said differently, the UI providing unit 141 acquires the portal screen information 3000 for displaying an application registration screen G1800 (described below) from the portal screen information memory unit 170.

Then, the UI providing unit 141 returns the portal screen information 3000 acquired from the portal screen information memory unit 170 to the browser 310.

After the browser 310 of the PC terminal 30 receives the portal screen information 3000 of the application registration screen, the browser 310 displays an application registration screen G1800 as illustrated in FIG. 45 based on the portal screen information 3000 (step S4402).

The application registration screen G1800 illustrated in FIG. 45 is one of various screens, through which the user registers the application. The application registration screen G1800 is provided to select the parameter group. Referring to FIG. 45, the application registration screen G1800 includes a parameter group selection column G1810 and an extended setup button G1820.

The parameter group selection column G1810 is provided to select the parameter group for the process flow executed by the application or the component of executing various processes of the process flow. An example illustrated in FIG. 45 is a case where the parameter group is selected for the process flow of stamping the electronic file generated by scanning.

The extended setup button G1820 is used in a case where the parameter is to be set without using the parameter group. When the extended setup button G1820 is pushed down, the setup values of parameters can be individually set up without using the parameter group.

With this, the user can set the parameter for the process flow executed by the application or the component of executing various processes of the process flow by solely selecting the parameter group.

Figure 46:
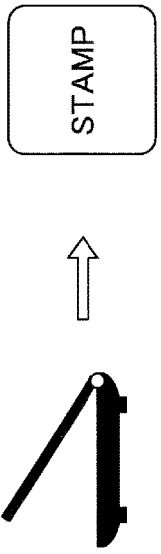
FIG. 46 illustrates another example of the application registration screen of the fourth embodiment.

Referring to FIG. 46, another example of the application registration screen for selecting the parameter group is described. An application registration screen G1900 illustrated in FIG. 46 is a case where the customizing setup column G1610 illustrated in FIG. 39 is provided with a check mark. Referring to FIG. 46, the customizing setup column G1610 for parameters "vertical margin" and "horizontal margin" are checked, and a change column of the setup values of the parameters "vertical margin" and "horizontal margin" are included. Thus, the user can change the setup values of the parameters "vertical margin" and "horizontal margin".

Referring back to FIG. 44, the description is further given. Subsequent to step S809 (i.e., after receiving the registration operation of the application), the browser 310 of the PC terminal 30 sends an acquisition request to acquire the parameter group to the app registering unit 142 of the portal service unit 140 (step S4403). The acquisition request to acquire the parameter group includes a parameter group ID of a parameter group selected in a parameter group selection column G1810 of the application registration screen G1800, for example.

The app registering unit 142 of the portal service unit 140 receives the acquisition request to register the parameter group, and thereafter sends the acquisition request to the parameter group administering unit 113 of the input-output service processing unit 110 (step S4404).

After the parameter group administering unit 113 of the input-output service processing unit 110 receives the acquisition request to acquire the parameter group, the parameter group administering unit 113 acquires the parameter group information of the parameter group ID from the parameter group information memory unit 190 (step S4405). The parameter group administering unit 113 returns the parameter group information acquired from the parameter group information memory unit 190 to the browser 310 through the app registering unit 142.

Next, after the parameter group information is returned, the browser 310 of the PC terminal 30 creates the app setup information 1200, in which parameters of the parameter group included in the parameter group information are defined (step S4406). With this, the app setup information 1200 defining the setup values of the parameters included in the parameter group is registered.

As described above, the user can register the parameter group for the component and the process flow. Further, in the information processing system 1 of the fourth embodiment, the user uses the parameter group previously registered to register the application. At this time, the user can easily set the parameter of the application by selecting the desired parameter group from among the parameter groups previously registered.

Fifth Embodiment

A fifth embodiment is described next. Within the fifth embodiment, described is a case where validation is registered at a time of inputting the setup value of the parameter of the application. With this, it is possible to prevent a situation where a value unusable as the setup value of the parameter at a time of inputting the setup value of the parameter to use the application, for example.

Within the fifth embodiment, a difference from the first embodiment is mainly explained. Description of a portion having a function structure substantially similar to the function structure of the first embodiment and a portion performing a process substantially similar to the process of the first embodiment is appropriately omitted.

<Detailed Process>

Figure 47:
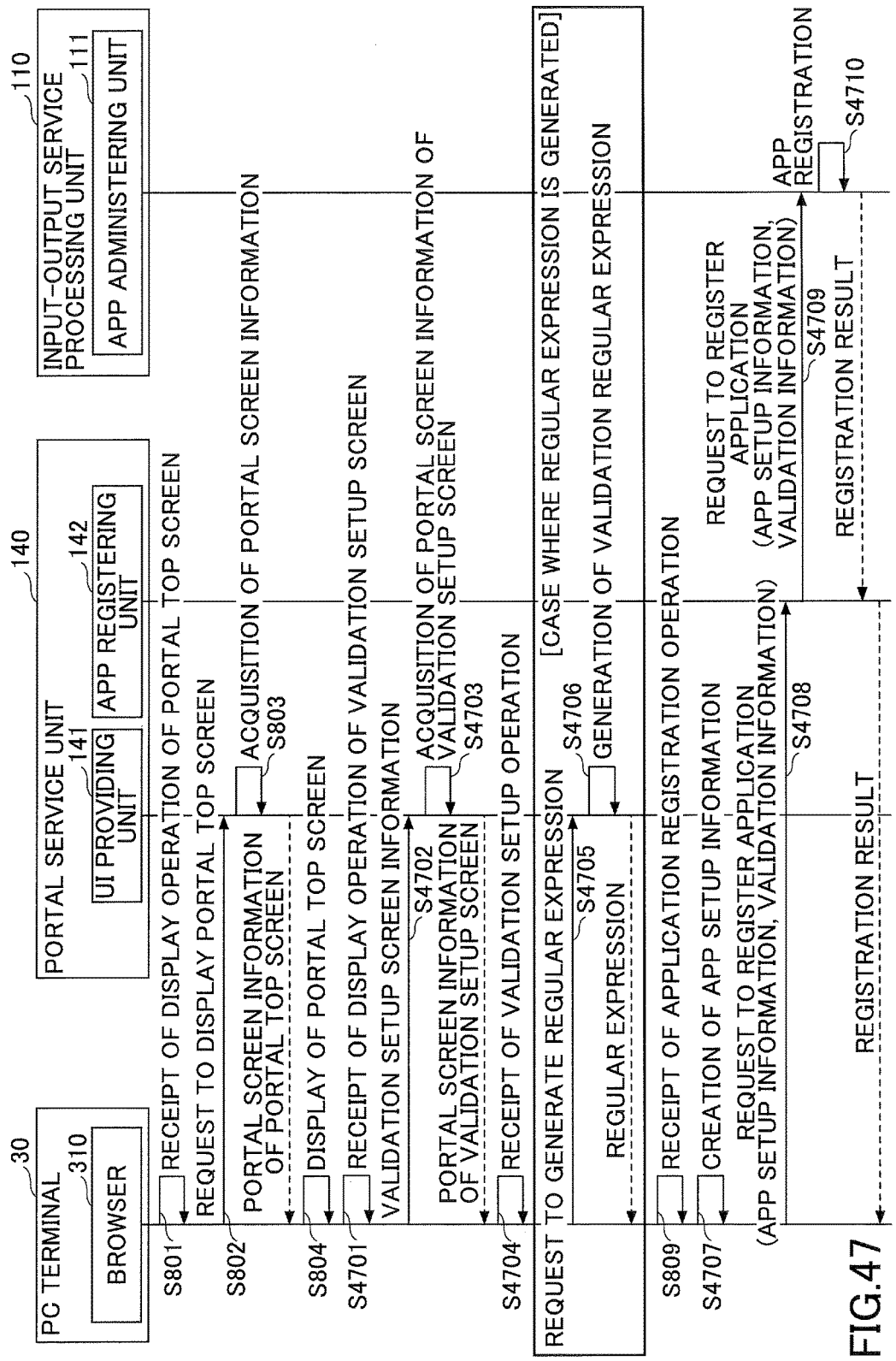
FIG. 47 is a sequence chart of an example of a registration process to register an application according to a fifth embodiment.

Described next is a detailed process of the information processing system 1 of the fifth embodiment. Referring to FIG. 47, described is a process in a case where the validation of the parameter of the application is registered when the user of the PC terminal 30 registers the application. FIG. 47 is a sequence chart of an example of the registration process of the application of the fifth embodiment. The steps S801 to S804 and S809 illustrated in FIG. 47 are similar to the steps S801 to S804 and S809 illustrated in FIG. 8. Therefore, the description of the steps S801 to S804 and S809 is omitted.

Subsequent to step S804, the browser 310 of the PC terminal 30 receives a display operation to display a validation setup screen (step S4701). The user pushes a validation setup button G2010 corresponding to the parameter, for which the validation is to be set, on the application registration screen G2000 illustrated in, for example, FIG. 48, to enable the display operation of the validation setup screen.

When the browser 310 of the PC terminal 30 receives the display operation of the validation setup screen, the browser 310 sends a display request to display the validation setup screen to the UI providing unit 141 of the portal service unit 140 (step S4702).

When the UI providing unit 141 of the portal service unit 140 receives the display request to display the validation setup screen, the UI providing unit 141 acquires the portal screen information 3000 of the validation setup screen from the portal screen information memory unit 170 (step S4703).

Then, the UI providing unit 141 returns the portal screen information 3000 acquired from the portal screen information memory unit 170 to the browser 310. With this, the validation setup screen G2100 illustrated in, for example, FIG. 49 is displayed by the browser 310 on the PC terminal 30.

Figure 49:
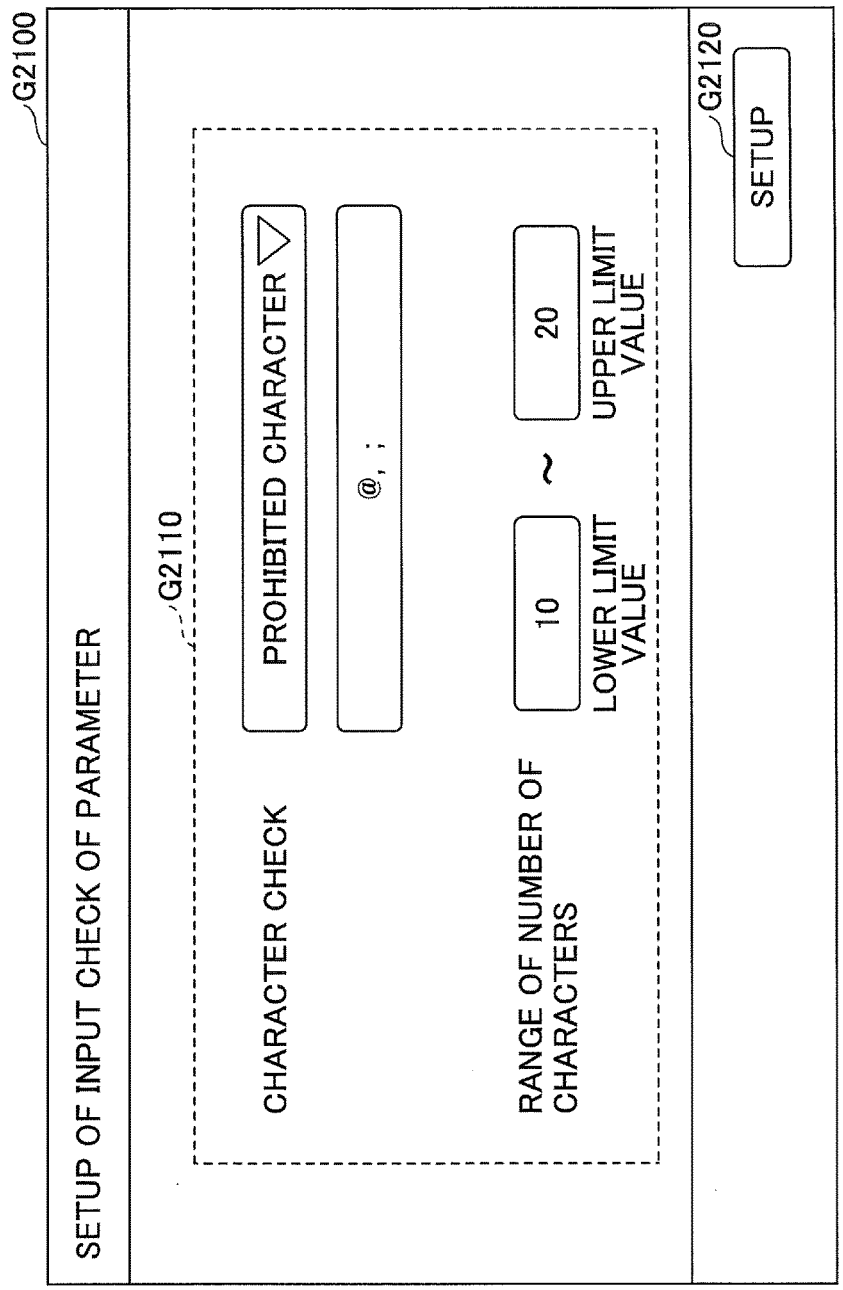
FIG. 49 illustrates an example of another application registration screen of the fifth embodiment.

The application registration screen G2100 illustrated in FIG. 49 is provided to set the validation of the parameter corresponding to the validation setup button G2010 pushed by the user. The application registration screen G2100 illustrated in FIG. 49 includes a validation setup column G2110 and a setup button G2120.

The user sets the validation for the parameter in the validation setup column 62110 and thereafter pushes the setup button G2120 to resultantly perform the validation setup operation. An example illustrated in FIG. 49 is about a character check for the setup value of the parameter as the validation and a setup of the range of number of characters.

Referring back to FIG. 47, the description is further given. The browser 310 of the PC terminal 30 receives a setup operation of setting a validation setup operation (step S4704).

The validation of the character check includes a method of generating a regular expression in the portal service unit 140 and a method of reading a validation function by the input-output service processing unit 110. The selection of one of the methods is previously set by the administrator of the service providing system 10, for example.

In the case where the regular expression is generated by the portal service unit 140, the browser 310 of the PC terminal 30 sends a request to generate the regular expression to the UI providing unit 141 of the portal service unit 140 (step S4705).

Next, after the UI providing unit 141 of the portal service unit 140 receives the request to generate regular expression, the UI providing unit 141 generates the regular expression of the validation such as the character check (step S4706). Said differently, the UI providing unit 141 generates the validation information, in which the validation is represented by the regular expression.

The UI providing unit 141 returns the generated validation regular expression (the validation information representing the validation using the regular expression) to the browser 310.

Here, the validation information represented by the regular expression is illustrated in FIG. 50. FIG. 50 illustrates an example of validation information expressed by a regular expression. An example illustrated in FIG. 50 is the validation information where input prohibited characters are "@" and ";", and the validation having the number of characters is 10 or more and 20 or less is represented by the regular expression.

FIG. 51 illustrates the validation information (said differently, validation information in a case where the validation function is read by the input-output service processing unit 110) which is not represented by the regular expression. FIG. 51 illustrates an example of validation information reading a validation function. An example illustrated in FIG. 50 is the validation information, in which input allowed characters are only real numbers, and the function having the number of characters of 10 or more and 20 or less and performing the validation is defined.

The validation function includes "type" indicative of the validation type. The example illustrated in FIG. 51 includes "real" indicative of the validation type that the input allowed characters are only the real numbers.

In a case where the validation information indicative of the regular expression is not created, the validation information reading the validation function is created by, for example, the browser 310.

Referring back to FIG. 47, the description is further given. Subsequent to step S809, the browser 310 of the PC terminal 30 receives the registration operation and thereafter creates the app setup information 1200 including the validation information 1200 (step S4707).

Next, the browser 310 of the PC terminal 30 sends a registration request to register the application app registering unit 142 of the portal service unit 140 (step S4708). The registration request to register the application includes the app setup information 1200 created by step S4707.

The app registering unit 142 of the portal service unit 140 receives the registration request to register the application, and thereafter sends the registration request to the app administering unit 111 of the input-output service processing unit 110 (step S4709).

The app administering unit 111 of the input-output service processing unit 110 receives the registration request to register the application and thereafter registers the application (step S4710). Then, the app administering unit 111 returns the registration result to the browser 310. With this, the application, in which the validation is set, is registered.

Figure 52:
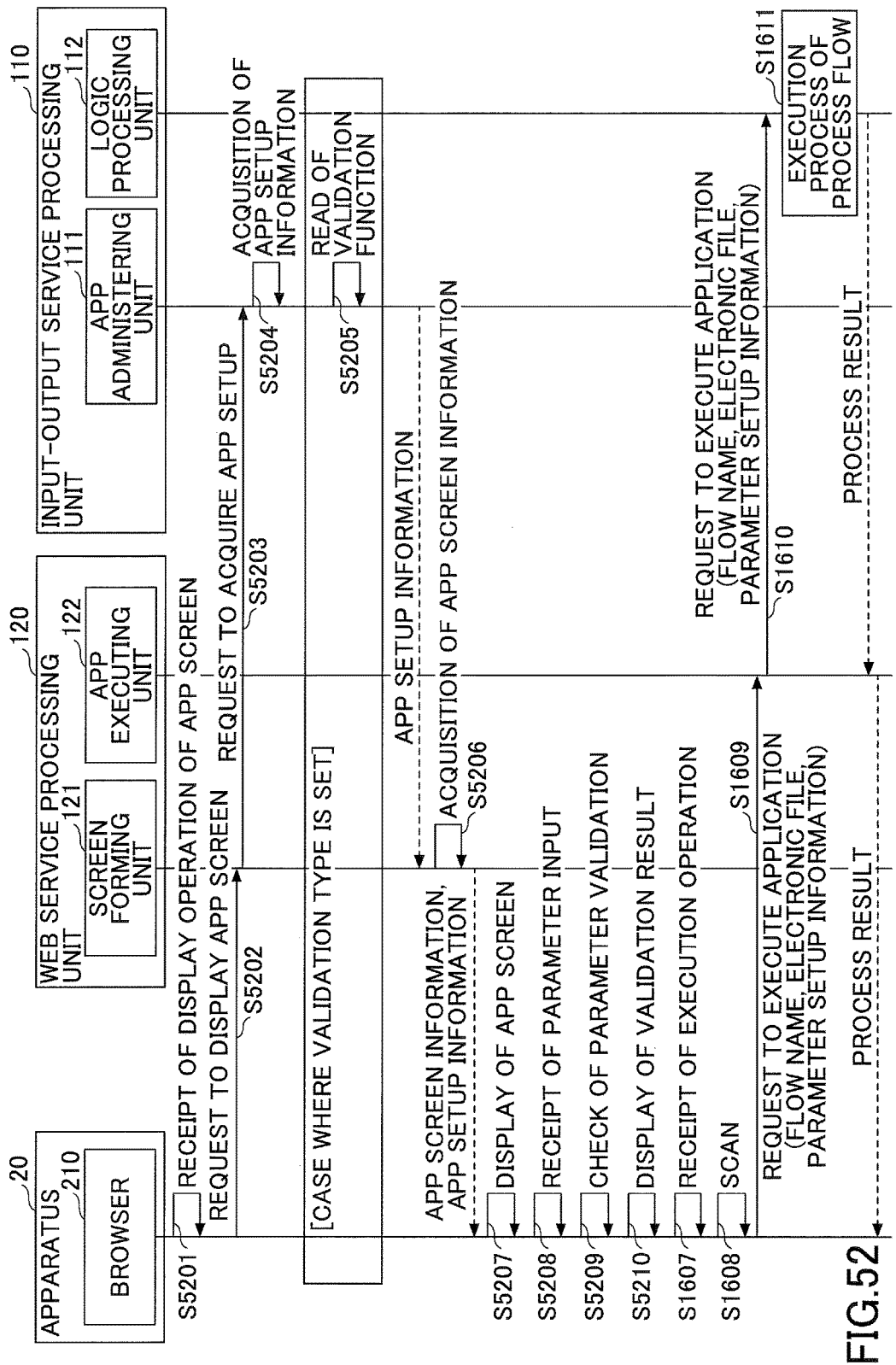
FIG. 52 is a sequence diagram illustrating an example of an overall process in a case where a service provided by an application, in which the validation is set is used.

Referring to FIG. 52, described next is a case where the user of the apparatus 20 uses a service provided by the application, in which the validation is set.

FIG. 52 is a sequence diagram illustrating an example of an overall process in a case where a service provided by the application, in which the validation is set. The steps S1607 to S1611 illustrated in FIG. 52 are similar to the steps S1607 to S1611 illustrated in FIG. 16. Therefore, the description of the steps S1607 to S1611 is omitted.

The browser 210 of the apparatus 20 receives an operation (a display operation) for causing the app screen of the service provided by the application, in which the validation is set (step S5201). The user of the apparatus 20 inputs the URL of the app screen of the service to the address bar of the browser 210 to enable a display operation to display the app screen.

The browser 210 of the apparatus 20 receives a display operation to display the app screen of the service and thereafter sends a display request to display an app screen of the service to the screen forming unit 121 of the web service processing unit 120 (step S5202). The display request to acquire the app screen includes the app ID of the app information 1000.

The screen forming unit 121 of the web service processing unit 120 receives the display request of the app screen of the service and thereafter sends an acquisition request to acquire an app setup to the app administering unit 111 of the input-output service processing unit 110 (step S5203). The acquisition request to acquire the app setup includes the app ID of the app information 1000 of the application providing the service.

The app administering unit 111 of the input-output service processing unit 110 receives the acquisition request to acquire the app setup and thereafter acquires the app setup information 1200 stored in association with the app ID included in the acquisition request from the app information memory unit 150 (step S5204).

Next, when the app setup information 1200 acquired in step S5204 includes the validation type, the app administering unit 111 of the input-output service processing unit 110 reads the validation function (step S5205).

The app administering unit 111 returns the app setup information 1200 to the screen forming unit 121. In a case where the app setup information 1200 does not include the validation, the app administering unit 111 returns the app setup information 1200 acquired in step S5204 to the screen forming unit 121. The case where the app setup information 1200 does not includes the validation type is a case where the app setup information 1200 does not include the validation or a case where the app setup information 1200 includes the validation using the regular expression.

FIG. 53 illustrates the app setup information 1200 after reading the validation function. FIG. 53 illustrates an example of the app setup information 1200 of the fifth embodiment.

The validation 1213 created by reading the validation function is defined in the app setup information 1200 illustrated in FIG. 53.

Referring back to FIG. 52, the description is further given. Subsequent to step S5205, the screen forming unit 121 of the web service processing unit 120 acquires the app screen information 2000 stored in association with the app ID of the app information 1000 which provides the service from the app screen information memory unit 160 (step S5206). The screen forming unit 121 returns the app screen information 2000 acquired from the app screen information memory unit 160 and the app setup information 1200 returned in step S5205 to the browser 210.

Figure 54:
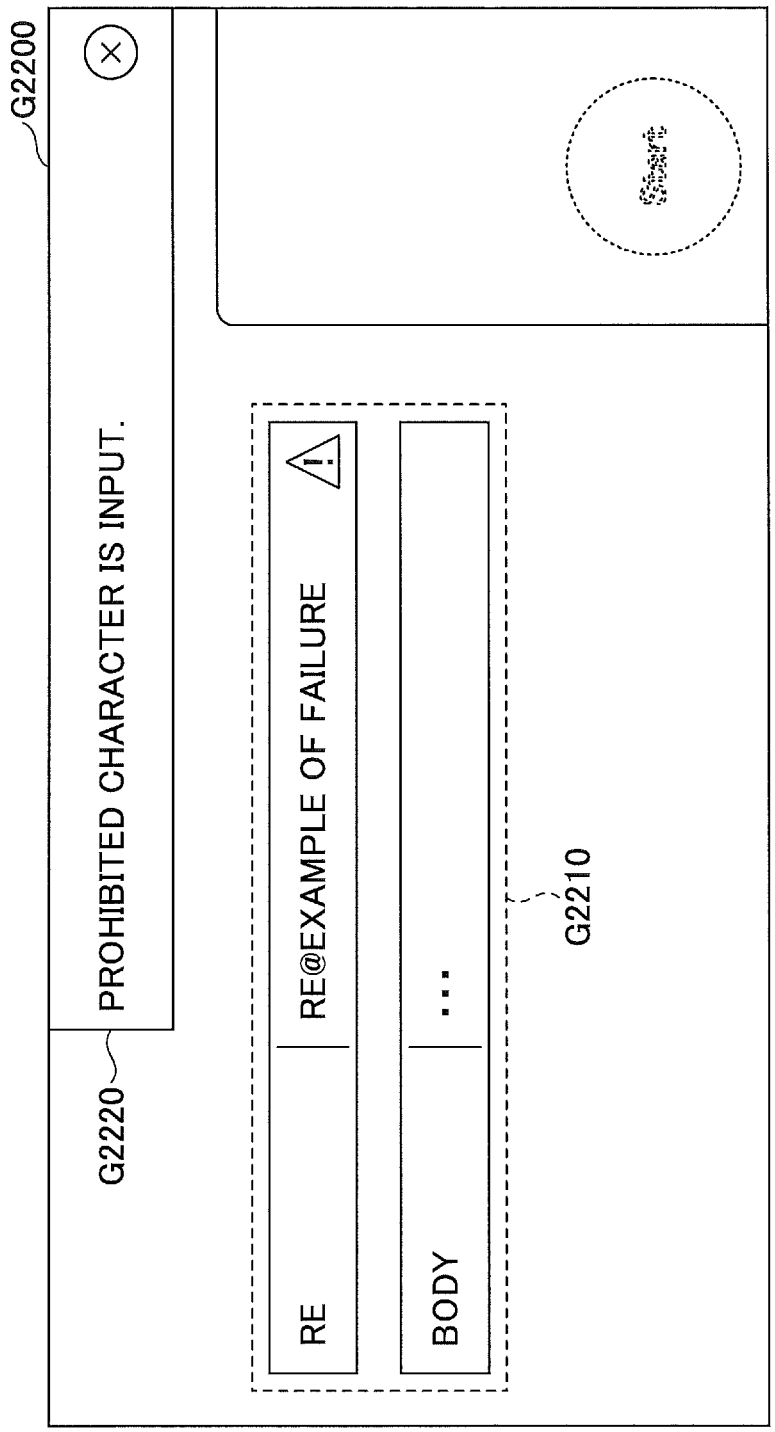
FIG. 54 illustrates an example of an app screen on which a validation result is displayed.

The browser 210 of the apparatus 20 displays an app screen G2200 illustrated in, for example, FIG. 54 based on the app screen information 2000 and the app setup information 1200, which are received from the screen forming unit 121 (step S5207).

A parameter input column G2210 for inputting the parameter of the application is included in the app screen G2200 illustrated in FIG. 54. In the example illustrated in FIG. 54, a parameter indicative of the "reference (RE) and a parameter indicative of the body can be input.

The user inputs a desired setup value into the parameter input column G2210 to conduct the parameter input operation.

Next, the browser 210 of the apparatus 20 receives a parameter input operation (step S5208).

The browser 210 of the apparatus 20 receives the parameter input operation and thereafter conducts a validation check for the input setup value (step S5209).

Described below is a case where a character prohibited to be input is included in the setup value of the parameter input by the parameter input operation. In this case, the browser 210 of the apparatus 20 displays a validation result G2220 on the app screen G2200 illustrated in FIG. 54 (step S5210). The validation result G2220 indicates that the prohibited character is input into the parameter setup value of the input parameter. The user can know that the parameter setup value of the parameter input by the user and correctly input the setup value of the parameter based on the validation result G2220.

In a case where an input causing the parameter setup value to be erroneous as the validation result G2220 is performed, the app screen G2200 indicates that a "Start" button for executing scanning cannot be pushed.

As described, within the fifth embodiment, the validation check for checking the parameter setup value of the parameter input by the user is conducted. With this, it is possible to prevent a situation such that the character prohibited to be input is set up or such that the number of characters to be set exceed the predetermined number of characters from occurring.

Referring to FIG. 47, described is that the validation information of the validation set to the application at is created at a time of registering the application. However, the created validation information may be registered. The validation may be set to the application using the registered validation information.

Figure 55:
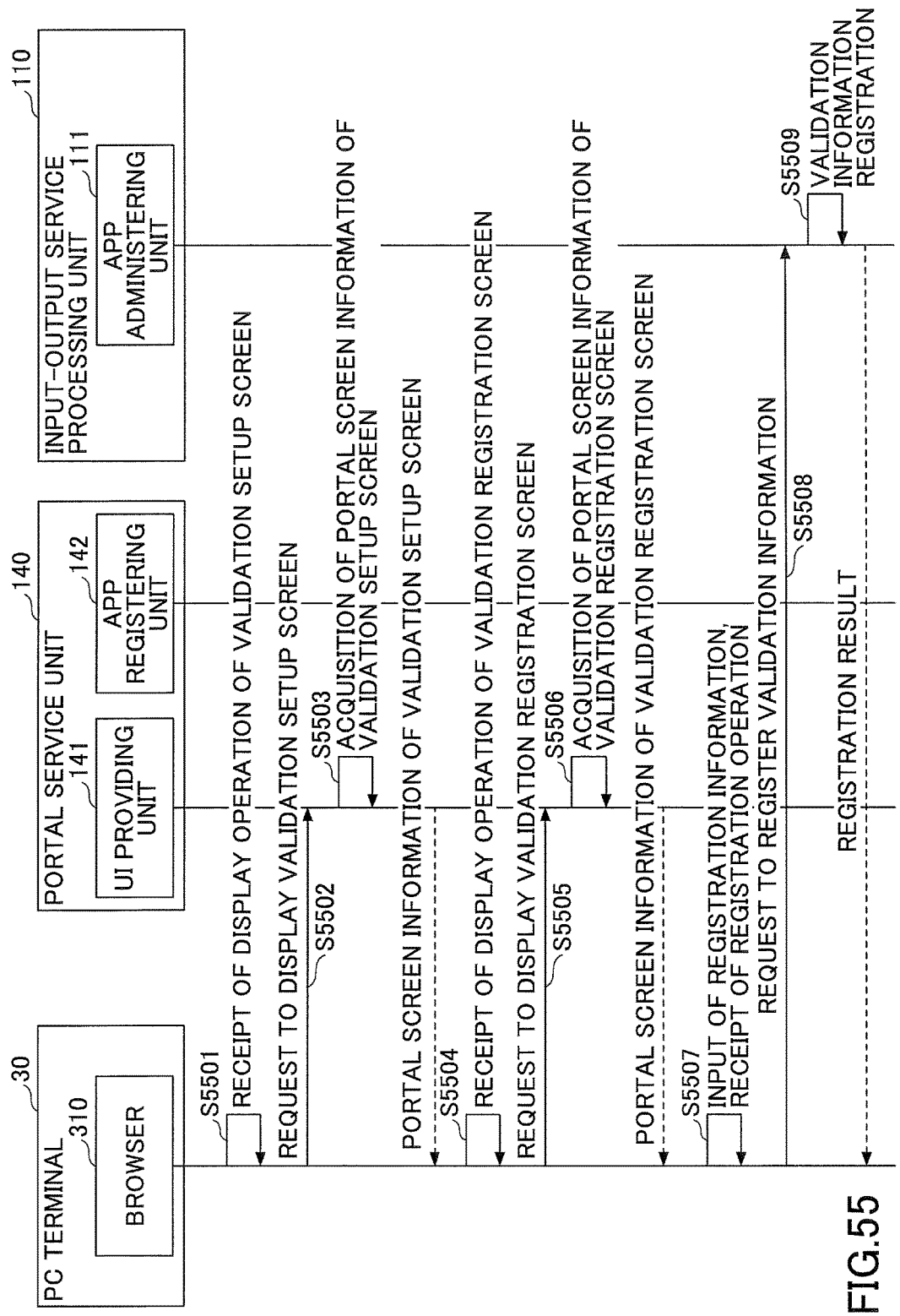
FIG. 55 is a sequence diagram illustrating an example of a registration process to register validation information.

Referring to FIG. 55, described below is a case where the validation information is created and registered. FIG. 55 is a sequence diagram illustrating an example of a registration process of validation information.

The browser 310 of the PC terminal 30 receives a display operation of displaying a validation setup operation (step S5501). For example, the user pushes a link to the validation setup screen to perform a display operation to display the validation setup screen.

When the browser 310 of the PC terminal 30 receives the display operation of the validation setup screen, the browser 310 sends a display request to display the validation setup screen to the UI providing unit 141 of the portal service unit 140 (step S5502).

When the UI providing unit 141 of the portal service unit 140 receives the display request to display the validation setup screen, the UI providing unit 141 acquires the portal screen information 3000 of the validation setup screen from the portal screen information memory unit 170 (step S5503).

Then, the UI providing unit 141 returns the portal screen information 3000 acquired from the portal screen information memory unit 170 to the browser 310. With this, a validation setup screen G2300 illustrated in, for example, FIG. 56 is displayed by the browser 310 on the PC terminal 30.

Figure 56:
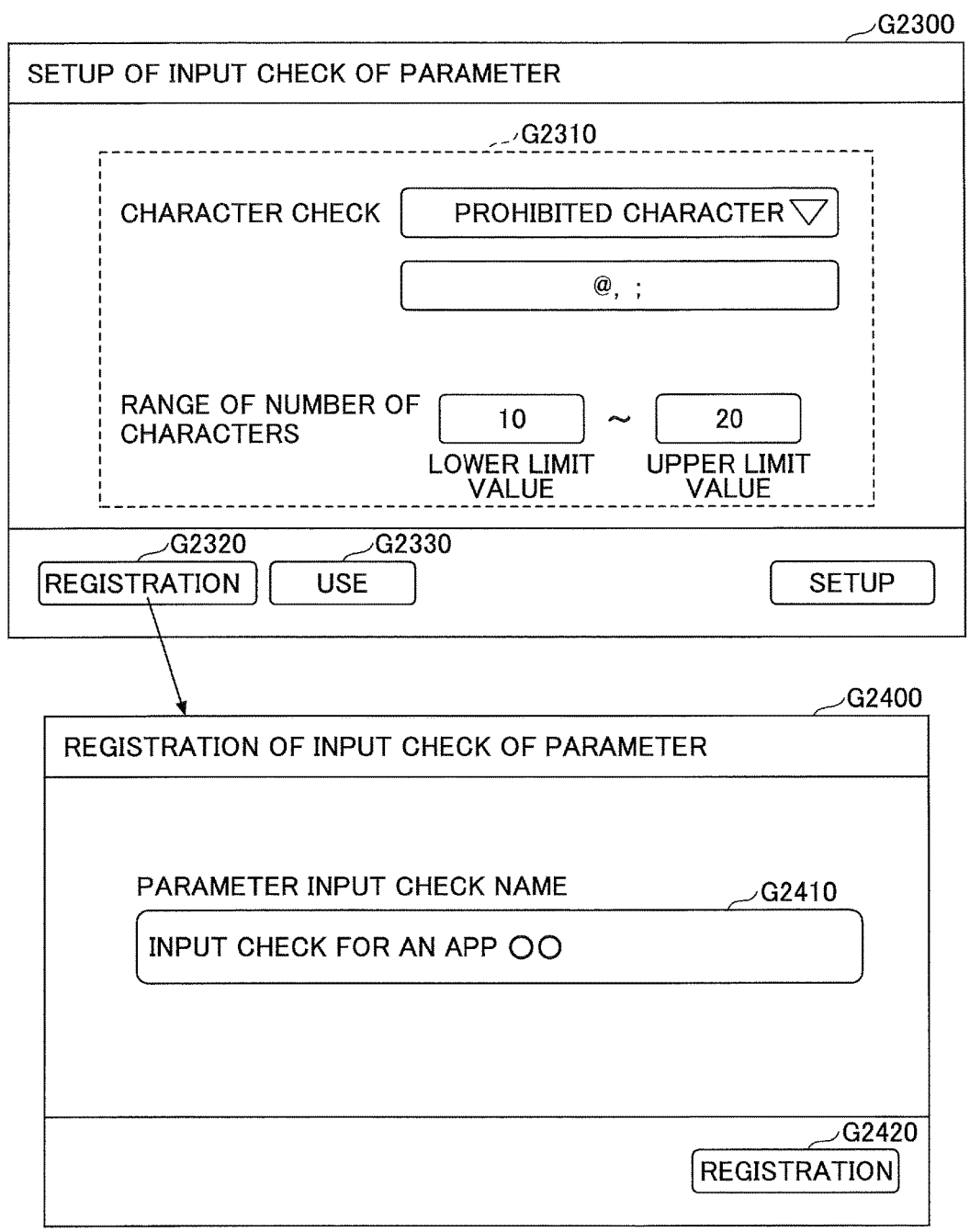
FIG. 56 illustrates an example of a validation registration screen.

The validation setup screen G2300 illustrated in FIG. 56 includes a validation setup column G2310, a registration button G2320, and a use button G2330.

The user sets the validation for the parameter in the validation setup column G2310 and thereafter pushes the registration button G2320 to resultantly perform the display operation of the validation setup operation.

Referring back to FIG. 55, the description is further given. The browser 310 of the PC terminal 30 receives a display operation of displaying the validation registration screen (step S5504). When the browser 310 of the PC terminal 30 receives the display operation of the validation registration screen, the browser 310 sends a display request to display the validation registration screen to the UI providing unit 141 of the portal service unit 140 (step S5505).

When the UI providing unit 141 of the portal service unit 140 receives the display request to display the validation registration screen, the UI providing unit 141 acquires the portal screen information 3000 of the validation registration screen from the portal screen information memory unit 170 (step S5506).

Then, the UI providing unit 141 returns the portal screen information 3000 acquired from the portal screen information memory unit 170 to the browser 310. With this, a validation registration screen G2400 illustrated in, for example, FIG. 56 is displayed by the browser 310 on the PC terminal 30.

The validation registration screen G2400 illustrated in FIG. 56 includes a validation name input column G2410 and a registration button G2420.

The user inputs the name for identifying the validation in the validation name input column G2410 and thereafter pushes the registration button G2420 so as to perform a validation registration operation. After the validation registration operation is performed, the browser 310 creates the validation information including the validation name input into the validation name input column G2410 and the validation input into the validation setup column G2310.

Referring back to FIG. 55, the description is further given. The browser 310 of the PC terminal 30 receives a validation registration operation of registering the validation (step S5507). The browser 310 of the PC terminal 30 receives the validation registration operation and thereafter sends a validation information registration request to the app administering unit 111 of the input-output service processing unit 110 (step S5508). The validation information registration request includes the validation information.

The app administering unit 111 of the input-output service processing unit 110 receives the validation information registration request and thereafter registers the validation information included in the validation information registration request (step S5509). Said differently, the app administering unit 111 stores the validation information into a predetermined memory area (for example, the app information memory unit 150). Then, the app administering unit 111 returns the registration result of the validation information to the browser 310.

As described, according to the information processing system 1 of the fifth embodiment, the validation information can be registered into the service providing system 10.

Figure 57:
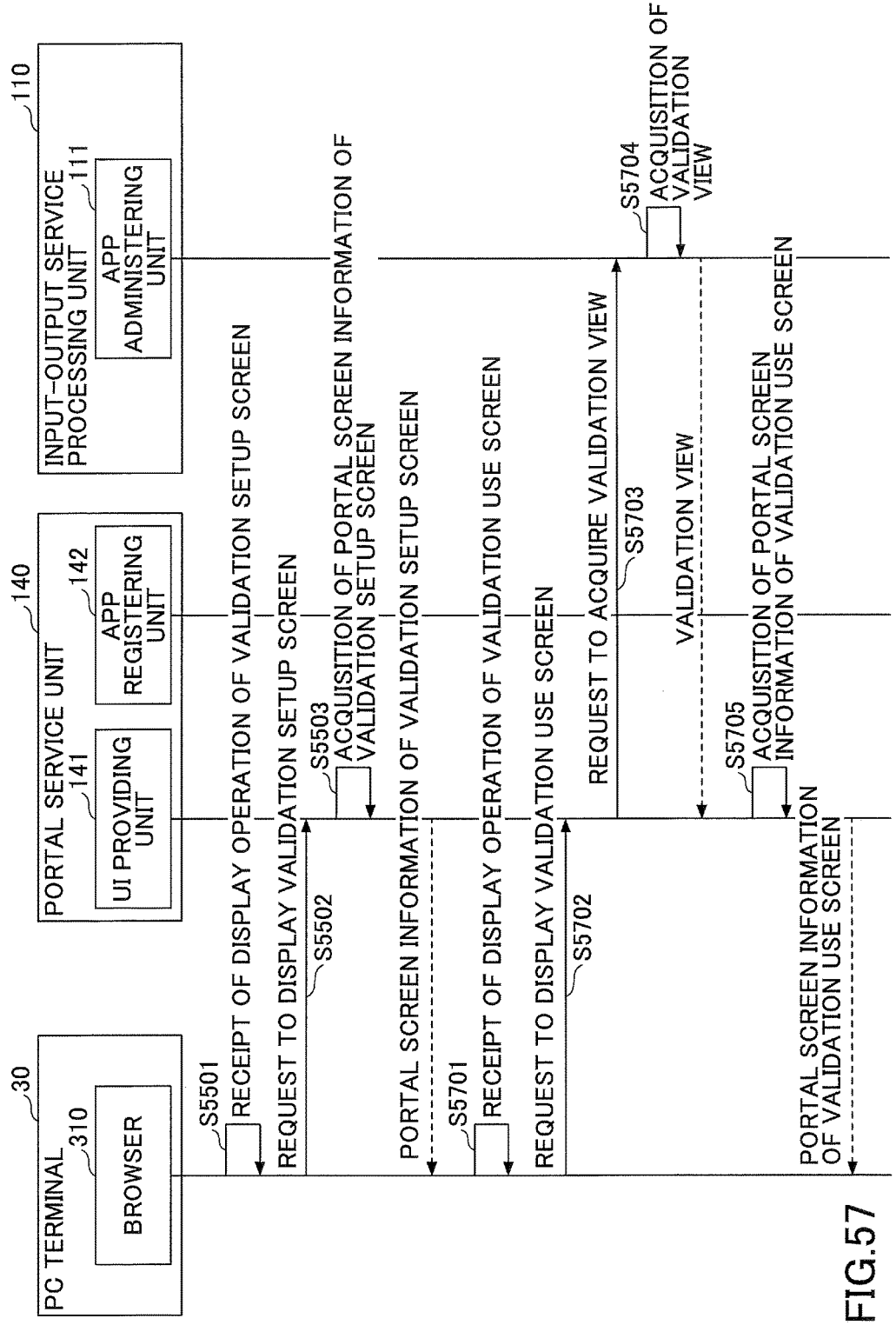
FIG. 57 is a sequence diagram illustrating another example of the registration process to register the validation information.

Referring to FIG. 57, described next is a case where the registered validation information is used. FIG. 57 is a sequence diagram illustrating another example of the registration process of the validation information. The steps S5501 to S5503 illustrated in FIG. 57 are similar to the steps S5501 to S5503 illustrated in FIG. 55. Therefore, the description of the steps S5501 to S5503 is omitted.

The browser 310 of the PC terminal 30 receives a display operation of displaying the validation use screen (step S5701). The user pushes the use button G2330 on the validation setup screen G2300 illustrated in FIG. 56 so as to perform a display operation of displaying a validation use screen.

When the browser 310 of the PC terminal 30 receives the display operation of displaying the validation use screen, the browser 310 sends a display request to display the validation use screen to the UI providing unit 141 of the portal service unit 140 (step S5702).

The UI providing unit 141 of the portal service unit 140 receives a display request to display the validation use screen and thereafter sends a validation view acquisition request to acquire the validation view to the app administering unit 111 of the input-output service processing unit 110 (step S5703).

The app administering unit 111 of the input-output service processing unit 110 receives the validation view acquisition request and thereafter acquires the registered validation information view (the validation view) (step S5704). The app administering unit 111 acquires the validation information view stored in the predetermined memory area (for example, the app information memory unit 150). The app administering unit 111 may acquire a validation view name included in the registered validation information.

The app administering unit 111 returns the acquired validation view to the UI providing unit 141.

When the UI providing unit 141 of the portal service unit 140 receives the validation view, the UI providing unit 141 acquires the portal screen information 3000 of the validation use screen from the portal screen information memory unit 170 (step S5505). Then, the UI providing unit 141 returns the portal screen information 3000 acquired from the portal screen information memory unit 170 and the validation view to the browser 310. With this, a validation use screen G2500 illustrated in, for example, FIG. 58 is displayed by the browser 310 on the PC terminal 30.

Figure 58:
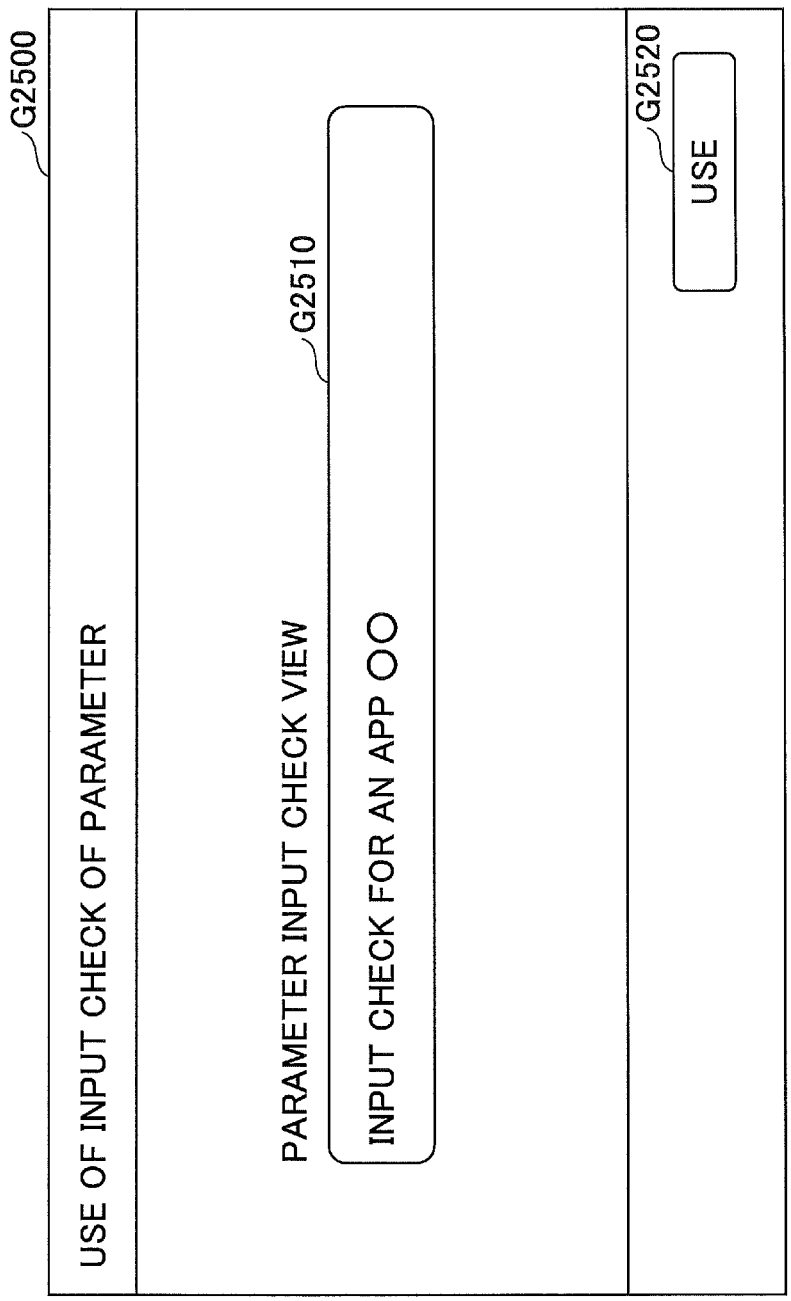
FIG. 58 illustrates an example of a validation use screen.

The validation use screen G2500 illustrated in FIG. 58 includes a validation selection column G2510 and a use button G2520. The user selects the desired validation from the validation selection column G2510 and thereafter pushes the use button G2520 so as to enable to use the selected validation. Thus selected validation information can be set to, for example, the application. Alternatively, the selected validation information may be edited and thereafter registered again.

As described above, the information processing system 1 is enabled to use the validation information registered in the service providing system 10 so as to set the validation to the application or edit the validation information.

Sixth Embodiment

A sixth embodiment is described next. Within the sixth embodiment, described next is a case where a folder browse process flow of browsing a folder is automatically created.

In an application of downloading or uploading a file, an ID of the file or a folder in a file storage service is required to input as a parameter. This ID can be designated while the file or the folder is being browsed, for example. However, a user having low experience in developing applications possibly encounters difficulty in creating a process flow for browsing. Therefore, within the sixth embodiment, the process flow for browsing of acquiring a file view or a folder view is automatically created by designating an input means for inputting the parameter at a time of registering the application by a user. With this, the application performing the folder browse can be easily developed.

Within the sixth embodiment, a difference from the first embodiment is mainly explained. Description of a portion having a function structure substantially similar to the function structure of the first embodiment and a portion performing a process substantially similar to the process of the first embodiment is appropriately omitted.

<Function Structure>

Figure 59:
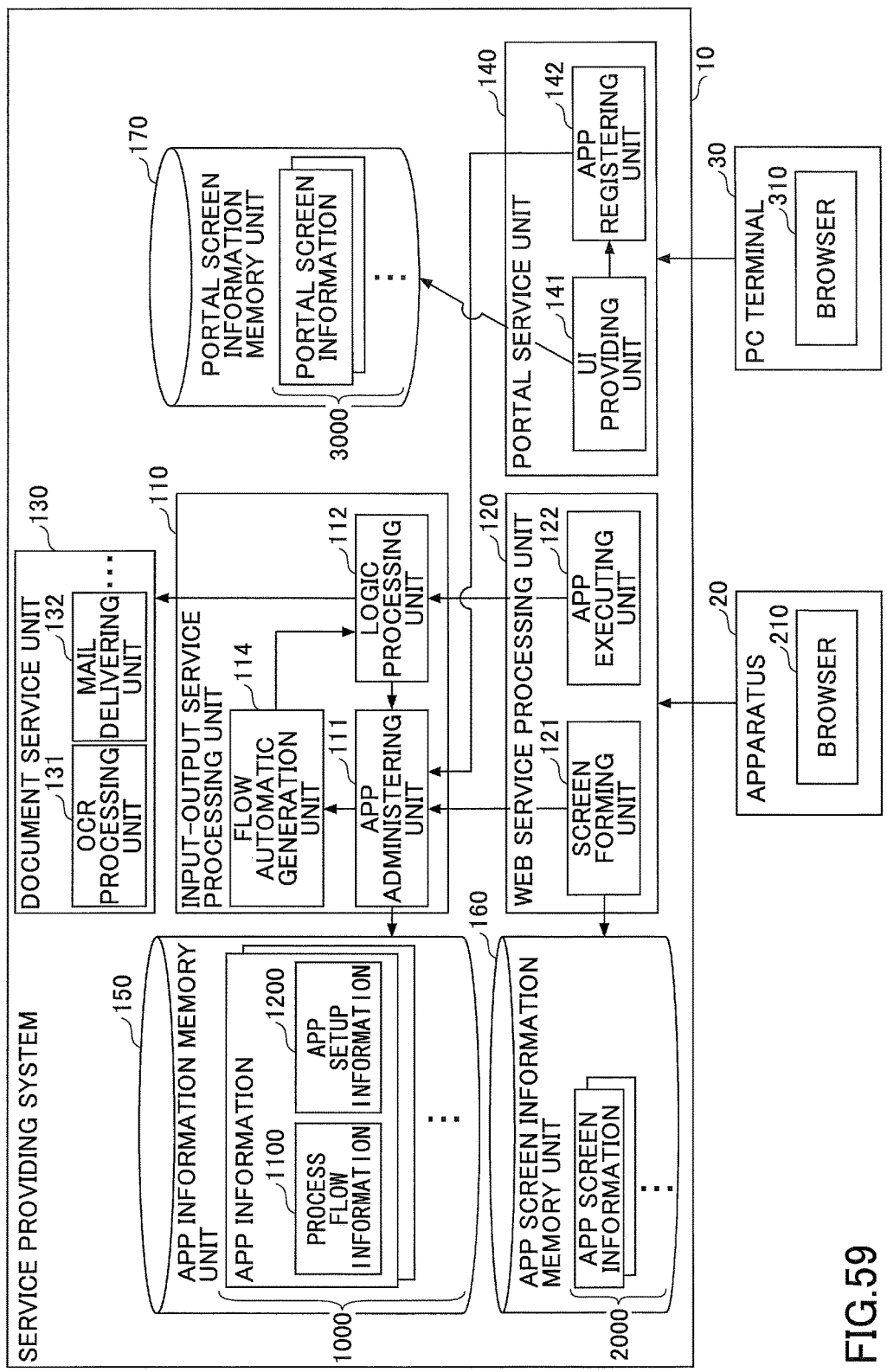
FIG. 59 is a diagram illustrating a functional structure of an example of an information processing system of a sixth embodiment.

Referring to FIG. 59, the functional structure of the information processing system 1 of the sixth embodiment is described. FIG. 59 is a diagram illustrating a functional structure of an example of the information processing system 1 of the sixth embodiment.

The input-output service processing unit 110 of the service providing system 10 illustrated in FIG. 59 further includes a flow automatic generation unit 114. The flow automatic generation unit 114 generates the process flow information 1100 corresponding to an input means for inputting a parameter using a process flow template in response to a request from the app administering unit 111. The process flow template is a template (a form) for creating the process flow information 1100.

<Detailed Process>

Figure 60:
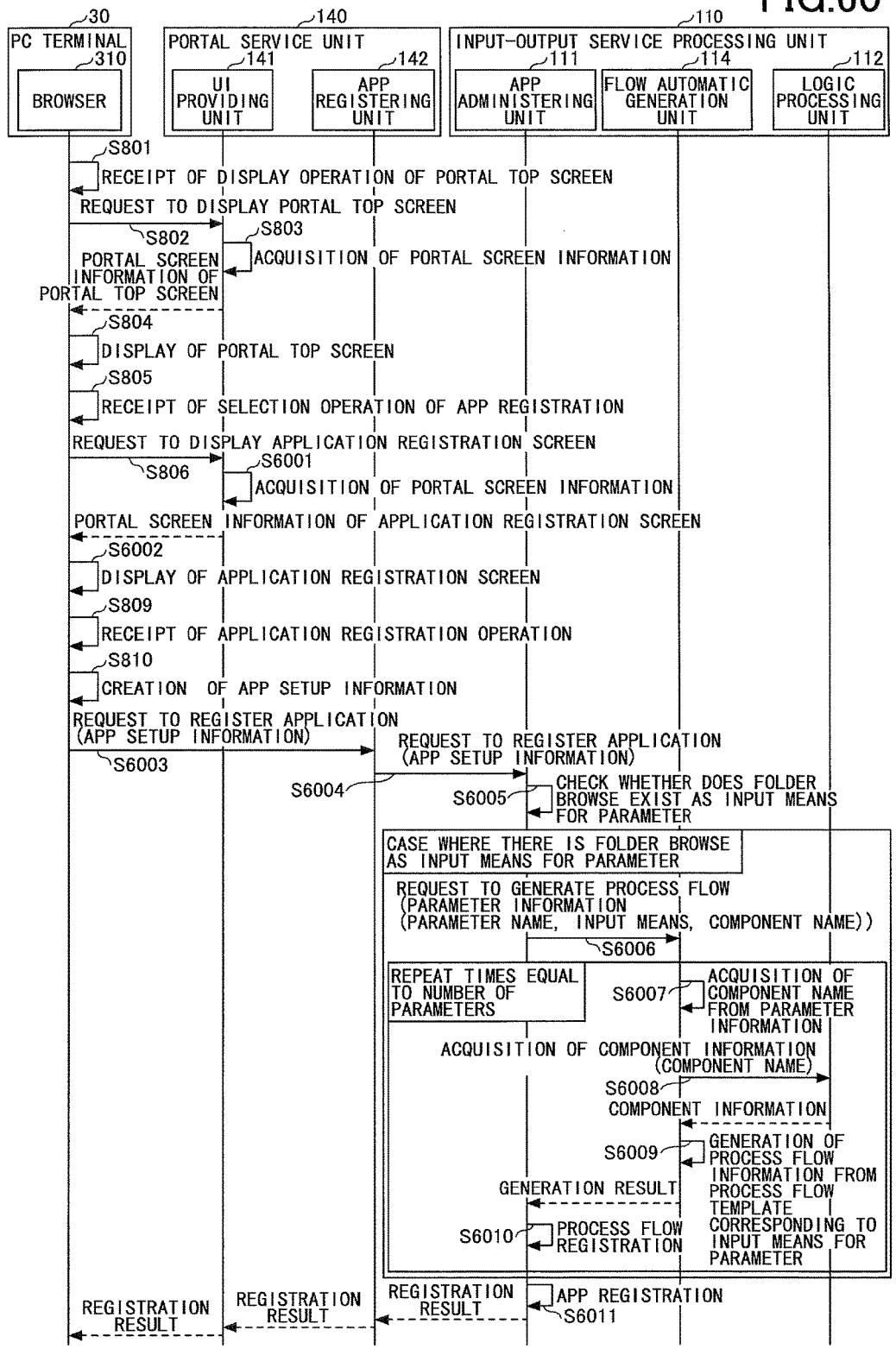
FIG. 60 is a sequence diagram of an example of a registration process to register an application according to the sixth embodiment.

Described next is a detailed process of the information processing system 1 of the sixth embodiment. Referring to FIG. 60, described is a case where the user of the PC terminal registers the application, into which the parameter is input by, for example, folder browse. FIG. 60 is a sequence chart of an example of the registration process to register the application of the sixth embodiment. Steps S801 to S805 and S809 to S810 illustrated in FIG. 60 are similar to steps S801 to S805 and S809 to S810 illustrated in FIG. 8. Therefore, the description of the steps S801 to S805 and S809 to S810 is omitted.

After the UI providing unit 141 of the portal service unit 140 receives the display request to display the application registration screen subsequent to step S806, the UI providing unit 141 acquires the portal screen information 3000 of the application registration screen from the portal screen information memory unit 170 (step S6001). Said differently, the UI providing unit 141 acquires the portal screen information 3000 for displaying an application registration screen G2600 (described below) from the portal screen information memory unit 170.

Then, the UI providing unit 141 returns the portal screen information 3000 acquired from the portal screen information memory unit 170 to the browser 310.

After the browser 310 of the PC terminal 30 receives the portal screen information 3000 of the application registration screen, the browser 310 displays an application registration screen G2600 as illustrated in FIG. 61 based on the portal screen information 3000 (step S6002).

The application registration screen G2600 illustrated in FIG. 61 is one of various screens, with which the user registers the application. The application registration screen G2600 is provided for designating an input means where the component inputs various parameters. Referring to FIG. 61, a parameter setup column G2601 setting various information of various parameters input by the component in the application registration screen G2600. Referring to FIG. 61, described is a case where the various information of the parameter input by a storage service component is set.

The input means to input the parameter can be set in the parameter setup column G2610. The input means includes folder browse, a text box, a select box, and so on. The user can set up the input means of the parameters input by the component in the parameter setup column G2610.

Referring to FIG. 62, described is a data structure of the parameter in a case where the input means for the parameter name "folder ID" is "folder browse" and the input means for the parameter name "file name" is "text box". Referring to FIG. 62, "name" corresponds to the parameter name, and "inputType" corresponds to the input means.

Referring back to FIG. 60, the description is further given. Subsequent to step S810 (i.e., after creating the app setup information 1200), the browser 310 of the PC terminal 30 sends a registration request to register the application to the app registering unit 142 of the portal service unit 140 (step S6003). The registration request to register the application includes the app setup information 1200 created by step S810.

The app registering unit 142 of the portal service unit 140 receives the registration request to register the application, and thereafter sends the registration request to the app administering unit 111 of the input-output service processing unit 110 (step S6004).

After the app administering unit 111 of the input-output service processing unit 110 receives the registration request to register the application, the app administering unit 111 checks whether the input means "folder browse" is included in the app setup information 1200 included in the registration request (step S6005). Said differently, the app administering unit 111 checks whether the parameter information whose input means is "folder browse" is included in the app setup information 1200. Hereinafter, the parameter information whose input means is "folder browse" is included in the app setup information 1200.

In a case where the app setup information 1200 includes the input means "folder browse", the app administering unit 111 of the input-output service processing unit 110 sends a process flow generation request to generate a process flow to the flow automatic generation unit 114 (step S6006). At least one parameter information whose input means is "folder browse" is included in the process flow generation request. The parameter information includes the parameter name, the input means for inputting the parameter defined in the parameter information, and the component name of the component into which the parameter is input. Subsequent processes in steps S6007 to S6010 are performed for every parameter information included in the process flow generation request.

After the flow automatic generation unit 114 of the input-output service processing unit 110 receives the process flow generation request, the flow automatic generation unit 114 acquires the component name from the parameter information included in the generation request (step S6007).

Next, the flow automatic generation unit 114 of the input-output service processing unit 110 acquires the component information of the component name acquired in step S6007 from the logic processing unit 112 (step S6008).

Referring to FIG. 63, described is an example of component information of a storage service component. Referring to FIG. 63, the component which can be designated by the folder browse as the input means for inputting the parameter has an operation corresponding to the folder browse ("_folderBrowse" in the example illustrated in FIG. 62). The operation is a unit of a process executable by the component.

Next, the flow automatic generation unit 114 of the input-output service processing unit 110 generates process flow information 1100 using a process flow template corresponding to the input means "folder browse" and the component information acquired in step S6008 (step S6009). The flow automatic generation unit 114 returns the generated flow information 1100 to the app administering unit 111.

FIG. 64 illustrates the process flow template corresponding to the input means "folder browse". The process flow template is previously stored in a predetermined memory area.

The component information acquired in step S6008 is component information using proxy authentication as illustrated in, for example, FIG. 65, the process flow template illustrated in FIG. 66 is used to generate the process flow information 1100. As described, different process flow templates may be used to generate the process flow information 1100 in response to the authentication method of the component or the like.

After the app administering unit 111 of the input-output service processing unit 110 receives the process flow information 1100, the app administering unit 111 causes the process flow information 110 to be stored into the app information memory unit 150d in association with the app ID (step S6010). With this, the process flow of the folder browser is registered.

The app administering unit 111 of the input-output service processing unit 110 registers the application (step S601). Then, the app administering unit 111 returns the registration result to the browser 310. Thus, the application is registered.

Figure 67:
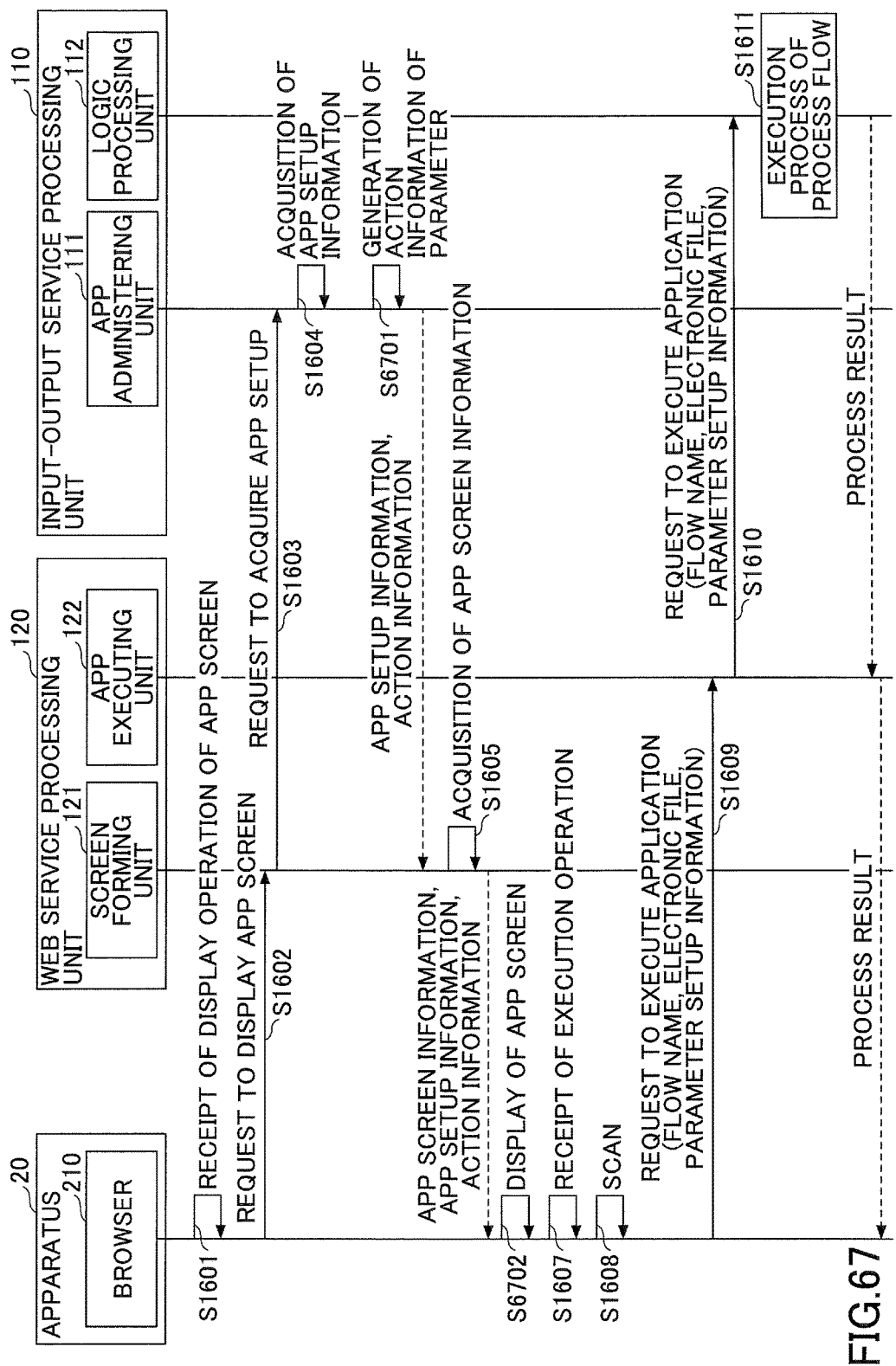
FIG. 67 is a sequence diagram illustrating an example of an overall process of a service using a folder ID designated by folder browse.

Described next is a case where the user of the apparatus 20 designates the folder ID by the folder browse and uses the service. FIG. 67 is a sequence diagram illustrating an example of the overall process of the service using the folder ID designated by folder browse. Steps S1601 to S1605 and S1607 to S1611 illustrated in FIG. 67 are similar to steps S1601 to S1605 and S1607 to S1611 illustrated in FIG. 16. Therefore, the description of the steps S1601 to S1605 and S1607 to S1611 is omitted.

Subsequent to step S1604, the app administering unit 111 of the input-output service processing unit 110 creates action information using the input means included in the app setup information 1200 acquired in step S1604 and the process flow information 1100 generated by the flow automatic generation unit 114 (step S6701). Here, the action information includes the input means and a URL and a request body, which are used for executing the process flow based on the process flow information 1100 generated by the flow automatic generation unit 114.

FIG. 68 illustrates an example of the action information. FIG. 68 illustrates the example of the action information. An input means of the parameter of "type", an execution URL of "url", and a request body of "body" are included in the action information illustrated in FIG. 68.

The app administering unit 111 returns the created action information to the browser 210 through the web service processing unit 120.

Figure 69:
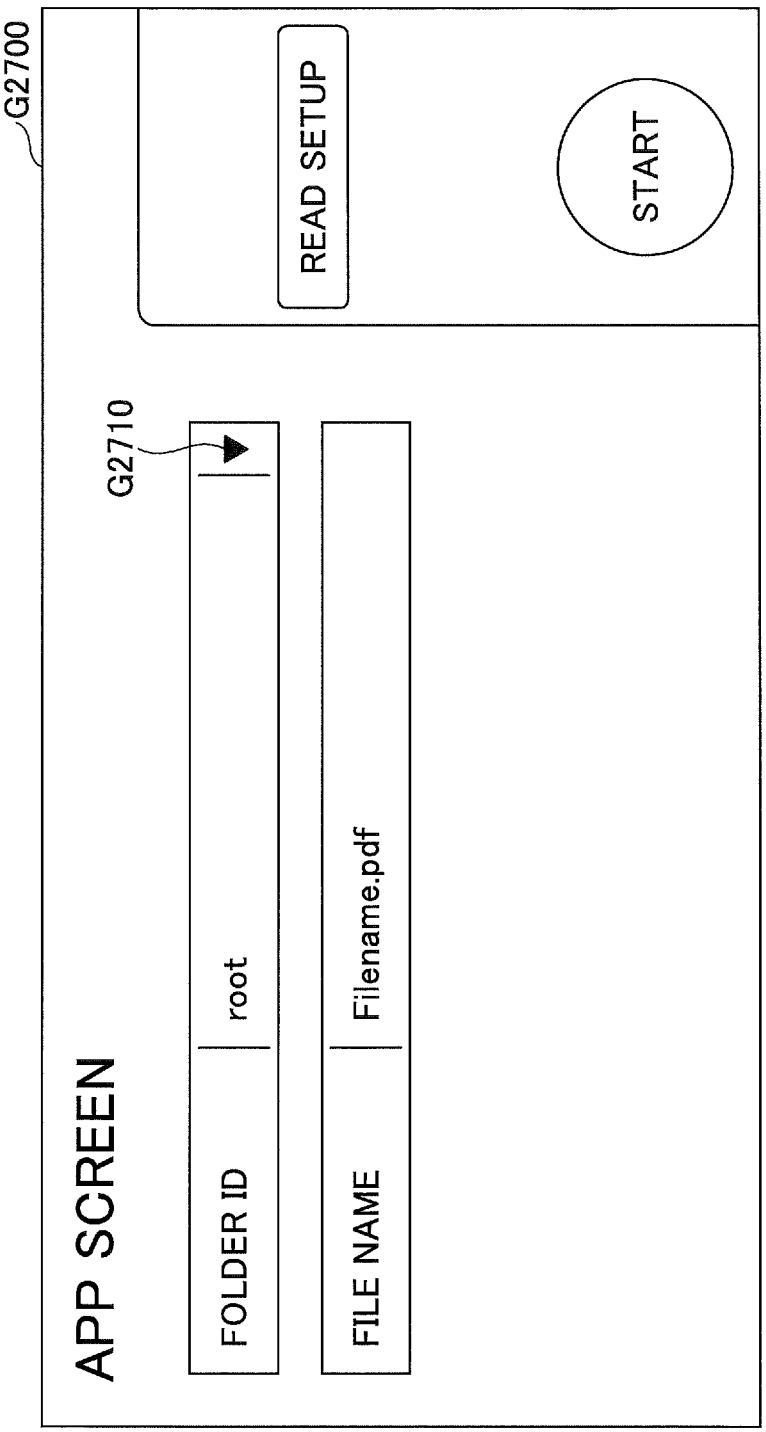
FIG. 69 illustrates an example of an app screen of the sixth embodiment.

Subsequent to step S1605, the browser 210 of the apparatus 20 displays an app screen G2700 illustrated in, for example, FIG. 69 based on the app screen information 2000, the app setup information 1200, and the action information, which are received from the screen forming unit 121 (step S6702).

The app screen G2700 illustrated in FIG. 69 includes a folder browse selection column G2710 for selecting the folder ID by using the folder browse. After the user selects the folder browse selection column G2710, the browser 310 displays a folder browse screen G2800 illustrated in, for example, FIG. 70.

Figure 70:
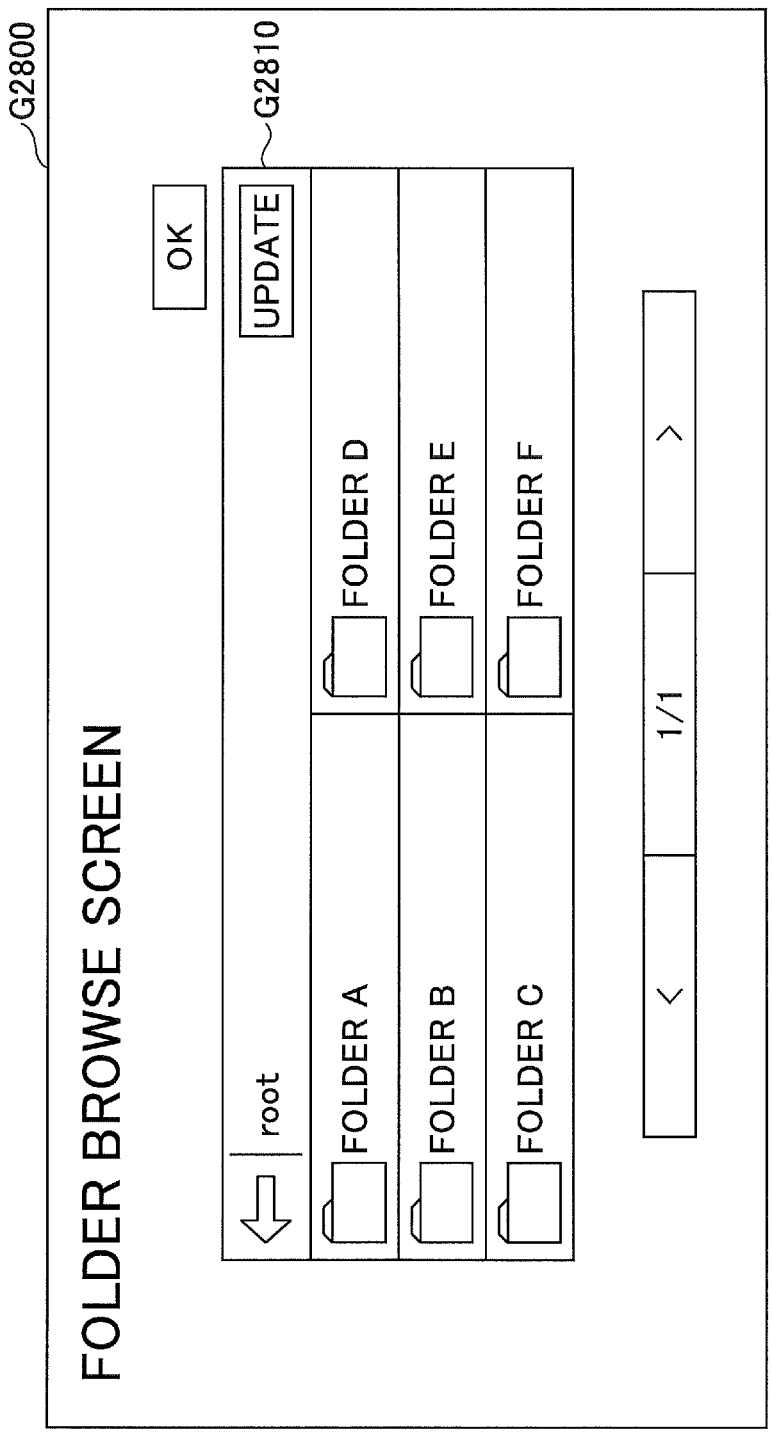
FIG. 70 illustrates an example of a folder browse screen

A folder browse column G2810 for selecting the folder ID using the folder browse is included in the folder browse screen G2800 illustrated in FIG. 70. The user can select the folder ID of a desirable folder from the folder browse column G2810.

As described above, the information processing system 1 of the sixth embodiment can automatically generate the process flow of performing the folder browse by designating the input means for inputting the parameter. With this, the user can easily create the application which sets the setup value of the parameter using the folder browse.

According to the embodiment of the present invention, the development of the application can be supported.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the information processing system of the present invention has been described in detail, it should be understood that various changes, substitutions, and alterations could be made thereto without departing from the spirit and scope of the invention.

The order of the method of the embodiment of the present invention is not limited to the order of processes of the method disclosed by this disclosure.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An information processing system including at least one information processing apparatus and a plurality of programs respectively performing predetermined processes, the information processing apparatus comprising:
a processor; and
a memory storing
one or more applications that execute a series of processes using electronic data, in which
program identification information of identifying at least one program from among the plurality of programs and flow information that defines an execution order of executing the at least one program are associated with application setup information that defines parameter setup information of setting a parameter used to execute each of the at least one program, and flow identification information of identifying the flow information;

use screen information that defines a form of a use screen for using the applications in association with application identification information of identifying the applications; and program instructions that cause the processor to:
receive a first request including the application identification information from a first electronic apparatus from among at least one electronic apparatus coupled to the information processing system;

send, to the first electronic apparatus being the request source, the stored use screen information in association with the application identification information included in the received first request and the stored application setup information in association with the application identified by the application identification information;

receive a second request that includes the parameter set in the use screen displayed in the first electronic apparatus based on the sent use screen information and the parameter setup information defined by the application setup information, information related to the electronic data designated in the use screen, and the flow identification information defined in the parameter setup information;

acquire the flow information identified by the flow identification information included in the received second request; and execute each of the at least one program identified by the acquired flow information using the parameter included in the second request, in conformity with the execution order defined in the flow information, so as to execute the series of processes using the electronic data based on the information related to the electronic data included in the received second request.

2. The information processing system according to claim 1, wherein execution of the program instructions further causes the processor to:

receive a third request that includes application setup information created by a second electronic apparatus from among the at least one electronic apparatus coupled to the information processing system; and store the application, in which the application setup information included in the received third request is registered in association with the flow information identified by the flow identification information defined by the application setup information.

3. The information processing system according to claim 2, wherein execution of the program instructions further causes the processor to:

store creation screen information of a creation screen used by the second electronic apparatus to create the application setup information; and send the stored creation screen information in response to a request from the second electronic apparatus, wherein the third request, which includes the parameter setup information and the application identification information, is received, the parameter setup information being created by a user in the creation screen displayed by the second electronic apparatus based on the sent creation screen information, the application identification information defining the flow identification information.

4. The information processing system according to claim 1, wherein the parameter setup information defines the parameter, a value of which is set by a user in the use screen displayed by the first electronic apparatus.

5. The information processing system according to claim 1, wherein the parameter setup information defines the value of the parameter.

6. The information processing system according to claim 1, wherein the application setup information further defines display information of the use screen displayed in the first electronic apparatus.

7. The information processing system according to claim 1, wherein the execution order is an order of the program identification information in the flow information.

8. The information processing system according to claim 1, wherein the processor converts a data type of the electronic data to a predetermined data type, and executes the series of processes using the electronic data by converting the data type of the electronic data to a data type processable by the program, and thereafter by executing the program.

9. An information processing apparatus and a plurality of programs respectively performing predetermined processes, the information processing apparatus comprising:

a processor; and a memory storing one or more applications that execute a series of processes using electronic data, in which program identification information of identifying at least one program from among the plurality of programs and flow information that defines an execution order of executing the at least one program are associated with application setup information that defines parameter setup information of setting a parameter used to execute each of the at least one program, and flow identification information of identifying the flow information;

use screen information of defining a form of a use screen for using the applications in association with application identification information of identifying the applications; and program instructions that cause the processor to:
receive a first request including the application identification information from a first electronic apparatus from among at least one electronic apparatus coupled to the information processing apparatus;

send, to the first electronic apparatus being the request source, the stored use screen information in association with the application identification information included in the received first request and the stored application setup information in association with the application identified by the application identification information;

a second receiving unit configured to receive a second request that includes:

the parameter set in the use screen displayed in the first electronic apparatus based on the sent use screen information and the parameter setup information defined by the application setup information, information related to the electronic data designated in the use screen, and the flow identification information defined in the parameter setup information;

acquire the flow information identified by the flow identification information included in the received second request; and execute each of the at least one program identified by the acquired flow information using the parameter included in the second request, in conformity with, the execution order defined in the flow information, so as to execute the series of processes using the electronic data based on the information related to the electronic data included in the received second request.

10. A method for processing information performed in an information processing apparatus including a plurality of programs respectively performing predetermined processes, the information processing apparatus further including an application storage memory configured to store each of applications executing a series of processes using electronic data, in which program identification information of identifying at least one program from among the plurality of programs, and flow information of defining an execution order of executing the at least one program are associated with application setup information defining parameter setup information of setting a parameter used to execute each of the at least one program, and flow identification information of identifying the flow information, and a use screen storage memory configured to store use screen information of defining a form of a use screen for using the applications in association with application identification information of identifying the applications, the method for processing information comprising:

receiving a first request including the application identification information from a first electronic apparatus from among at least one electronic apparatus coupled to the information processing apparatus;

sending, to the first electronic apparatus being the request source, the use screen information stored in the use screen storage memory in association with the application identification information included in the first request received by the receiving the first request and the application setup information stored in the application storage memory in association with the application identified by the application identification information;

receiving a second request that includes the parameter set in the use screen displayed in the first electronic apparatus based on the sent use screen information and the parameter setup information defined by the application setup information, information related to the electronic data designated in the use screen, and the flow identification information defined in the parameter setup information;

acquiring the flow information identified by the flow identification information included in the received second request; and causing each of the at least one program identified by the flow information acquired by the acquiring the flow information to be executed using the parameter included in the second request in conformity with the execution order defined in the flow information so as to execute the series of processes using the electronic data based on the information related to the electronic data included in the received second request.

* * * * *